United States Patent
Kashibuchi

(10) Patent No.: US 9,563,606 B2
(45) Date of Patent: Feb. 7, 2017

(54) IMAGE DISPLAY APPARATUS, CONTROL METHOD THEREFOR, AND STORAGE MEDIUM

(71) Applicant: CANON KABUSHIKI KAISHA, Tokyo (JP)

(72) Inventor: Yoichi Kashibuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 14/465,175

(22) Filed: Aug. 21, 2014

(65) Prior Publication Data
US 2015/0067456 A1 Mar. 5, 2015

(30) Foreign Application Priority Data
Aug. 28, 2013 (JP) .................. 2013-177226

(51) Int. Cl.
*G06F 3/0485* (2013.01)
*G06F 17/21* (2006.01)

(52) U.S. Cl.
CPC ........... *G06F 17/211* (2013.01); *G06F 3/0485* (2013.01)

(58) Field of Classification Search
CPC .................................... G06F 3/0485
USPC ........................................ 715/785
See application file for complete search history.

(56) References Cited

U.S. PATENT DOCUMENTS

| | | | | |
|---|---|---|---|---|
| 6,735,335 B1* | 5/2004 | Liu | ..................... | G06K 9/00442 382/175 |
| 6,938,101 B2* | 8/2005 | Hayes | .................. | G06F 1/1626 348/E5.103 |
| 7,487,447 B1* | 2/2009 | Jerger | ................... | G06F 3/0481 715/252 |
| 2005/0050454 A1* | 3/2005 | Jennery | ............. | G06F 17/30905 715/235 |
| 2005/0071864 A1* | 3/2005 | Denoue | ................. | H04N 21/40 725/9 |
| 2005/0193053 A1* | 9/2005 | Kendall | ............ | G06F 17/30905 709/200 |
| 2005/0195221 A1* | 9/2005 | Berger | .................. | G06F 3/0481 345/660 |
| 2007/0130525 A1* | 6/2007 | Murphy | ............ | G06F 17/30905 715/747 |
| 2007/0204222 A1* | 8/2007 | Rogan | ............... | G06F 17/30899 715/210 |
| 2007/0279437 A1* | 12/2007 | Morimoto | ......... | G06F 17/30905 345/629 |

(Continued)

FOREIGN PATENT DOCUMENTS

JP 2007-256529 A 10/2007

OTHER PUBLICATIONS

Apple, "Iphone User Guide", iPhone iOS 4.2, released on Mar. 2011, 274 pages.*

(Continued)

*Primary Examiner* — Reza Nabi
(74) *Attorney, Agent, or Firm* — Fitzpatrick, Cella, Harper & Scinto

(57) ABSTRACT

Provided is an image display apparatus that displays a page image including a plurality of objects on a screen, determines an amount of movement of the end of the object to be displayed from the end of the screen by detecting a user operation on a touch panel, and sets the end position of the object based on the determined amount of movement when the object to be displayed is larger than the screen.

14 Claims, 56 Drawing Sheets

(56) References Cited

U.S. PATENT DOCUMENTS

| | | | | |
|---|---|---|---|---|
| 2008/0052945 A1* | 3/2008 | Matas | G06F 3/0485 34/173 |
| 2013/0050263 A1* | 2/2013 | Khoe | G06F 3/0481 345/634 |
| 2013/0222666 A1* | 8/2013 | Rydenhag | H04N 5/23293 348/333.02 |
| 2013/0263055 A1* | 10/2013 | Victor | G06F 3/0485 715/835 |
| 2013/0298083 A1* | 11/2013 | Bertoldo | G06F 3/0482 715/835 |
| 2013/0314446 A1* | 11/2013 | Maekawa | G06F 3/041 345/684 |
| 2014/0019262 A1* | 1/2014 | Reitsma | G06Q 30/02 705/14.71 |
| 2014/0173532 A1* | 6/2014 | Ikeda | G06F 3/04883 715/863 |
| 2014/0359538 A1* | 12/2014 | Thakur | G06F 3/0488 715/863 |
| 2014/0361982 A1* | 12/2014 | Shaffer | G06F 3/017 345/156 |
| 2015/0062178 A1* | 3/2015 | Matas | G06F 3/0346 345/648 |
| 2015/0067484 A1* | 3/2015 | Sumio | G06F 3/04883 715/251 |
| 2015/0277749 A1* | 10/2015 | Eggert | G06F 3/04883 715/863 |

OTHER PUBLICATIONS

Apple, "Iphone User Guide", iPhone iOS 5.1, released on Mar. 2012, 179 pages.*

* cited by examiner

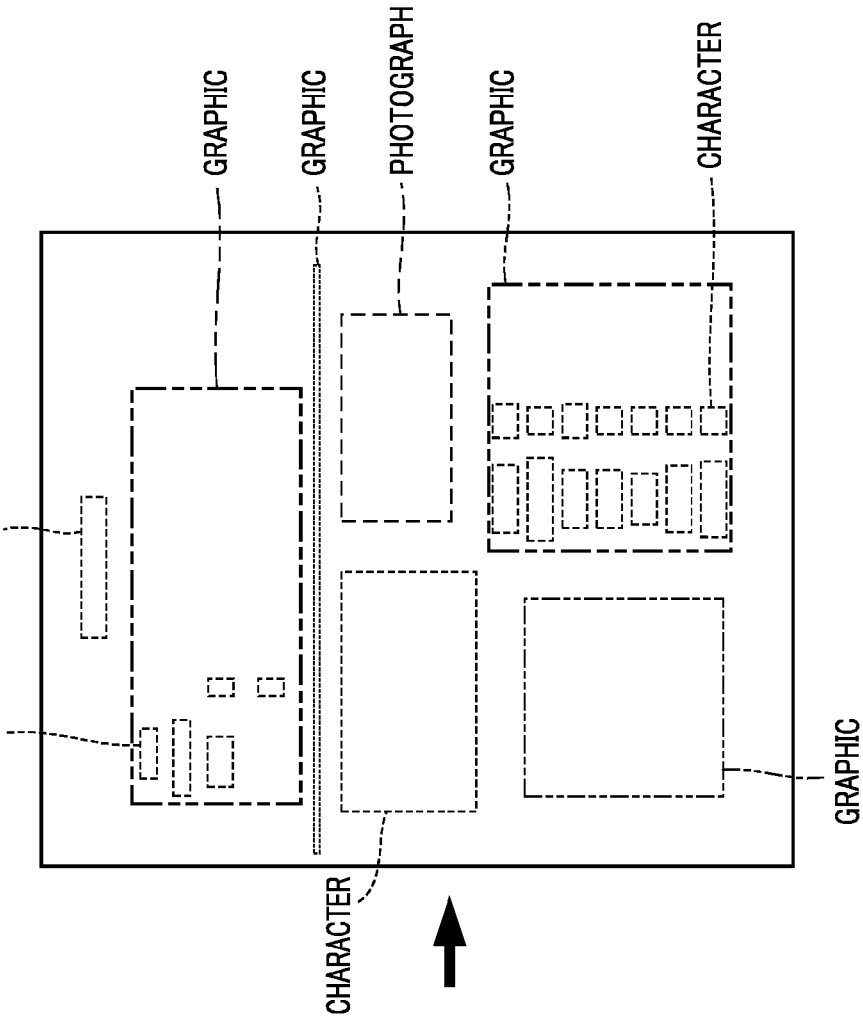
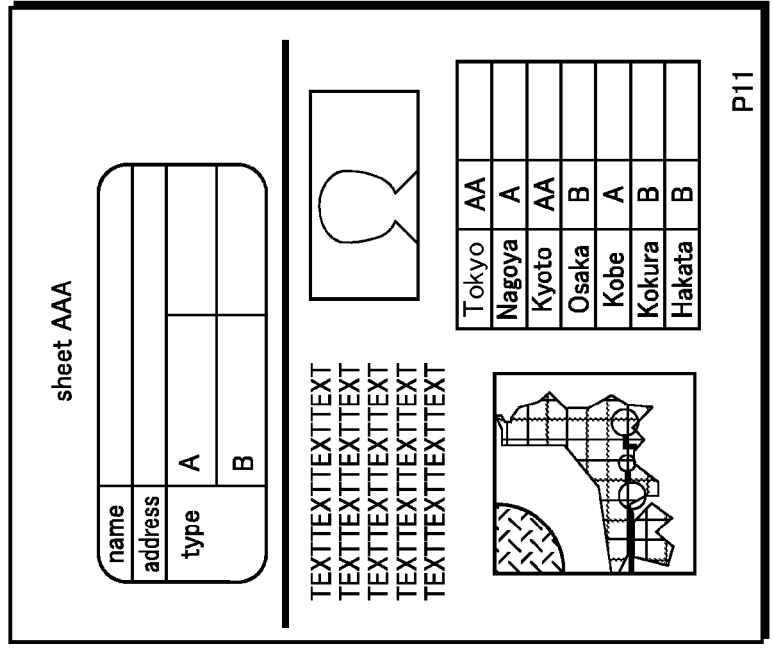
FIG. 5A
FIG. 5B

FIG. 6

Block information

| | Attribute | X-Coordinate | Y-Coordinate | Width W | Height H | OCR Information |
|---|---|---|---|---|---|---|
| Block 1 | 1 | X1 | Y1 | W1 | H1 | Present |
| Block 2 | 3 | X2 | Y2 | W2 | H2 | Present |
| Block 3 | 2 | X3 | Y3 | W3 | H3 | Absent |
| Block 4 | 1 | X4 | Y4 | W4 | H4 | Present |
| Block 5 | 3 | X5 | Y5 | W5 | H5 | Present |
| Block 6 | 2 | X6 | Y6 | W6 | H6 | Absent |

\* Attribute 1: Character, 2: Photograph, 3: Graphic

Input file information

| Total number of blocks | N (=6) |
|---|---|

FIG. 13

```
<?xml version="1.0">
<svg:svg xmlns:svg="http://www.w3.org/2000/svg" xmlns:xlink="http://www.w3.org/1999/xlink" xmlns:rcd
="http://www.ddd.com/ns/rcd" width="606" height="862" viewBox="0 0 2361 3388">
```
                                                                                                    1801

```
<svg:image  x="0" y="0" width="1240" height="1760"
xlink:href="data:image/jpeg;base64,/9j/2wCEAB8VFxsXEx8bGRsjIR8kLk0yLioqLI5DRzhNb2J1c21ibGp7irGWe4
OnhGpsmtGcp7a8xsjGd5TZ6NfA5rHCxr4BISMjLiguWjIyWr5/bH++vr6+vr6+vr6+vr6+vr6+vr6+
     ⋮
FFABRQB//ZAAA=">
</svg:image>
```
                                                                1802

```
<svg:svg x="188" y="284" width="896" height="148" rcd:gType="vectorText">
    <svg:g fill="#020202">
        <path d="    M123.3,779h1.2c2.4,0 10.7,3.1 10.7,4v12h1.4q1.4.0 3.8,-1q2.4,-1 8.6,-4h1c3.5,0 8,2.8 8,5
        v2q-14,2 -20,2v3q0,3 2,6.6v2.4h2q2,0 6.9,-1.5q5,-1.5 12.1,-4.5h0.5c3.3,0 9.5,3.3 9.5,5
        c0,0.8 -23.6,6 -27.6h-1v3q7.22 7,23c0,0.8 -3.2.4 -4,4c-3.1,0 -4.9,-3.4 6.8,-12.3c-1.4,-7
        -2,-9.4 -3,-11.7
        q-0.2,-0.4 -0.2,-0.7v-2.4h-2q-2,0 -7.5,2.3q-5.5,2.2 -13.5.7c-3.2,0 -9.5,-6.7 -9.5,-10v-2h3
        q3.1,2.4 4.1,3.2q0.9,0.8 1.9,0.8c4,0 21,-5.7 21,-7q-2,-5 -2,-9v-1h-3q-3,0 -6.1,1.3q-3.2,1.3 -8.9,3.7
        h-0.5c-3.4,0 -9.5,-5.1 -9.5,-8c0,-1 1.3,-3 2,-3q3,3 5,3h4q10,-2 14,-2v-2.5c0,-3.8 -3.8,-10.5 -6,-10.5
        h-3v-1.5c0,-0.3 3,-3.5 3.3,-3.5z"/>
            ⋮
    </svg:g>
    ┌─────────────────────────────────────────────────────────────┐
    │ <svg:text fill="#020202" font-size="150">                    │── 1803
    │    <svg:tspan y="144" x="0 149 299 449 609 750">DDDtaro</svg:tspan> │
    │ </svg:text>                                                  │
    └─────────────────────────────────────────────────────────────┘
</svg:svg>                                                         1804
```

```
<svg:svg x="193" y="631" width="311" height="205" rcd:gType="vectorLineArt">
    <svg:path fill="none" stroke="#000000" stroke-width="1.0" stroke-linecap="square"
         d="M1724,2367c-5.5,0 -15.2,12.3 -27,34c-8.2,15 -15,17.2 -79.1,24.5c-37.4,4.3 -63.9,10.1
         -63.9,14q0,0.3 0.2,0.4c2.2,1.6
2.5,2.1 3.6,4.5
        c1.3,3.3 1.9,3.6 6.2,3.6h2q2,0 3.5,2c0.3,0 1.5,-1.2 1.5,-1.5c0,-0.3 3.1,-1.5 4,-1.5q2,0 2.5,0.5q0.5,0.5 7.5,5.5
        h12c5.7,0 13,6.7 13,12c0,10.5 -16.3,23 -30,23q-4,0 -6.6,-1.5q-2.7,-1.5 -12.4,-10.5q-7,4 -9.5,4c-4.2,0
        -12.3,-6.6 -12.3,-10
        v-11h-3.2c-5.4,0 -20,27.7 -20,38c0,2.8 3.6,5 8,5h140c4.9,0 12,-4.2 12,-7q0,-1 -3,-6
        v-3.5c0,-22.1 30.5,-49.5 55,49.5q2.3,0 41,1.6q5,0.2 13.5.2.4q3.5,0 8.5,-2c23.2.0 54,27.9 54,49q0,4 -0.5,4.4
        q-0.5.0.3 -3.5,5.1c0,1.6 6.4,4.5 10,4.5h3.5c36,0 68.5,-5.7 68.5,-12c0,-31.1 -17.8,-49.1 -64,-64.5q-25.1,-8.4
        -30.4,-12.5
        q-6.1,-4.8 -16.1,-24c-6.5,-12.5 -15.6,-21 -22.5,-21h-66v0z"/>
            ⋮
</svg:svg>

</svg:svg>
```

FIG. 16A

| Event name | Touch press event |
|---|---|
| Transmitted information | Press coordinate values |
| | Latest number of coordinates |

FIG. 16B

| Event name | Swipe event |
|---|---|
| Transmitted information | Event generation coordinate values |
| | Moving distance |

FIG. 16C

| Event name | Pinch-in event |
|---|---|
| Transmitted information | Pinch-in center coordinate values |
| | Pinch-in reduction rate |

FIG. 16D

| Event name | Pinch-out event |
|---|---|
| Transmitted information | Pinch-out center coordinate values |
| | Pinch-out enlargement rate |

FIG. 16E

| Event name | 2-point swipe event |
|---|---|
| Transmitted information | Event generation coordinate values |
| | Moving distance |

FIG. 16F

| Event name | Rotate event |
|---|---|
| Transmitted information | Rotation center coordinate values |
| | Rotational angle |

FIG. 16G

| Event name | Flick event |
|---|---|
| Transmitted information | Latest coordinate values |
| | Released speed |

FIG. 16H

| Event name | Touch release event |
|---|---|
| Transmitted information | Released coordinate values |
| | Latest number of coordinates |

FIG. 16I

| Event name | Double-tap event |
|---|---|
| Transmitted information | Latest coordinate values |

FIG. 16J

| Event name | Single-tap event |
|---|---|
| Transmitted information | Latest coordinate values |

FIG. 16K

| Event name | Long-tap event |
|---|---|
| Transmitted information | Latest coordinate values |

FIG. 16L

| Event name | Touch-and-hold event |
|---|---|
| Transmitted information | Latest coordinate values |

FIG. 34A
FIG. 34B
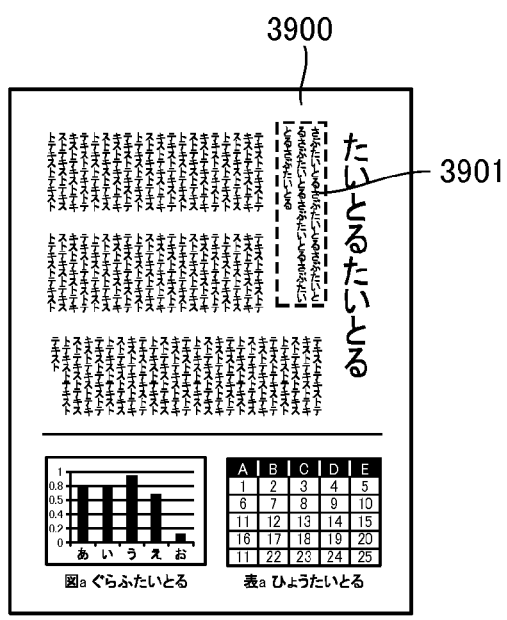
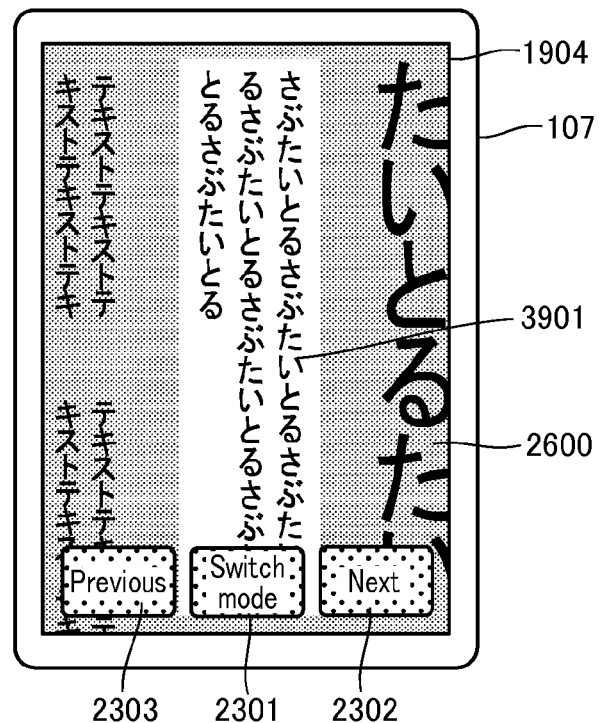

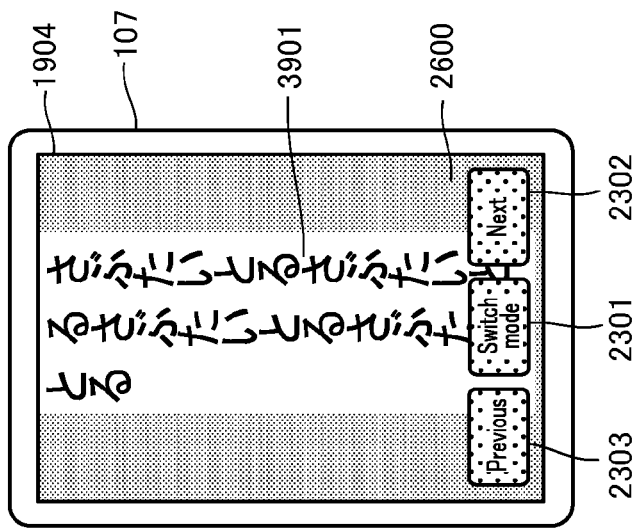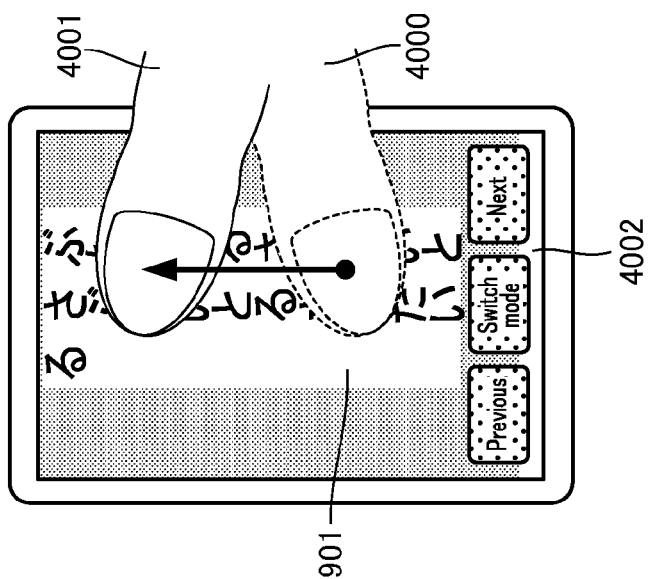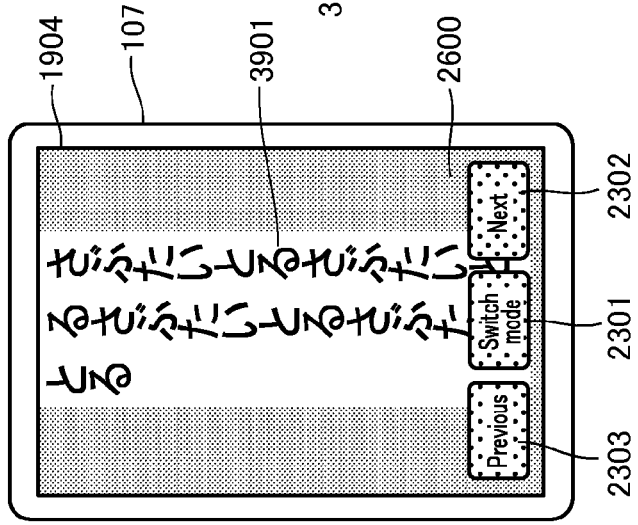

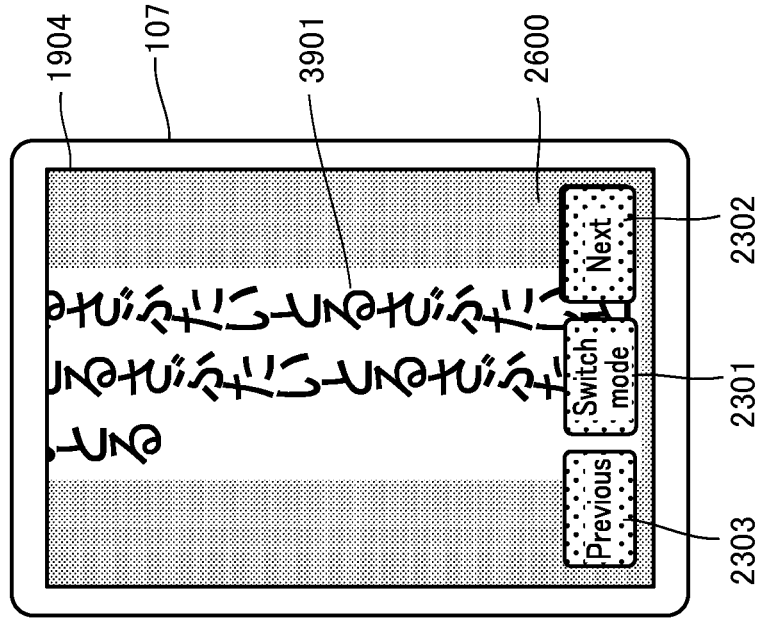
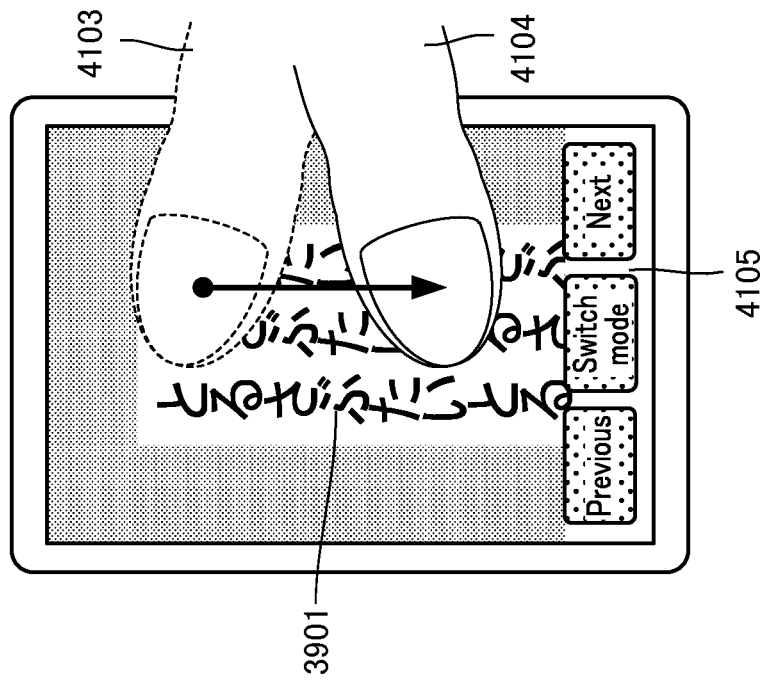

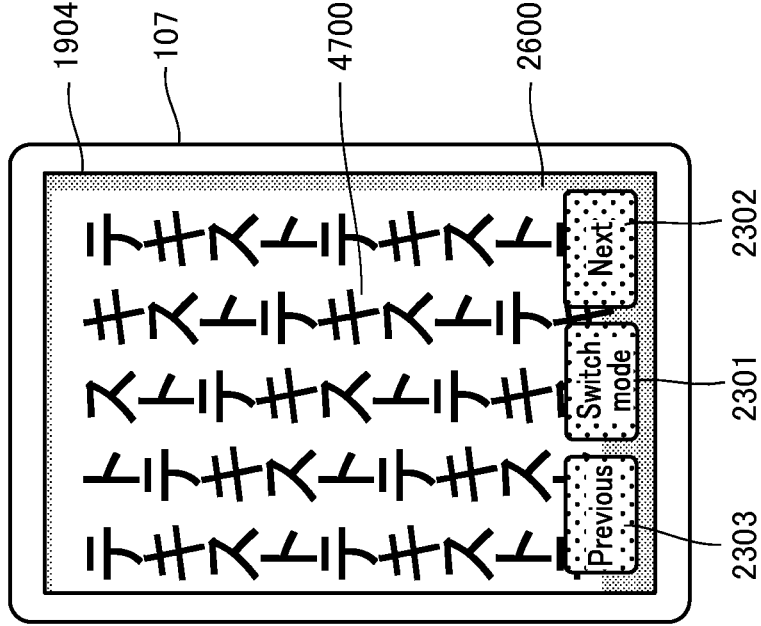
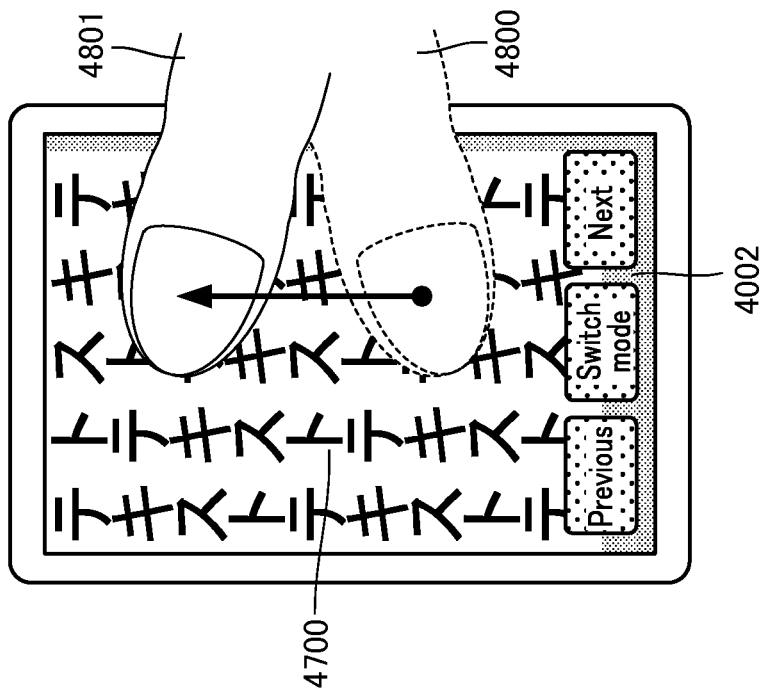

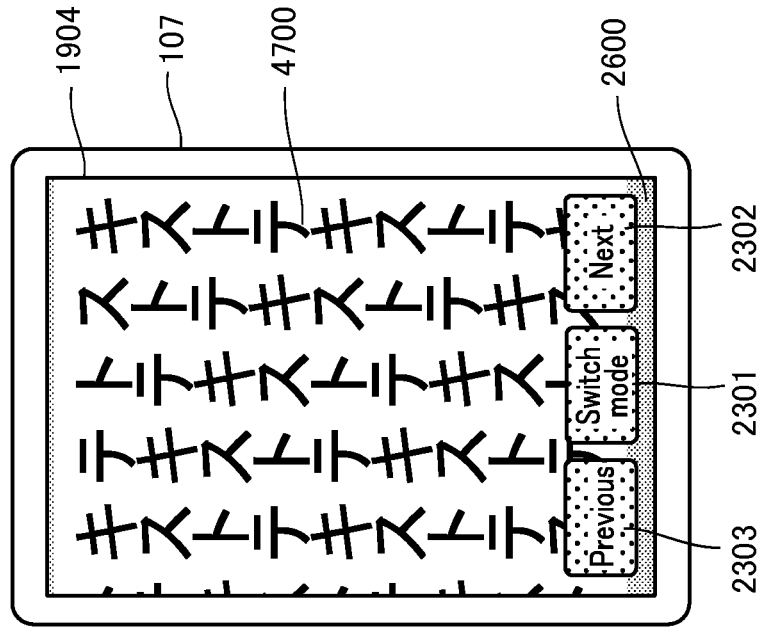
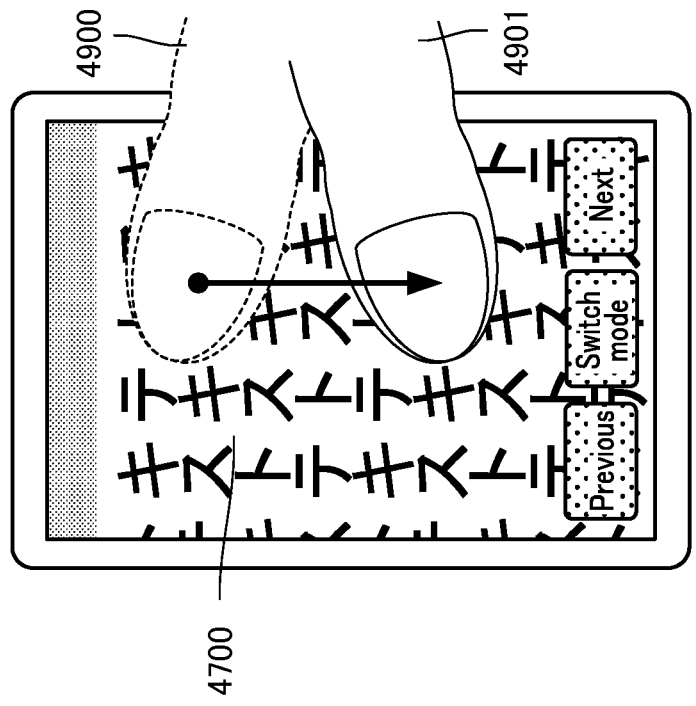

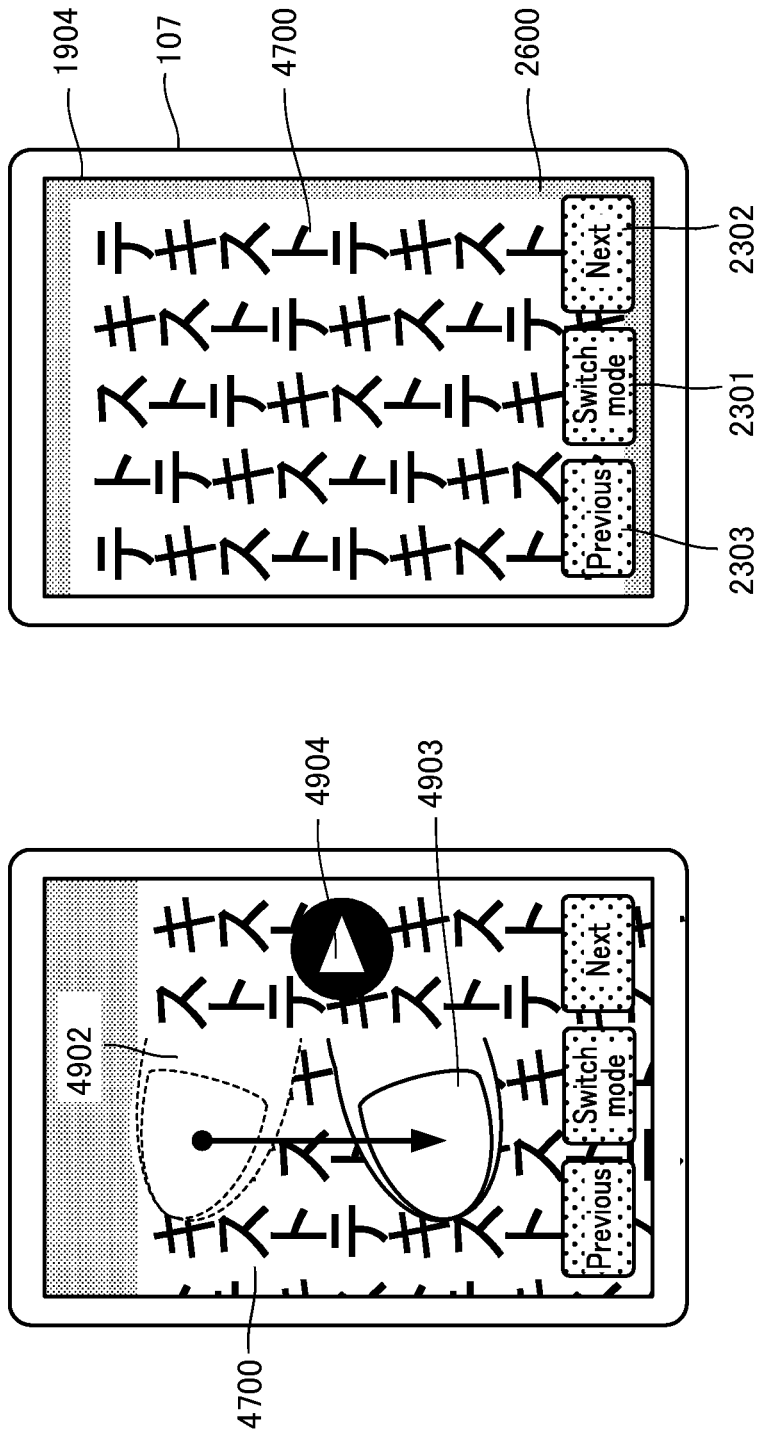

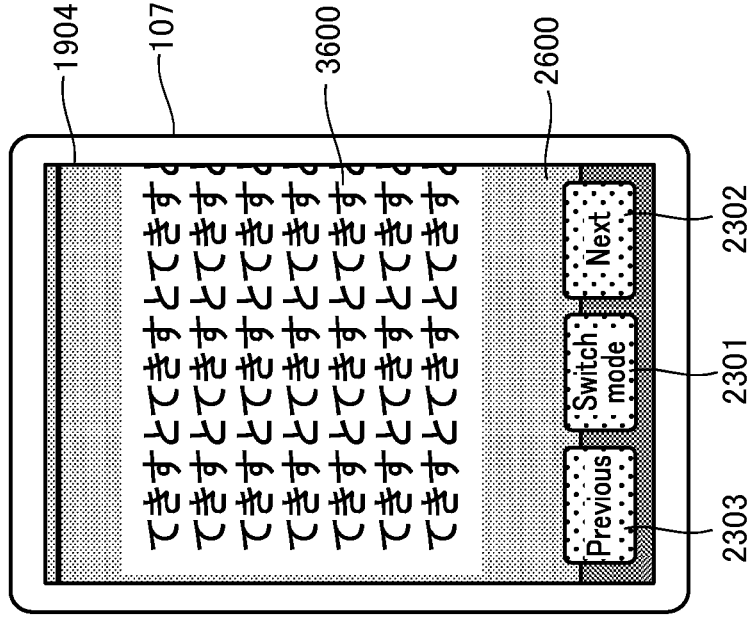
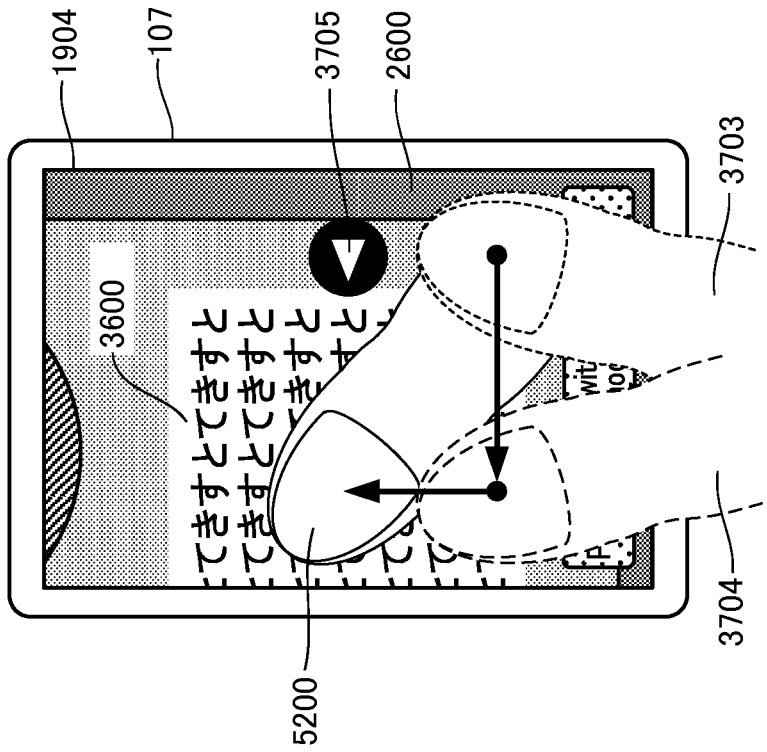
FIG. 47A
FIG. 47B

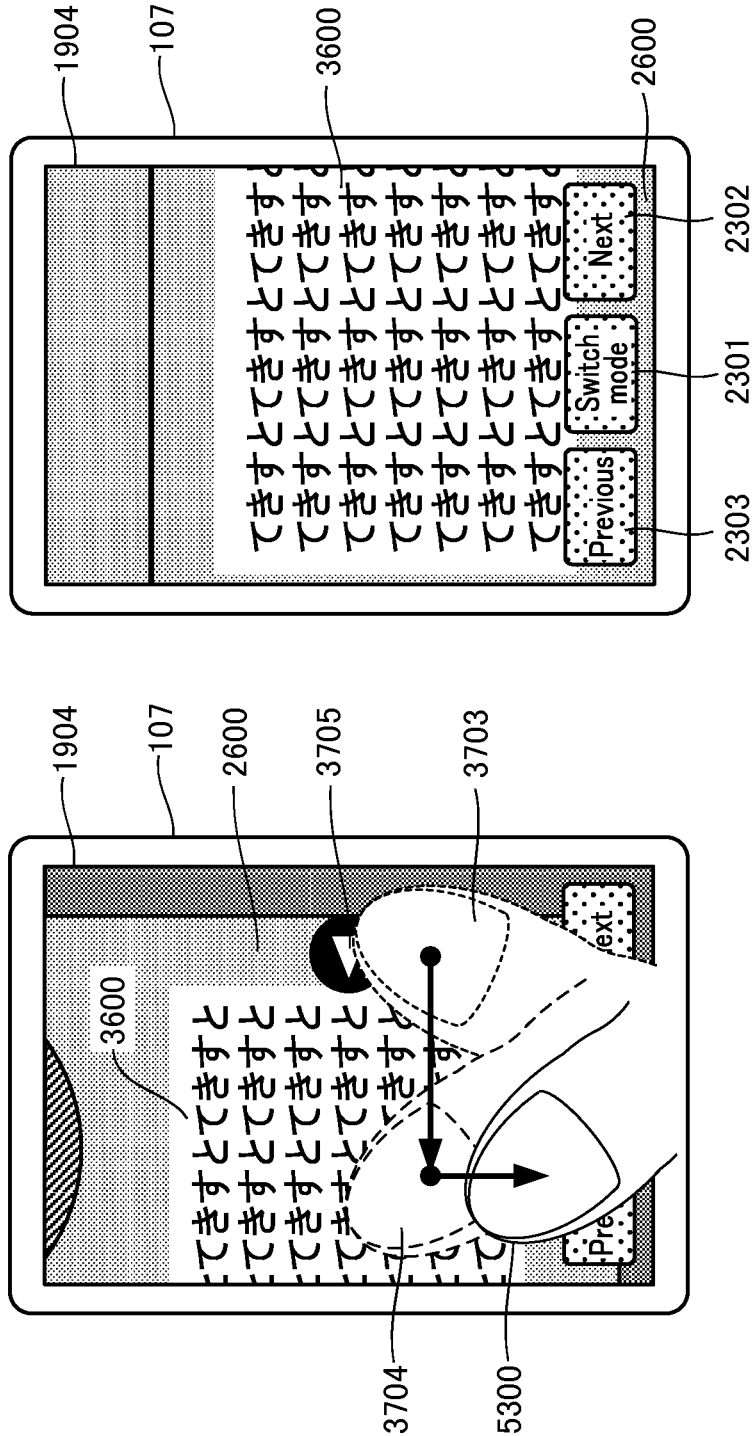

IMAGE DISPLAY APPARATUS, CONTROL METHOD THEREFOR, AND STORAGE MEDIUM

BACKGROUND OF THE INVENTION

Field of the Invention

The present invention relates to an image display apparatus, a control method therefor, and a storage medium.

Description of the Related Art

There has been proposed a method for displaying image data which is a digitalized document on an image display apparatus such as a mobile terminal or a tablet. For example, Japanese Patent Laid-Open No. 2007-256529 discloses an image display apparatus that analyzes the layout of image data, acquires a character object, and then displays a display target range on a screen based on the reading order direction of characters included in the character object. When the image display apparatus is used, a user performs one-dimensional scroll operation for an input unit such as a touch panel, so that the display target range is moved to the reading order direction of characters. Furthermore, if the end of a line is included in the display target range, the display target range is moved to the head of the next line by a user operation. According to the image display apparatus, a user can read characters included in a character object by performing a forward scroll operation in a one-dimensional direction even if the character object is larger than the screen.

However, when the image display apparatus disclosed in Japanese Patent Laid-Open No. 2007-256529 is used, the display target range is moved to the head of the next line by a one-dimensional scroll operation if the end of a line of characters is included in the display target range. Thus, a user may recognize the fact that the display position prior to movement of the display target range was the end of the preceding line after the display target range has been moved to the head of the next line. In this case, the user may possibly scroll to the head of the next line without reading all characters included in the preceding line. The user needs to reciprocate the end of the preceding line and the head of the next line of the character object in order to read all characters, resulting in a significant reduction in readability. The present invention provides an image display apparatus that precisely controls the display position of an image object larger than the screen so as to improve the user operability and visibility.

SUMMARY OF THE INVENTION

According to an aspect of the present invention, an image display apparatus is provided that includes a displaying unit configured to display a page image including a plurality of objects on a screen; a determining unit configured to determine an amount of movement of the end of the object to be displayed from the end of the screen by detecting an operation on the screen; and a setting unit configured to set the end position of the object based on the determined amount of movement when the object to be displayed is larger than the screen.

The image display apparatus of the present invention precisely controls the display position of an image object larger than the screen, so that the user operability and visibility can be improved. Thus, the user can move a character object which has been enlarged larger than the screen size by a user enlargement instruction due to the small size of the characters from the end to the head of a line or from the head to the end of a line by the user's simple operation. Only when the amount of movement of the end of the object which has moved into the screen is more than a predetermined amount, the opposite end of the object against the end of the object which has moved into the screen is moved to the end of the screen of the touch UI, so that the user can surely recognize the end of the object. In this manner, the user can move the character object to the head or the end of a line with less operation after the user has read all characters included in the line, so that the user can smoothly view the characters included in the object.

Further features of the present invention will become apparent from the following description of exemplary embodiments with reference to the attached drawings.

BRIEF DESCRIPTION OF THE DRAWINGS

FIGS. 5A and 5B illustrate examples of object segmentation.

FIG. 6 illustrates block information and input file information on each attribute when object segmentation is performed.

FIG. 13 illustrates an example of the Scalable Vector Graphics (SVG) format.

FIGS. 16A, 16B, 16C, 16D, 16E, 16F, 16G, 16H, 16I, 16J, 16K, and 16L illustrate names of gesture events and information to be transmitted when each event occurs.

FIGS. 34A and 34B illustrate examples of screen display of the touch UI of a mobile information terminal.

FIGS. 35A to 35E illustrate examples of screen display of the touch UI of a mobile information terminal.

FIGS. 36A to 36D illustrate examples of screen display of the touch UI of a mobile information terminal.

FIGS. 43A to 43D illustrate examples of screen display of the touch UI of a mobile information terminal.

FIGS. 44A to 44D illustrate examples of screen display of the touch UI of a mobile information terminal.

FIGS. 47A to 47D illustrate examples of screen display of the touch UI of a mobile information terminal.

DESCRIPTION OF THE EMBODIMENTS (First Embodiment)

Figure 1:
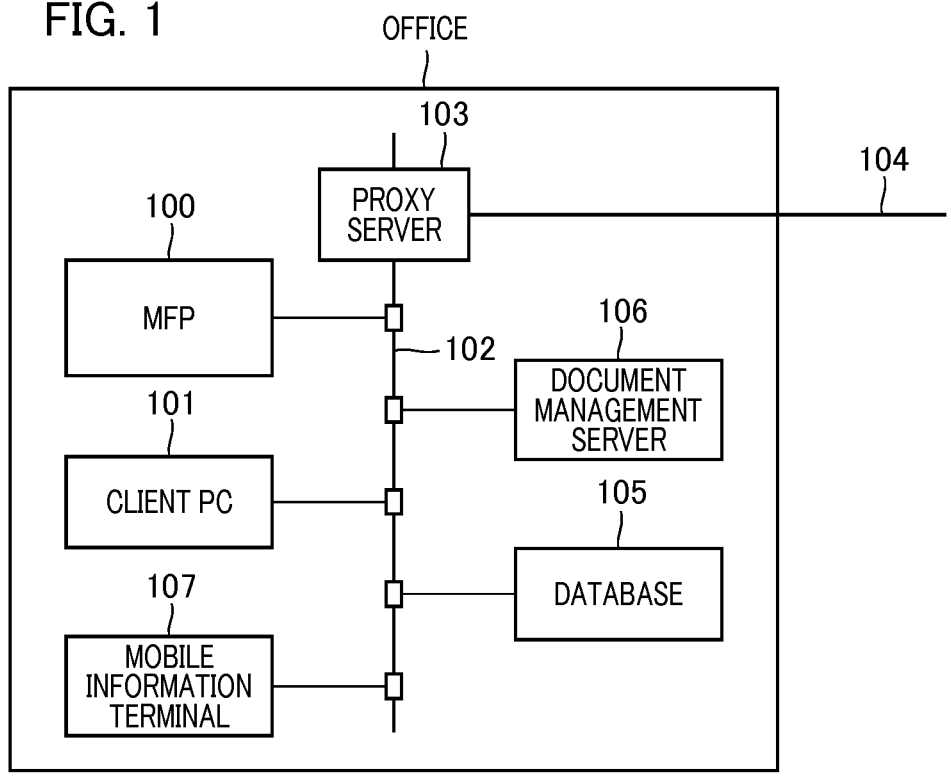
FIG. 1 is a block diagram illustrating an image processing system according to the present invention.

FIG. 1 is a block diagram illustrating a configuration of an image processing system to which the present invention is applied. As shown in FIG. 1, the image processing system includes an MFP 100, a client PC 101, a proxy server 103, a document management server 106, a database 105 for the document management server 106, and a mobile information terminal 107. The MFP 100 is a multifunction peripheral that realizes a plurality of types of functions (copy function, print function, transmission function, and the like). The client PC 101 or the mobile terminal 107 transmits, for example, print data to the MFP 100 to cause the MFP 100 to output a printed material based on the print data. The aforementioned devices are wiredly or wirelessly connected to a LAN 102. The LAN (Local Area Network) 102 is also connected to a network 104 via the proxy server 103. The configuration shown in FIG. 1 is given as an example. A plurality of offices having a similar configuration may also be connected to the network 104.

Each of the client PC 101 and the proxy server 103 includes standard configuration installed in a general-purpose computer. For example, each of the client PC 101 and the proxy server 103 includes a CPU, a RAM, a ROM, a hard disk, a network I/F, a display, a keyboard, a mouse, and the like, where CPU is an abbreviation for Central Processing Unit, RAM is an abbreviation for Random Access Memory, and ROM is an abbreviation for Read Only Memory. The network 104 is typically implemented by any of the Internet, a LAN, a WAN, a telephone line, a leased digital line, an asynchronous transfer mode (ATM) or a frame relay line, a communication satellite line, a cable television line, and a wireless line for data broadcasting, and the like, where WAN is an abbreviation for Wide Area Network. It goes without saying that the network 104 may be a communication network implemented with a combination of these networks as long as data transmission and reception are possible.

Figure 2:
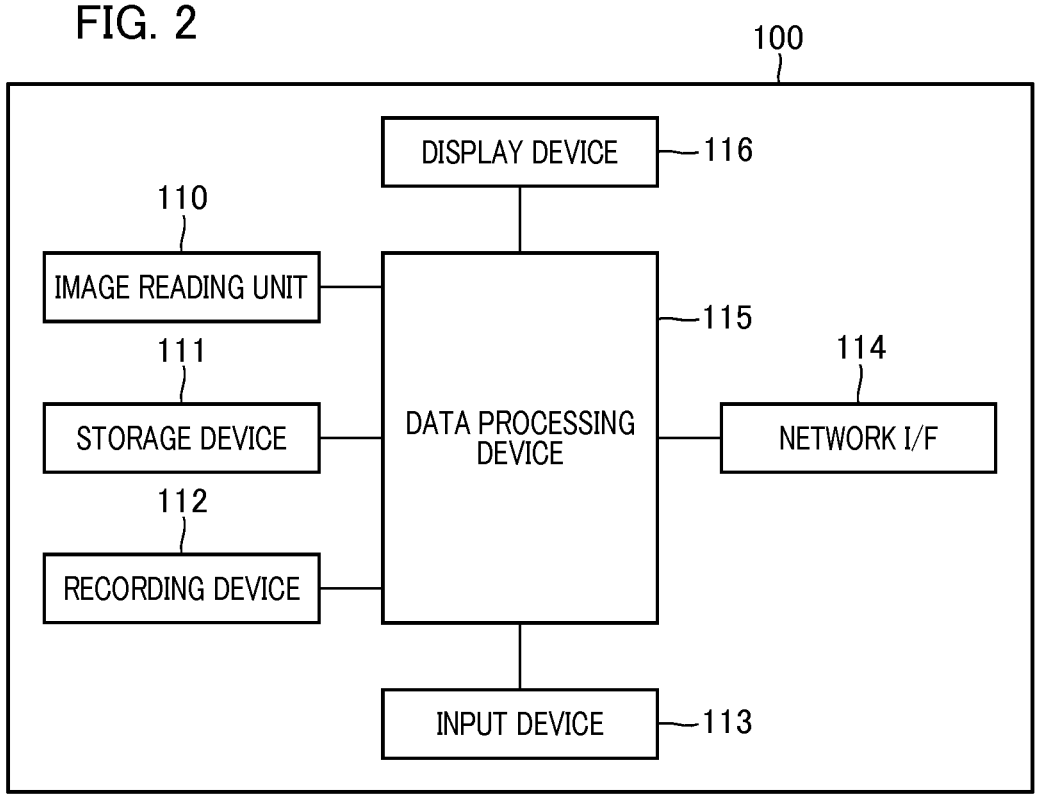
FIG. 2 is a block diagram illustrating a functional configuration of a multifunction peripheral (MFP) shown in FIG. 1.

FIG. 2 is a block diagram illustrating a functional configuration of the MFP 100 shown in FIG. 1. As shown in FIG. 2, the MFP 100 includes an image reading unit 110, a storage device (hereinafter also referred to as "BOX") 111, a recording device 112, a data processing device 115, an input device 113, a display device 116, and a network I/F 114.

The image reading unit 110 has an Auto Document Feeder (hereinafter referred to as "ADF") (not shown), and irradiates images of a bundle of sheets or one sheet with light and then forms a reflected image on a solid-state image sensing element via a lens. The solid-state image sensing element generates an image reading signal having a predetermined resolution (e.g., 600 dots per inch (dpi)) and a predetermined luminance level (e.g., 8 bits), and then generates image data including raster data from the image reading signal. The data processing device 115 converts the bitmap image data generated by the image reading unit 110 into a recording signal by scan image processing to be described below.

The recording device 112 forms an image (outputs a print product) using the recording signal converted by the data processing device 115. When copying a plurality of sheets, the recording device 112 once stores recording signals for one page in the BOX 111, and then sequentially outputs the recording signals to the recording device 112 to thereby form a recording image on recording paper. The BOX 111 has a function capable of storing data generated by rendering data from the image reading unit 110 and PDL data output from the local PC 101 via a driver. The MFP 100 is operated via a key operation unit (input device 113) provided for the MFP 100 and may display the state of operation input by using the display device 116.

When PDL data is transmitted from the client PC 101 (or another general-purpose PC (not shown)) serving as a local PC via the driver, the network I/F 114 receives PDL data via the LAN 102 and the network I/F 114. Then, the recording device 112 records an image based on the received PDL data. Specifically, the PDL data output from the local PC 101 via the driver is input from the LAN 102 to the data processing device 115 via the network I/F 114. Then, after the data processing device 115 interprets and processes the language to convert the PDL data into a recordable recording signal, the MFP 100 can record the recording signal as a recording image on recording paper.

Figure 3A:
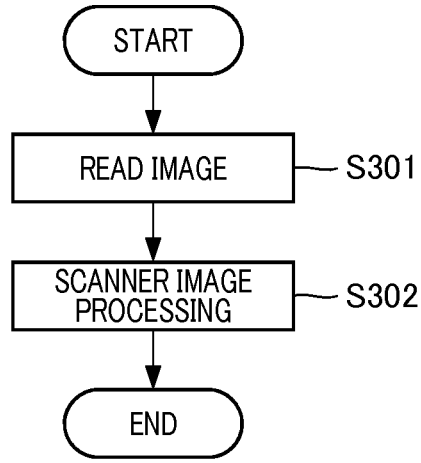
FIGS. 3A and 3B are process flows for converting data into bitmap data.

Next, a description will be given of bitmap image data (document image data) creation with reference to FIGS. 3A and 3B. FIG. 3A is a flowchart for creating bitmap image data using the image reading unit 110 of the MFP 100. When the MFP 100 is used, the image reading unit 110 reads an image in step S301 shown in FIG. 3A. The read image is already bitmap image data. In step S302, scanner image processing depending on the image reading unit 110 is performed for the bitmap image data. The term "scanner image processing" in this context refers to, for example, color processing or filter processing.

Figure 3B:
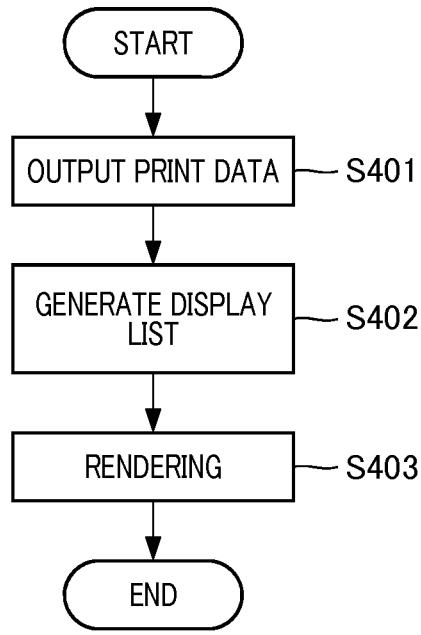

FIG. 3B is a flowchart for creating bitmap image data by application software on the PC 101. In step S401, the data created by using the application software on the PC 101 is converted into print data by a printer driver provided in the PC 101 and then is transmitted to the MFP 100. The term "print data" in this context means PDL and refers to a page description language such as LIPS (Trademark), Postscript (Trademark), or the like. Next, in step S402, the data processing device 115 of the MFP 100 functions as an interpreter that generates a display list. In step S403, the data processing device 115 performs rendering of the display list to thereby generate bitmap image data.

Figure 4A:
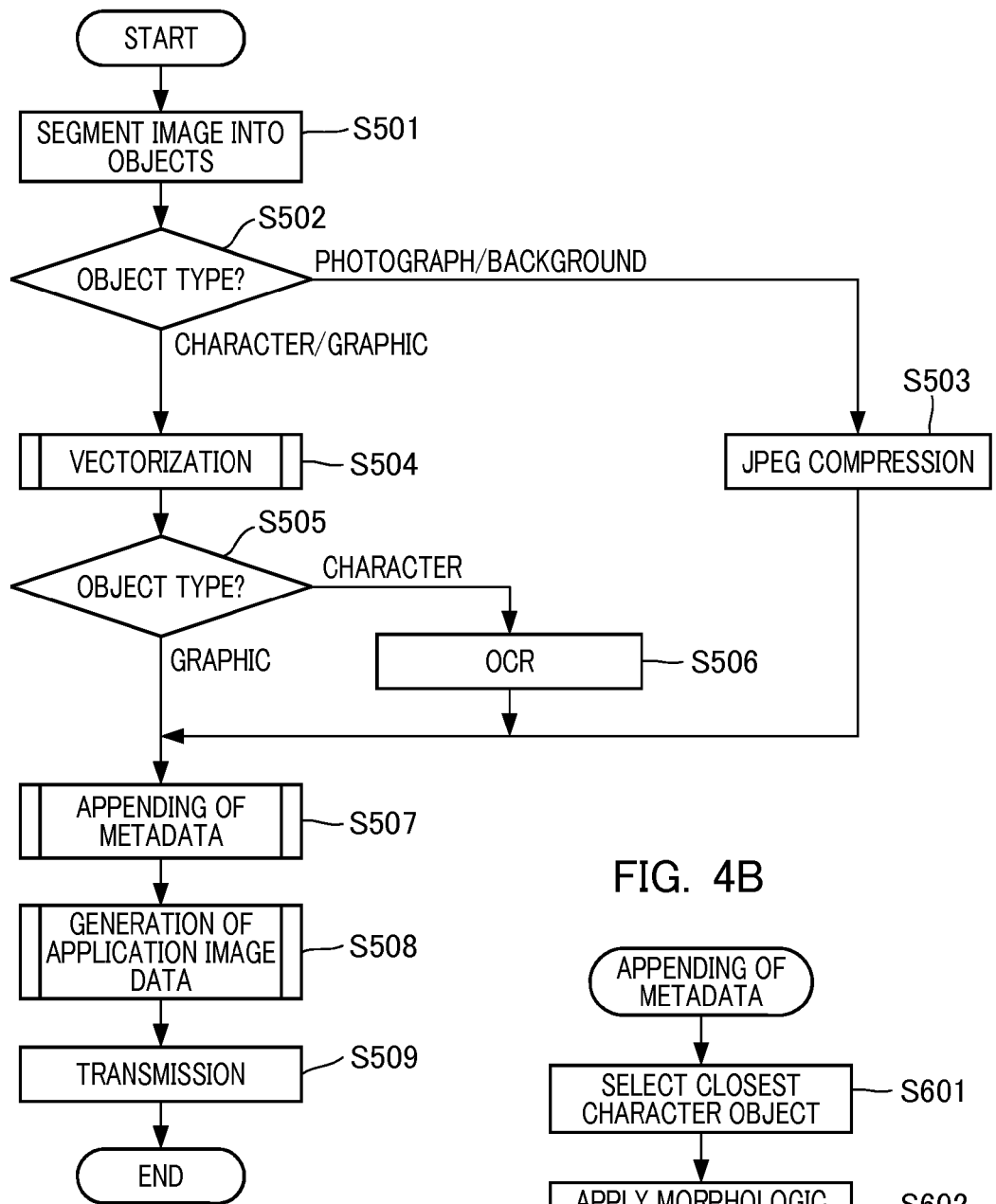
FIG. 4A is a process flow for generating application image data.
Figure 4B:
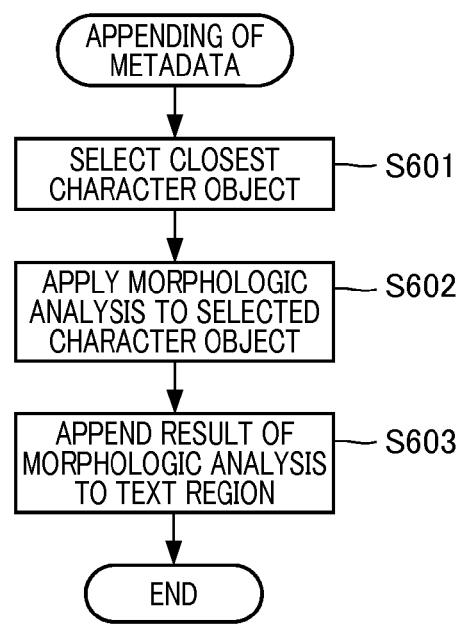
FIG. 4B is a process flow for appending meta information.

Next, a description will be given of an application image data generation flow with reference to FIGS. 4A and 4B. In the flow, the MFP 100 generates data in a predetermined format (hereinafter referred to as "application image data") to be displayed on the mobile terminal 107 from bitmap image data. The bitmap image data is acquired by the image reading unit 110 of the MFP 100. Also, the data processing device 115 within the MFP 100 performs rendering of the document created by application software on the local PC 101 to thereby generate bitmap image data.

Firstly, in step S501, the data processing device 115 applies object segmentation processing to the bitmap image data to segment it into a plurality of objects having respective attributes. In the present embodiment, object attribute types after object segmentation include character, photograph, graphic (drawing, line rendering, table, and line), and background. In step S502, the data processing device 115 determines the object type (character, photograph, graphic, or background) for each segmented object. When an object is determined to be a photograph or background, the process proceeds to step S503, and the data processing device 115 applies JPEG compression to a bitmap image of the relevant object.

On the other hand, when the relevant object is determined to be a character or a graphic, the processing proceeds to step S504, and the data processing device 115 applies vectorization processing to the relevant object to convert it into path data (vector data). Next, in step S505, the data processing device 115 determines whether the relevant object is a character or a graphic. When the relevant object is determined to be a character, in step S506, the data processing device 115 applies optical character recognition (OCR) processing to the relevant object to acquire character-coded data (character code data resulting from the OCR processing).

The data processing device 115 groups the data of each object (JPEG data and vector data) obtained in steps S503 and S504 and the character-coded data obtained in step S506 into one file. Next, in step S507, the data processing device 115 appends optimum metadata to each object. In step S508, the data processing device 115 generates application image data displayable on the mobile terminal 107 based on each object appended with metadata. Finally, in step S509, the data processing device 115 transmits the generated application image data to the mobile terminal 107 via the network I/F.

A description will be given in detail of processing for appending metadata in step S507 shown in FIG. 4A with reference to the flowchart shown in FIG. 4B. Firstly, in step S601, the data processing device 115 selects a closest character object existing around each of segmented objects formed in step S501. Next, in step S602, the data processing device 115 applies morphologic analysis to the selected character object. Next, in step S603, the data processing device 115 appends a word extracted as a result of the morphologic analysis in step S602 to each object as metadata. Metadata can be created not only through the morphologic analysis but also through image feature quantity extraction, syntax analysis, and the like. Furthermore, the data processing device 115 may also create metadata by the following processing. In other words, the data processing device 115 performs similar image search in documents already stored in the BOX 111 incorporated in the MFP 100, documents already stored in the database 105 of the image processing system, and objects contained in these documents. Then, the data processing device 115 performs association with objects of similar images having high similarity.

Next, a detailed description will be given of the object segmentation performed in step S501 with reference to FIGS. 5A, 5B, and 6. FIG. 5A shows an example of the input bitmap image data. FIG. 5B shows an exemplary result of object segmentation processing for segmenting the bitmap image data into a plurality of objects. FIG. 6 shows block information and input file information for each object when the object segmentation is performed.

In step S501, the data processing device 115 applies object segmentation processing to an input image shown in FIG. 5A to segment it into rectangular blocks having respective attributes. The segmented rectangular blocks are shown in FIG. 5B. As described above, rectangular block attributes include character, photograph, and graphic (drawing, line rendering, table, line).

As an exemplary method for object segmentation processing, processing is performed in the following way. Firstly, the data processing device 115 applies monochrome binarization to the image data stored in the RAM (not shown) in the MFP 100 to extract a pixel cluster surrounded by black pixel contours. Furthermore, the data processing device 115 evaluates the size of the black pixel cluster extracted in this way and applies contour tracking to a white pixel cluster in the black pixel cluster having a size of a predetermined value or larger. Then, the data processing device 115 evaluates the size of the white pixel cluster and applies contour tracking to a black pixel cluster in the white pixel cluster. In this way, as long as an inner pixel cluster has a size of the predetermined value or larger, the data processing device 115 recursively performs inner pixel cluster extraction and contour tracking. The size of a pixel cluster is evaluated, for example, in terms of the area of the pixel cluster. The data processing device 115 generates a rectangular block which circumscribes the pixel cluster acquired in this way and determines the attribute based on the size and shape of the generated rectangular block.

For example, a rectangular block whose aspect ratio is nearly 1 and size falls within a certain range is determined as a character-equivalent block which can be a character area rectangular block. When character-equivalent blocks in close vicinity are regularly arrayed, the data processing device 115 generates a new rectangular block by grouping these character-equivalent blocks, and recognizes the new rectangular block as a character area rectangular block. A black pixel block containing a flat pixel cluster or a regularly aligning rectangular white pixel cluster having a size of a predetermined value or larger is considered as a graphic area rectangular block. A pixel cluster having an irregular shape is considered as a photographic area rectangular block.

Next, for each of the rectangular blocks generated in this way, the data processing device 115 generates block information such as attributes and input file information as shown in FIG. 6. As shown in FIG. 6, the block information includes the attribute, position coordinates X and Y, width W, height H, and OCR information for each block. The attribute is represented by a numerical value of 1, 2, and 3 indicating a character area rectangular block, a photographic area rectangular block, and a graphic area rectangular block, respectively. The coordinates X and Y represent the X- and Y-coordinates of the starting point (the coordinates of the top left corner) of each rectangular block in the input image. The width W is the width in the X-coordinate direction of the rectangular block, and the height H is the height in the Y-coordinate direction thereof. The OCR information indicates the presence or absence of pointer information to character-coded data generated by the OCR processing in the step S506. The input file information further includes a total number of blocks (N) which indicates the number of rectangular blocks.

The block information for each rectangular block will be utilized for vectorization in a specific area. When combining a specific area and other areas, the block information enables identifying a relative positional relationship and combining a vectorized area and a bitmap area without impairing the layout of the input image.

Figure 7:
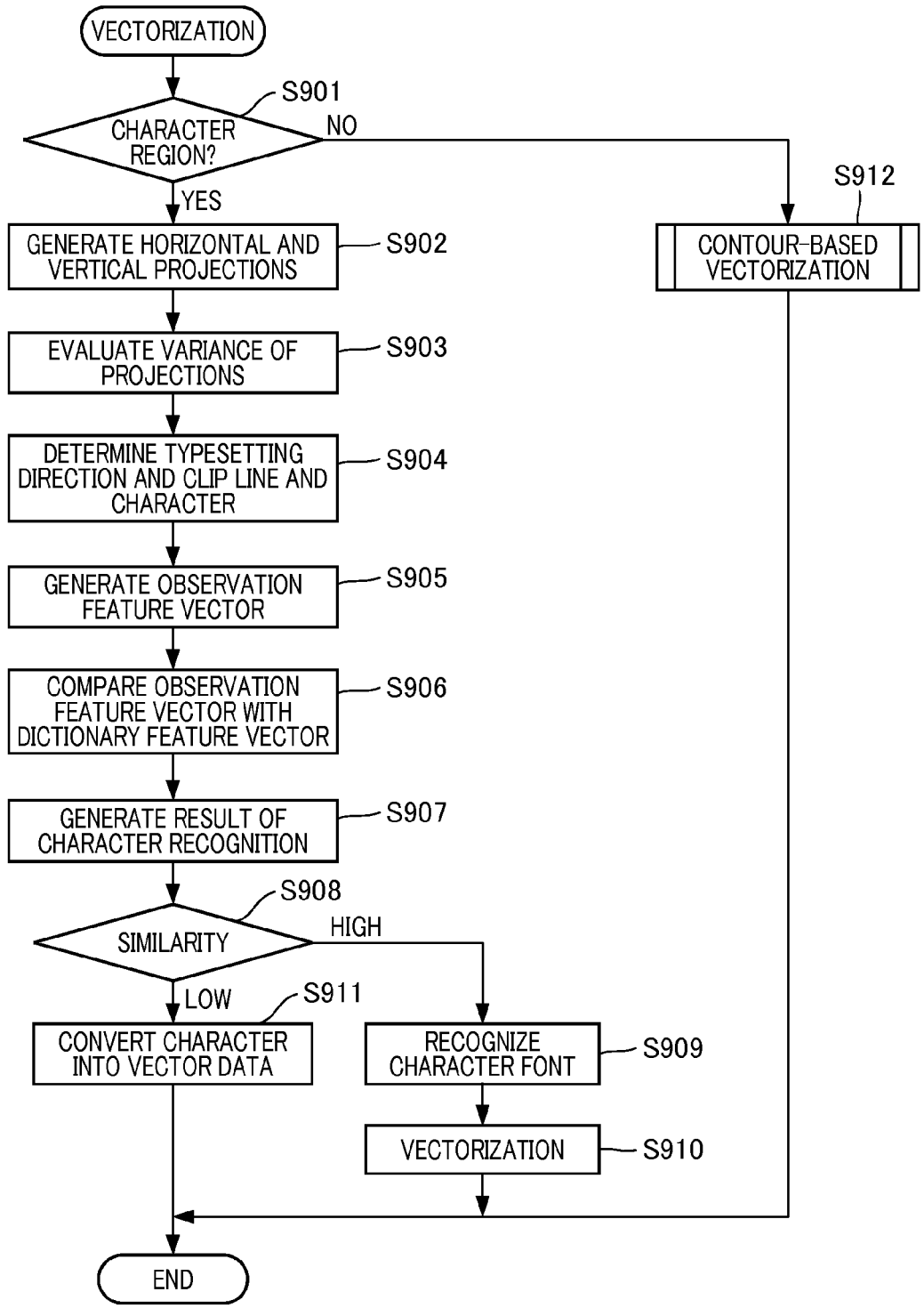
FIG. 7 is a flowchart illustrating vectorization processing.

Next, a detailed description will be given of the vectorization processing in step S504 shown in FIG. 4A with reference to the flowchart shown in FIG. 7. Firstly, in step S901, the data processing device 115 determines whether or not the specific area is a character area rectangular block. When the specific area is determined to be a character area rectangular block, the processing proceeds to step S902 and subsequent steps. On the other hand, when the specific area is determined not to be a character area rectangular block, the processing shifts to step S912.

In steps S902 to S907, the data processing device 115 performs character recognition processing by using a pattern matching method or the like to thereby obtain a corresponding character code. For example, in step S902, the data processing device 115 calculates the horizontal and vertical projections with respect to the pixel values in the specific area in order to determine horizontal/vertical writing direction for the specific area (determination of typesetting direction). Next, in step S903, the data processing device 115 evaluates variance of the projections acquired in step S902. When variance of the horizontal projection is large, the data processing device 115 determines that the typesetting direction is horizontal. When variance of the vertical projection is large, the data processing device 115 determines that the typesetting direction is vertical. In step S904, based on the result of evaluation in step S903, the data processing device 115 determines the typesetting direction, clips a line, and then clips characters to thereby obtain a character image. Specifically, the data processing device 115 decomposes the character image into character strings and characters. In the case of a horizontal writing character area, the data processing device 115 clips a line based on the horizontal projection and clips characters based on the vertical projection for the clipped line. In the case of a vertical writing character area, the data processing device 115 performs processing in reverse way (i.e., the data processing device 115 clips a line based on the vertical projection and clips characters based on the horizontal projection for the clipped line). When clipping a line and characters, the character size can also be detected.

Next, in step S905, for each character clipped in step S904, the data processing device 115 generates an observation feature vector by converting the feature acquired from the character image into a numerical sequence having several tens dimensions. There are various known techniques for extracting a feature vector. For example, a certain technique segments a character in a mesh pattern, counts the number of character lines in each mesh as a line element in each direction, and creates mesh several-dimensional vector as a feature vector.

In step S906, the data processing device 115 compares the observation feature vector acquired in step S905 with the dictionary feature vector acquired in advance for each font type to thereby calculate the distance between the observation feature vector and the dictionary feature vector. In step S907, the data processing device 115 evaluates the distance calculated in step S906 and considers the font type having the shortest distance as a recognition result. Next, in step S908, the data processing device 115 determines whether or not the shortest distance acquired in the distance evaluation in step S907 is greater than a predetermined value, i.e., determines the similarity. When the shortest distance is determined to be more than a predetermined value (low similarity), the character may possibly be erroneously recognized as others having a similar shape in the dictionary feature vector. Accordingly, when the shortest distance is determined to be more than a predetermined value (low similarity), the data processing device 115 does not adopt the recognition result in step S907, and the processing proceeds to step S911. When the shortest distance is determined to be smaller than a predetermined value (high similarity), the data processing device 115 adopts the recognition result in step S907, and the processing proceeds to step 909.

In step S909, the data processing device 115 recognizes the type of character font. A plurality of sets of dictionary feature vectors for the number of font types used in character recognition is prepared in correspondence with character shape types, i.e., font types. At the time of pattern matching, the font type is output together with the character code to enable character font recognition. Next, in step S910, the data processing device 115 converts each character into vector data by using the character code and font information obtained by character recognition and font recognition and outline data prepared for each character in advance. When the input image is a color image, the data processing device 115 extracts the color of each character from the color image and then records the color together with the vector data.

On the other hand, in step S911, the data processing device 115 outlines the character by handling it in a similar way to graphics. Specifically, for characters which are highly likely to be erroneously recognized, the data processing device 115 generates outline vector data apparently conforming to the bitmap data. When the specific area is not a character area rectangular block (i.e., when the specific area is a graphic area rectangular block), in step S912, the data processing device 115 executes the vectorization processing based on the contour of the image. The above-described processing enables converting image information belonging to the character and graphic area rectangular blocks into vector data.

Figure 8A:
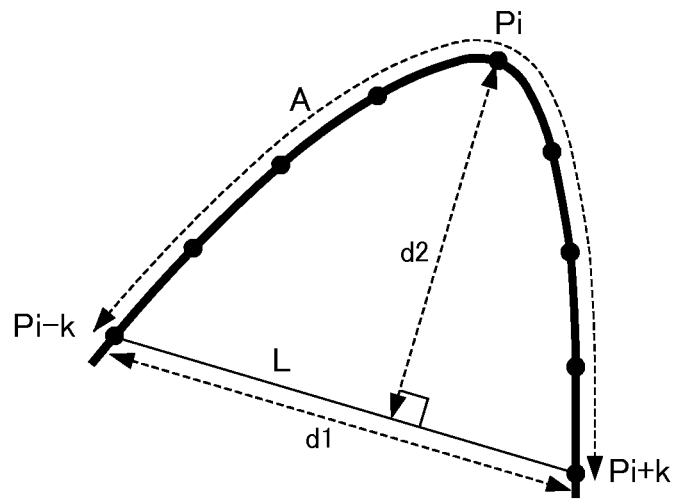
FIG. 8A illustrates corner extraction processing in the vectorization processing.
Figure 8B:
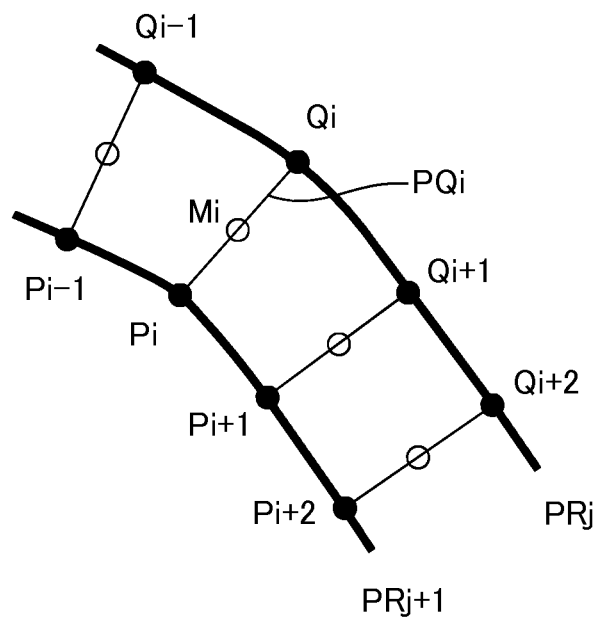
FIG. 8B illustrates contour lines grouping processing in the vectorization processing.
Figure 9:
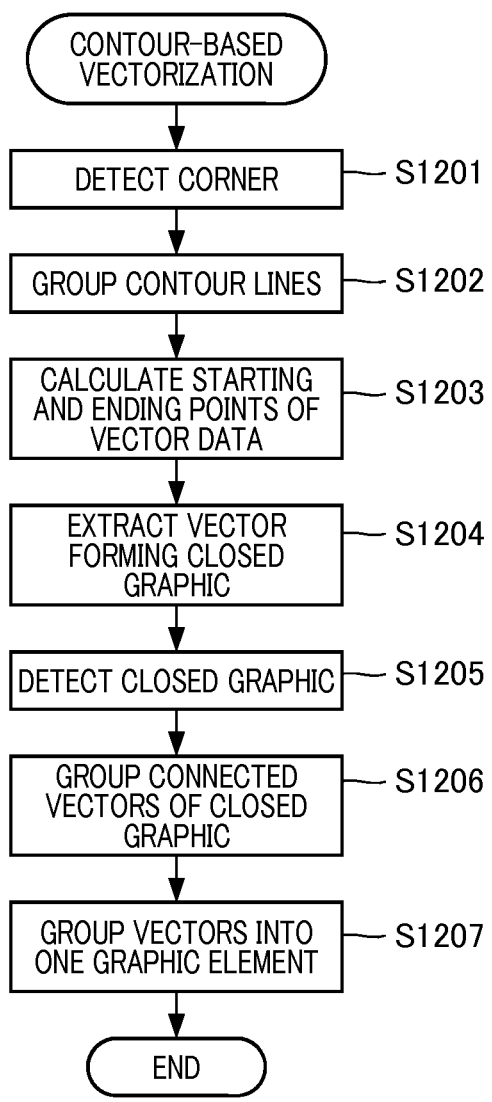
FIG. 9 is a flowchart illustrating contour-based vectorization processing.

A detailed description will be given of the vectorization processing applied to the graphic area rectangular block in step S912 with reference to FIGS. 8A, 8B, and 9. The data processing device 115 applies the vectorization processing to the graphic area rectangular block based on the contours of the black pixel clusters extracted in the relevant area. FIG. 8A is a diagram illustrating corner extraction processing in the vectorization processing. FIG. 8B is a diagram illustrating contour lines grouping processing in the vectorization processing. FIG. 9 is a flowchart illustrating in detail the vectorization processing for a graphic area.

In step S1201 shown in FIG. 9, the data processing device 115 detects a "corner" which segments a curve into a plurality of sections (pixel lines) in order to represent a line rendering or the like as a combination of straight lines and/or curves. A corner refers to a point at which the curvature is maximized. As shown in FIG. 8A, the data processing device 115 determines whether or not a pixel Pi on a curve is a corner in the following way. Specifically, pixels Pi−k and Pi+k which are separated from the pixel Pi as a starting point by a predetermined number of pixels (k pixels) in two directions, respectively, along the curve are connected with a line segment L. Let d1 be the distance between the pixels Pi−k and Pi+k, d2 be the distance between the line segment L and the pixel Pi, and A be the length of the arc of the curve between the pixels Pi−k and Pi+k. When the distance d2 is maximized or when a ratio (d1/A) is equal to or less than a threshold value, the data processing device 115 determines the pixel Pi as a corner. The data processing device 115 approximates the pixel lines segmented by the corner to a straight line or a curve. The approximation to a straight line is made by using the least squares method or the like and the approximation to a curve is made by using the cubic spline function or the like. The pixel of the corner segmenting the pixel lines serves as a starting or ending point of the approximation straight line or approximation curve.

Furthermore, the data processing device 115 determines whether or not an inner contour of a white pixel cluster exists in the vectorized contour. When an inner contour is determined to exist, the data processing device 115 vectorizes the inner contour. Similarly, as long as an inner contour exists, the data processing device 115 recursively vectorizes an inner contour of an inverted pixel. As described above, the use of the contour segmentation line approximation enables vectorizing the outline of a graphic having any shape. When the original document is colored, the data processing device 115 extracts colors of graphics from the color image and records the colors together with the vector data.

In step S1202, when the contour lines acquired in step S1201 are in close vicinity, the data processing device 115 groups these contour lines to form a line having a thickness. As shown in FIG. 8B, when an outer contour PRj is in close vicinity of an inner contour PRj+1 or another outer contour in a certain target section, the data processing device 115 can group two or more contour lines and represent them as a line having a thickness. For example, the data processing device 115 calculates a distance PQi from each pixel Pi on a contour PRj+1 to a pixel Qi which is arranged at the shortest distance on a contour PRj. With a small variance in the distance PQi, the data processing device 115 may approximate the target section by using a straight line or curve extending along a point sequence of a midpoint Mi between pixels Pi and Qi. The thickness of the approximation straight line or approximation curve is considered to be, for example, the average of the distance PQi. Considering tabular ruled lines (lines and a set of lines) as a set of lines having a thickness enables efficient vector expression.

In step S1203, the data processing device 115 calculates starting and ending points of each piece of vector data. In step S1204, the data processing device 115 detects graphic elements by using the starting point information and the ending point information acquired in step S1203. A graphic element refers to a closed graphic formed of sectioned lines. To detect a graphic element, the data processing device 115 connects vectors at the pixel of the common corner which serves as starting and ending points. Specifically, this processing is based on a principle that each of vectors forming a closed shape has connecting vectors at both ends.

In step S1205, the data processing device 115 removes unnecessary vectors not connecting with both ends based on the vector data to thereby extract only vectors forming the closed graphic. In step S1206, starting with one end point (starting or ending point) of any one vector, the data processing device 115 sequentially searches for each of the vectors forming the closed graphic in a fixed direction, for example, in the clockwise direction. Specifically, at the other end point of the relevant vector, the data processing device 115 searches for an end point of other vector, and considers the closest end point within a predetermined distance as an end point of a connection vector. When the data processing device 115 completes search for all of the vectors forming the closed graphic and returns to the starting point, the data processing device 115 groups all of the traced vectors as a closed graphic forming a graphic element. The data processing device 115 also groups all of the vectors forming the closed graphic existing in the closed graphic. The data processing device 115 further repeats similar processing starting with the starting point of a vector which has not yet been grouped.

In step S1207, out of unnecessary vectors removed in step S1205, the data processing device 115 detects a vector having an end point close to any vector grouped as a closed graphic in step S1206, and groups the detected vector as a graphic element. This enables grouping other graphic elements exiting in the graphic elements or sectioned lines to form a graphic object. Further, when other graphic elements or sectioned lines do not exist in the graphic element, the data processing device 115 considers the graphic element as a graphic object. The above-described processing enables converting the graphic area rectangular block into a vectorized object.

Figure 10A:
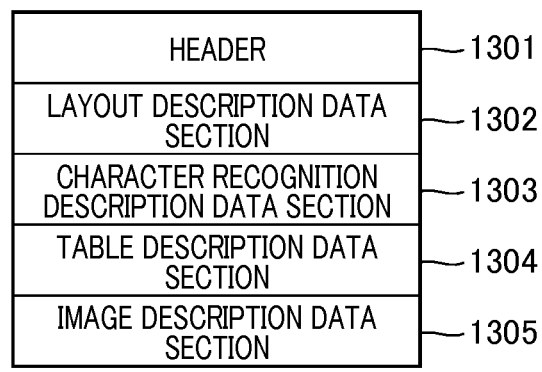
FIG. 10A is a map illustrating data as a result of vectorization processing.
Figure 10B:
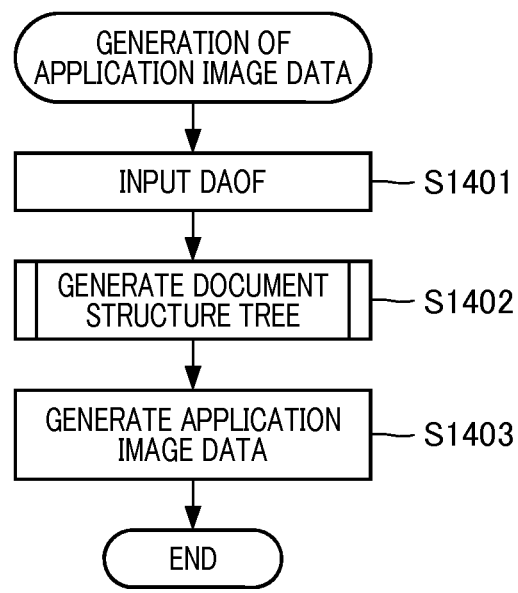
FIG. 10B is a flowchart illustrating application image data generation processing.

Next, a detailed description will be given of processing for generating application image data in step S508 with reference to FIGS. 10A and 10B. FIG. 10A is a map of a data configuration resulting from the vectorization processing according to the present embodiment. FIG. 10B is a flowchart illustrating application image data generation processing in detail.

Firstly, in step S1401, the data processing device 115 acquires intermediate data generated by the vectorization processing in step S504. In the present embodiment, the MFP 100 stores the intermediate data in a format, i.e., in a so-called document analysis output format (hereinafter referred to as "DAOF") in the storage device 112. As shown in FIG. 10A, the DAOF data includes a header 1301, a layout description data section 1302, a character recognition description data section 1303, a table description data section 1304, and an image description data section 1305.

The header 1301 stores information about an input image to be processed. The layout description data section 1302 stores information about the attribute of a rectangular block in the input image, such as character, graphic (line rendering, drawing, table, and line), photograph, and the like, and positional information of the rectangular block with recognized attribute. The character recognition description data section 1303 stores a result of character recognition obtained through character recognition out of the character area rectangular blocks. The table description data section 1304 stores a detailed table structure of a graphic area rectangular block having the table attribute. In the specific area where the vectorization processing is instructed, the image description data section 1305 stores the internal structure of a block acquired through the vectorization processing and data set indicating the image shape, character code, and the like. On the other hand, in rectangular blocks other than the specific area not subjected to the vectorization processing, the image description data section 1305 stores bitmap image data itself segmented into objects.

Next, in step S1402, the data processing device 115 generates a document structure tree to be described below. In step S1403, the data processing device 115 acquires actual data in the DAOF based on the generated document structure tree to thereby generate application image data to be described below.

Figure 11:
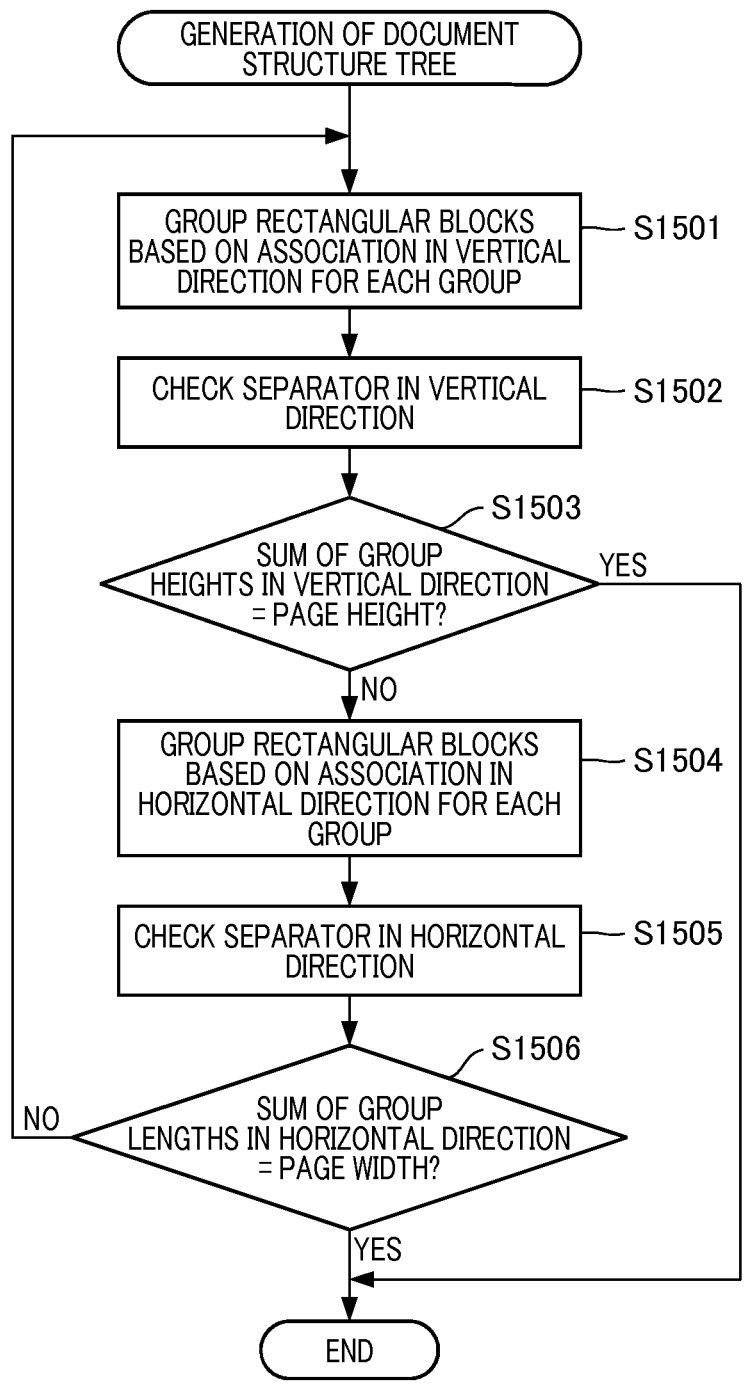
FIG. 11 is a flowchart illustrating document structure tree generation processing.
Figure 12A:
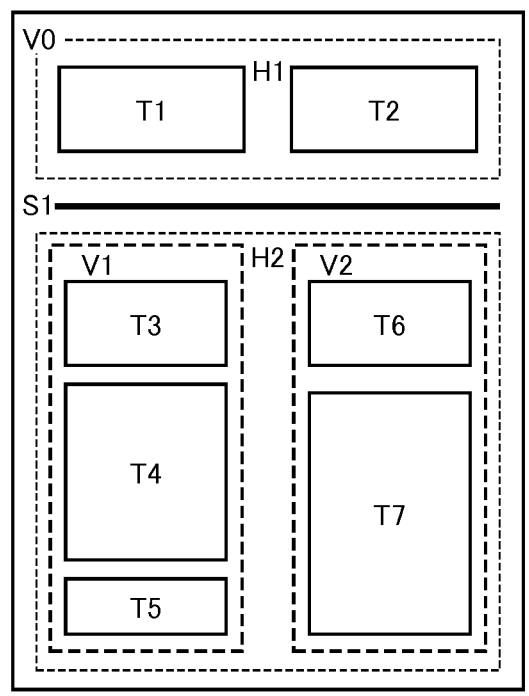
FIG. 12A is a diagram illustrating a document subjected to the document structure tree generation processing.
Figure 12B:
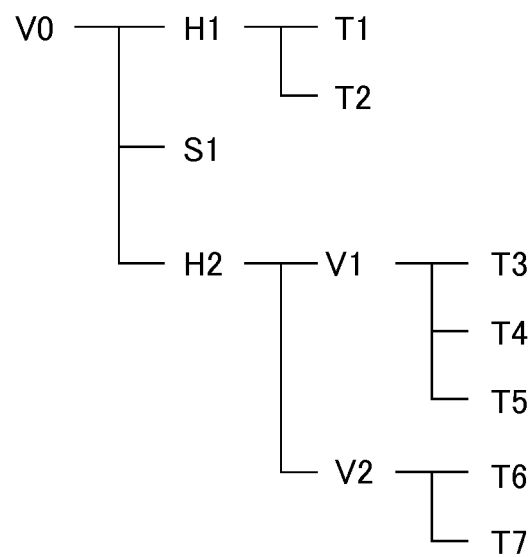
FIG. 12B is a diagram illustrating a document structure tree generated by the processing shown in FIG. 12A.

Next, a description will be given of processing for generating a document structure tree in step S1402 with reference to FIGS. 11, 12A, and 12B. FIG. 11 is a flowchart illustrating the document structure tree generation processing. FIG. 12A is a diagram illustrating an exemplary document subjected to the document structure tree generation processing. FIG. 12B is a diagram illustrating a document structure tree generated by the document structure tree generation processing.

As a basic rule for overall control in the document structure tree generation processing shown in FIG. 11, the flow of processing shifts from a micro block (single rectangular block) to a macro block (set of rectangular blocks). Hereinafter, the term "rectangular block" means both the micro block and the macro block.

Firstly, in step S1501, the data processing device 115 re-groups rectangular blocks based on the association in the vertical direction on a rectangular block basis. Although the processing shown in FIG. 15 may be repetitively executed, the data processing device 115 makes determination on a micro block basis immediately after start of the grouping processing. Here, the association is defined by such features as a short distance and almost the same block width (block height in the case of horizontal direction). The data processing device 115 extracts information such as the distance, width, and height with reference to the DAOF.

For example, referring to a document shown in FIG. 12A, rectangular blocks T1 and T2 are horizontally arranged at the top. A horizontal-direction separator S1 exists under the rectangular blocks T1 and T2. Rectangular blocks T3, T4, T5, T6, and T7 exist under the horizontal-direction separator S1. The rectangular blocks T3, T4, and T5 are vertically arranged on the left half of the area under the horizontal-direction separator S1. The rectangular blocks T6 and T7 are vertically arranged on the right half of the area under the horizontal-direction separator S1. When the data processing device 115 executes the grouping processing based on the association in the vertical direction in step S1501, the rectangular blocks T3, T4, and T5 are grouped into a group (rectangular block) V1, and the rectangular blocks T6 and T7 are grouped into another group (rectangular block) V2. The groups V1 and V2 belong to the same hierarchical level.

Next, in step S1502, the data processing device 115 checks the presence or absence of a vertical-direction separator. A separator is an object having the line attribute in the DAOF, and has a function of explicitly segmenting a block. When a separator is detected, the data processing device 115 segments the area of the input image into right and left parts by using the separator as a boundary in the target hierarchical level. No vertical-direction separator exists in the exemplary document shown in FIG. 12A.

Next, in step S1503, the data processing device 115 determines whether or not the sum of group heights in the vertical direction is equal to the height of the input image. Specifically, when the data processing device 115 performs horizontal-direction grouping while moving the target area in the vertical direction (e.g., from the top downward) and completes the processing for the entire input image, the data processing device 115 determines whether or not the processing ends using the fact that the sum of group heights is equal to the height of the input image. When grouping is determined to be completed, the data processing device 115 ends the processing, whereas when grouping is determined not to be completed, the processing proceeds to step S1504.

Next, in step S1504, the data processing device 115 executes the grouping processing based on the association in the horizontal direction. Thus, for example, the rectangular blocks T1 and T2 shown in FIG. 12A are grouped into a group (rectangular block) H1, and the rectangular blocks V1 and V2 are grouped into a group (rectangular block) H2. The groups H1 and H2 belong to the same hierarchical level. Also in this case, the data processing device 115 makes determination on a micro block basis immediately after start of the grouping processing.

Next, in step S1505, the data processing device 115 checks the presence or absence of a horizontal-direction separator. When a horizontal-direction separator is detected, the data processing device 115 vertically segments the area of the input image by using the separator as a boundary in the target hierarchical level. As shown in FIG. 12A, the horizontal-direction separator S1 exists. The data processing device 115 registers a result of the above-described processing as a document structure tree shown in FIG. 12B.

As shown in FIG. 12B, input 1-page bitmap image data V0 has the groups H1 and H2 and the separator S1 in the highest hierarchical level. The rectangular blocks T1 and T2 in the second hierarchical level belong to the group H1. The groups V1 and V2 in the second hierarchical level belong to the group H2. The rectangular blocks T3, T4, and T5 in the third hierarchical level belong to the group V1. The rectangular blocks T6 and T7 in the third hierarchical level belong to the group V2. In the present embodiment, V0 indicates a page, and other elements in the hierarchies under the page V0 are all objects.

Finally, in step S1506, the data processing device 115 determines whether or not the sum of group lengths in the horizontal direction is equal to the width of the input image to thereby determine whether or not horizontal-direction grouping is completed. When the sum of group lengths in the horizontal direction is determined to be equal to the page width, the document structure tree generation processing ends. When the sum of group lengths in the horizontal direction is determined not to be equal to the page width, the processing returns to step S1501, and the data processing device 115 repeats the above-described processing again from association check in the vertical direction in the higher hierarchical level.

FIG. 13 shows an exemplary format of application image data. In the present embodiment, a description will be given by using the Scalable Vector Graphics (hereinafter referred to as "SVG") format as the format of the application image data.

In FIG. 13, notations for objects are enclosed by frames 1801, 1802, and 1804 for description. Each object has area information indicating an area of the object, and a rendering element acquired from actual data in the DAOF. Further, objects having only the area information and no rendering element (e.g., H1, H2, V1, and V2 shown in FIG. 12B) are also possible. Reference numeral 1801 denotes a photograph attribute. The photograph attribute indicates area information about an area of a photographic object and bitmap information as a rendering element. Reference numeral 1802 denotes a character attribute. The character attribute indicates vector data of a character object, and reference numeral 1803 denotes character code data obtained by the OCR processing in step S506 and its character size obtained by the vectorization processing in step S504. The typesetting direction (vertical writing or horizontal writing) of the character area obtained by the vectorization processing in step S504 can also be described. Reference numeral 1804 denotes a graphic object such as a line rendering. Although, in the present embodiment, the application image data is described in the SVG format, the format is not limited thereto and may be any image format which enables describing and maintaining the meaning and structure of the document.

Figure 14:
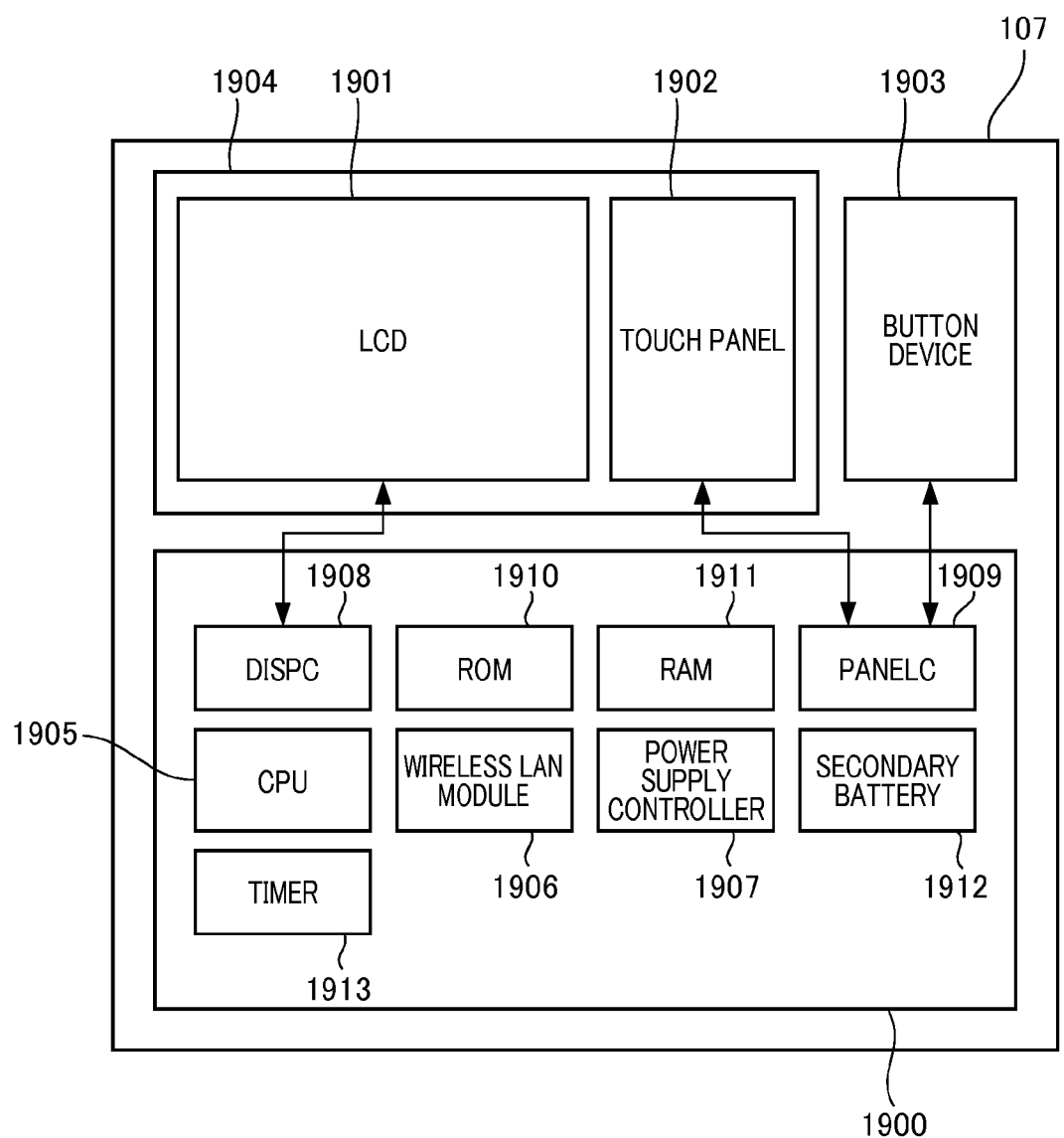
FIG. 14 is a block diagram illustrating a configuration of a mobile terminal.

FIG. 14 is a block diagram illustrating an exemplary hardware configuration of the mobile terminal 107 which functions as the image display apparatus according to the present embodiment. The mobile terminal 107 includes a main board 1900, a liquid crystal display (LCD) 1901, a touch panel 1902, and a button device 1903. The LCD 1901 and the touch panel 1902 are collectively referred to as a touch UI 1904.

The main board 1900 includes a central processing unit (CPU) 1905, a wireless LAN module 1906, a power supply controller 1907, and a display controller (DISPC) 1908. The main board 1900 further includes a panel controller (PANELC) 1909, a read-only memory (ROM) 1910, a random access memory (RAM) 1911, a secondary battery 1912, and a timer 1913. The modules 1905 to 1913 are connected with each other via a bus (not shown).

The CPU 1905 is a processor that controls each device connected to the bus and expands and executes a software module 2000 (to be described below with reference to FIG. 15) stored in the ROM 1910 on the RAM 1911. The RAM 1911 functions as a main memory and a work area for the CPU 1905, an area for video image to be displayed on the LCD 1901, and a storage area of the application image data transmitted from the MFP 100.

The display controller (DISPC) 1908 switches video image output expanded on the RAM 1911 at high speed and outputs a synchronizing signal to the LCD 1901 in response to a request from the CPU 1905. As a result, the video image in the RAM 1911 is output to the LCD 1901 in synchronization with the synchronizing signal of the DISPC 1908, and a relevant image is displayed on the LCD 1901.

The panel controller (PANELC) 1909 controls the touch panel 1902 and the button device 1903 in response to a request from the CPU 1905. With this control, a position pressed on the touch panel 1902 by an indicator such as a user's finger or a pointing device (stylus pen) and the key code of a key pressed on the button device 1903 are notified to the CPU 1905. Information about the pressed position includes a coordinate value (hereinafter referred to as "x-coordinate") indicating the absolute position on the touch panel 1902 in the horizontal direction and a coordinate value (hereinafter referred to as "y-coordinate") indicating the absolute position thereon in the vertical direction. The touch panel 1902 is capable of detecting positions of a plurality of pressed points and notifying information about the pressed positions for the number of pressed points to the CPU 1905.

The power supply controller 1907 is connected with an external power supply (not shown) to receive the power supplied therefrom. The power supply controller 1907 supplies the power to the entire mobile terminal 107 while charging the secondary battery 1912 connected to the power supply controller 1907. When no power is supplied from the external power supply, the secondary battery 1912 supplies the power to the entire mobile terminal 107.

The wireless LAN module 1906 establishes wireless communication with wireless LAN modules on wireless access points (not shown) connected to the LAN 102 to serve as an intermediate for communication with the devices shown in FIG. 1 such as the mobile terminal 107, the MFP 100, and the like under the control of the CPU 1905. An example of the wireless LAN module 1906 is IEEE802.11b.

Figure 15:
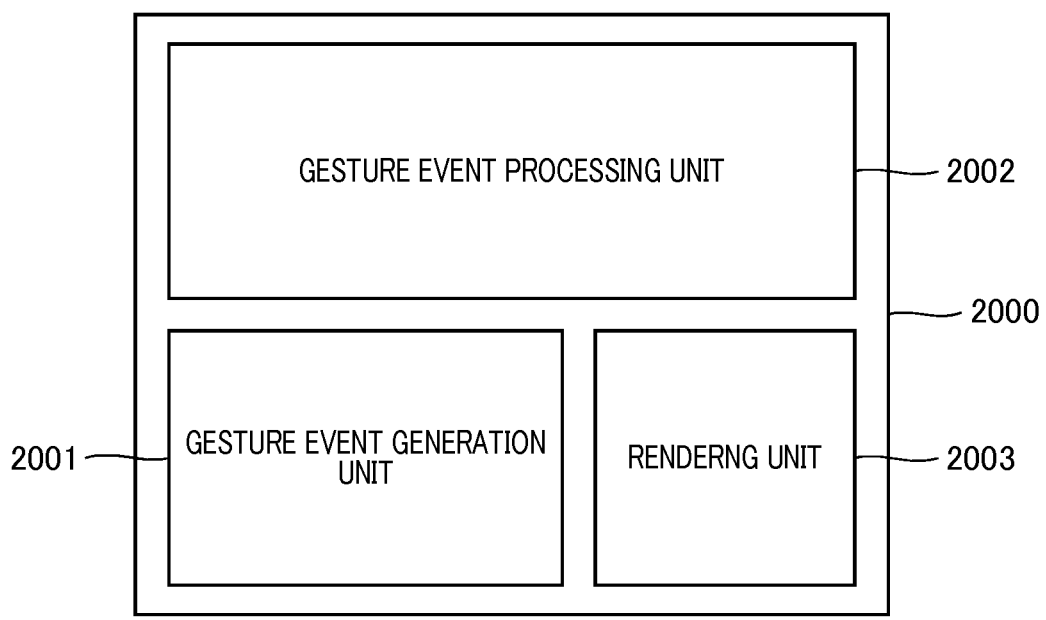
FIG. 15 is a block diagram illustrating a software module configuration of the mobile terminal.

The timer 1913 generates a timer interrupt to a gesture event generation unit 2001 shown in FIG. 15 under the control of the CPU 1905. The gesture event generation unit 2001 will be described below. In the mobile terminal 107, a geomagnetic sensor and an acceleration sensor (none of which are shown) are connected to a bus. The timer 1913 detects the inclination of the mobile terminal 107 under the control of the CPU 1905. When the inclination of the mobile terminal 107 is more than a predetermined value, the timer 1913 changes the orientation of the mobile terminal 107, and sends an instruction for performing rendering on the LCD 1901 to a rendering unit 2003. When the timer 1913 changes the orientation of the mobile terminal 107, the CPU 1905 switches the width and height of the LCD 1901 to thereby perform the subsequent processing.

FIG. 15 is a block diagram illustrating a configuration of the software module 2000 executed by the CPU 1905 of the mobile terminal 107. A description will be given of modules constituting the software module 2000. As shown in FIG. 15, the software module 2000 includes a gesture event generation unit 2001, a gesture event processing unit 2002, and a rendering unit 2003.

The gesture event generation unit 2001 generates various gesture events to be described below in response to a user's touch input. The gesture event generation unit 2001 transmits a generated gesture event to the gesture event processing unit 2002. Upon reception of the gesture event generated by the gesture event generation unit 2001, the gesture event processing unit 2002 executes processing based on the received gesture event and the document structure described in the application image data. The rendering unit 2003 draws and displays the application image data transmitted from the MFP 100 based on a result of execution by the gesture event processing unit 2002 on the LCD 1901. A method for displaying the application image data will be described below.

FIGS. 16A, 16B, 16C, 16D, 16E, 16F, 16G, 16H, 16I, 16J, 16K, and 16L illustrate names of gesture events generated by the gesture event generation unit 2001 and information about each event to be transmitted from the gesture event generation unit 2001 to the gesture event processing unit 2002.

FIG. 16A illustrates a touch press event. When this event occurs, the latest coordinate values of the touch coordinates and the number of touch coordinates are transmitted to the gesture event processing unit 2002. The touch coordinates refer to coordinates for one point on the touch panel 1902 on which the user's finger touches and has a pair of coordinate values represented by X- and Y-coordinates. The number of touch coordinates indicates the number of touch coordinates on the touch panel 1902 on which the user's finger touches. The touch coordinates are updated when the user's finger touches the touch panel 1902, when the finger moves thereon, when the finger separates therefrom, and when an interrupt from the timer 1913 occurs.

FIG. 16B illustrates a swipe event. When this event occurs, coordinate values of the latest touch coordinates, and a moving distance calculated based on a difference between the latest and preceding coordinate values are transmitted to the gesture event processing unit 2002. Here, a swipe refers to a motion of moving the fingertip in any one direction (similar to a sliding motion) while keeping in contact with the touch panel 1902.

FIG. 16C illustrates a pinch-in event. When this event occurs, center coordinate values of the latest touch coordinates of two points and a pinch-in reduction rate calculated based on a reduced distance of a straight line connecting the touch coordinates of the two points are transmitted to the gesture event processing unit 2002 Here, a pinch-in refers to a motion of bringing the two fingertips mutually close (similar to a nipping motion) while keeping in contact with the touch panel 1902.

FIG. 16D illustrates a pinch-out event. When this event occurs, center coordinate values of the latest touch coordinates of two points and a pinch-out enlargement rate calculated based on an enlarged distance of a straight line connecting the touch coordinates of the two points are transmitted to the gesture event processing unit 2002. Here, a pinch-out refers to a motion of bringing the two fingertips mutually apart (similar to a spreading motion) while keeping in contact with the touch panel 1902.

FIG. 16E illustrates a two-point swipe event. When this event occurs, coordinate values of the latest touch coordinates of two points and a moving distance calculated based on a difference between the latest and preceding coordinate values of the touch coordinates of the two points are transmitted to the gesture event processing unit 2002. The two-point swipe event occurs when touch coordinates of the two points move in the same direction.

FIG. 16F illustrates a rotate event. When this event occurs, rotation center coordinate values calculated based on the latest touch coordinates of two points and a rotational angle calculated based on the latest and preceding coordinate values of the touch coordinates of the two points are transmitted to the gesture event processing unit 2002. Here, a rotate refers to a motion of rotating the two fingertips with respect to the touch panel 1902 while keeping in contact therewith.

FIG. 16G illustrates a flick event. When this event occurs, coordinate values of the latest touch coordinates and a moving speed of the finger calculated based on the latest and preceding coordinate values are transmitted to the gesture event processing unit 2002. Here, a flick refers to a motion of separating from the touch panel 1902 (similar to a bouncing motion) during the swipe operation.

FIG. 16H illustrates a touch release event. When this event occurs, coordinate values of the latest touch coordinates when the user's finger separates from the touch panel 1902, and the number of coordinates are transmitted to the gesture event processing unit 2002.

FIG. 16I illustrates a double-tap event. When this event occurs, coordinate values of the latest touch coordinates are transmitted to the gesture event processing unit 2002. Here, a double-tap refers to an event in which a single-tap event to be described below occurs within a predetermined time duration.

FIG. 16J illustrates a single-tap event. When this event occurs, coordinate values of the latest touch coordinates are transmitted to the gesture event processing unit 2002. Here, a single-tap refers to an event in which the above-described touch press event occurs and subsequently the touch release event occurs within a predetermined time duration.

FIG. 16K illustrates a long-tap event. When this event occurs, coordinate values of the latest touch coordinates are transmitted to the gesture event processing unit 2002. Here, a long-tap refers to an event in which the above-described touch press event occurs and, after a predetermined time duration has elapsed, the touch release event occurs.

FIG. 16L illustrates a touch-and-hold event. When this event occurs, coordinate values of the latest touch coordinates are transmitted to the gesture event processing unit 2002. Here, a touch-and-hold refers to an event in which, once the user's finger touches the touch panel 1902, a predetermined time duration has elapsed keeping the user's finger in contact therewith without moving.

Although, in the above-described examples, the user uses the finger for touch input, a stylus pen or the like may be used for touch input.

Figure 17:
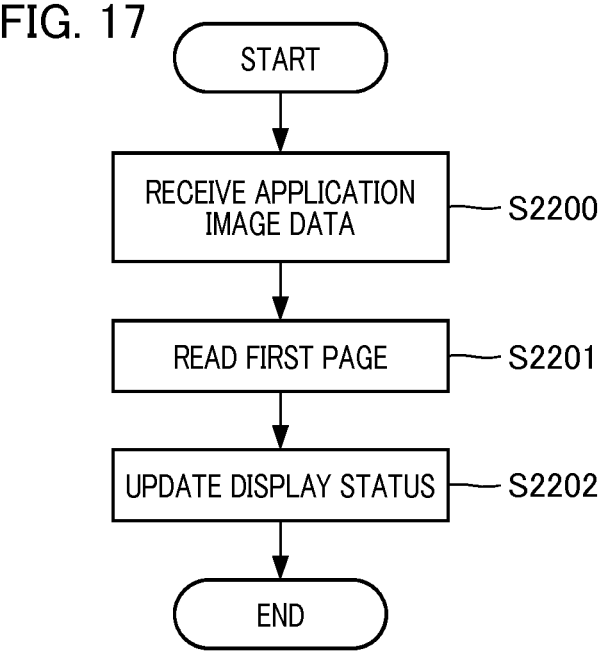
FIG. 17 is a flowchart illustrating processing executed when the mobile terminal receives the application image data.
Figure 18:
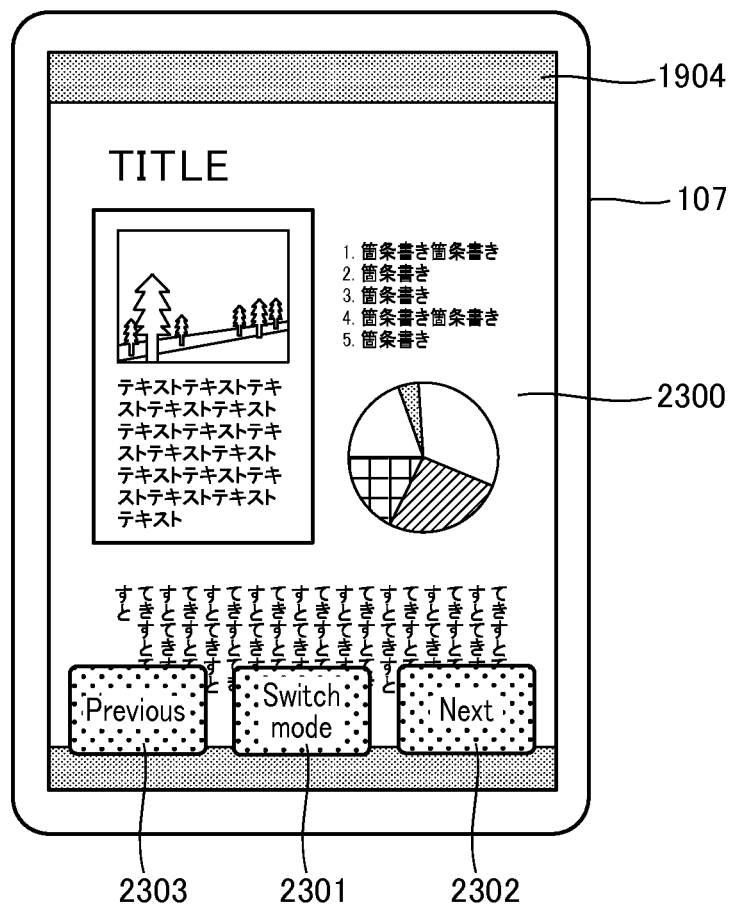
FIG. 18 illustrates an exemplary screen display of a touch user interface (UI) of the mobile terminal.

Next, a description will be given of processing performed by the mobile terminal 107 upon reception of the application image data according to the present embodiment with reference to FIGS. 17 and 18. FIG. 17 is a flowchart illustrating processing executed by the mobile terminal 107 upon reception of the application image data. FIG. 18 illustrates an example of screen display of the touch UI 1904 of the mobile terminal 107.

Firstly, in step S2200, the mobile terminal 107 receives the application image data from the MFP 100 via the wireless LAN module 1906, and stores the received application image data in the RAM 1911. Next, in step S2201, the rendering unit 2003 analyzes the syntax of the application image data stored in the RAM 1911, and reads the first page and objects contained therein.

Next, in step S2202, the rendering unit 2003 renders all of objects (background, character, photograph, and graphic) contained in the read first page according to the starting point coordinates, width, and height of each object to update the display status of the touch UI 1904. In this case, as shown in a page 2300 in FIG. 18, the mobile terminal 107 controls the display magnification for the first page according to the width of the touch UI 1904. When the height of the page when reduced to the display magnification is smaller than the height of the touch UI 1904, the mobile terminal 107 controls the starting point of the page 2300 in the coordinates on the touch UI 1904 so that the page is adapted to be displayed at the center of the touch UI 1904. On the other hand, when the height of the page 2300 when reduced to the display magnification is larger than the height of the touch UI 1904, the mobile terminal 107 controls the starting point of the page 2300 in the coordinates on the touch UI 1904 so that the starting point is aligned with the starting point of the touch UI 1904 (e.g., the top left corner of the screen). In the present embodiment, a display control method in which the entire page is displayed on the touch UI 1904 in this way is referred to as "page display mode".

As shown in the character attribute 1802 in FIG. 13, the character object contained in the application image data of the present embodiment has vector data and the character code data 1803. When there is a character object in a page, the rendering unit 2003 renders the page 2300 using vector data, but it goes without saying that the rendering unit 2003 may render the page 2300 using character code data.

Figure 19:
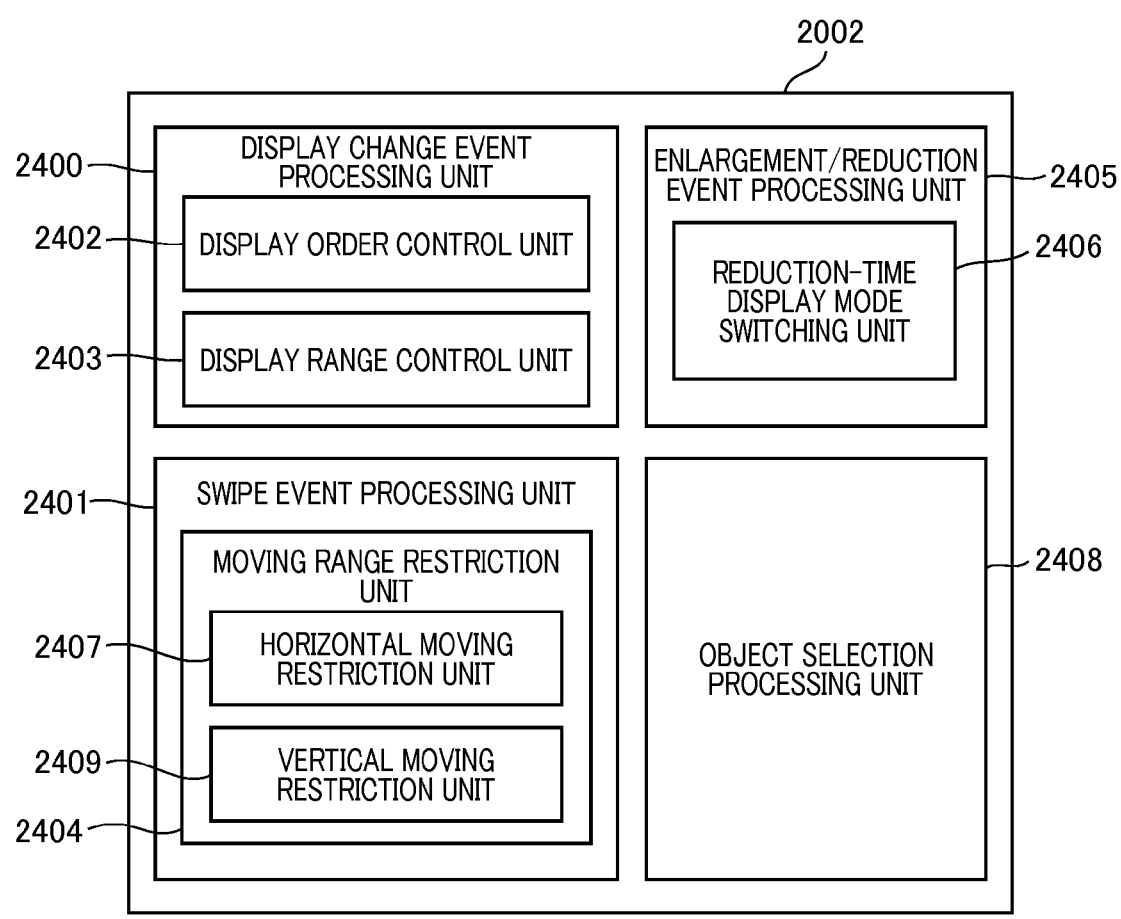
FIG. 19 is a block diagram illustrating a software module configuration related to operation control of the application image data.
Figure 20:
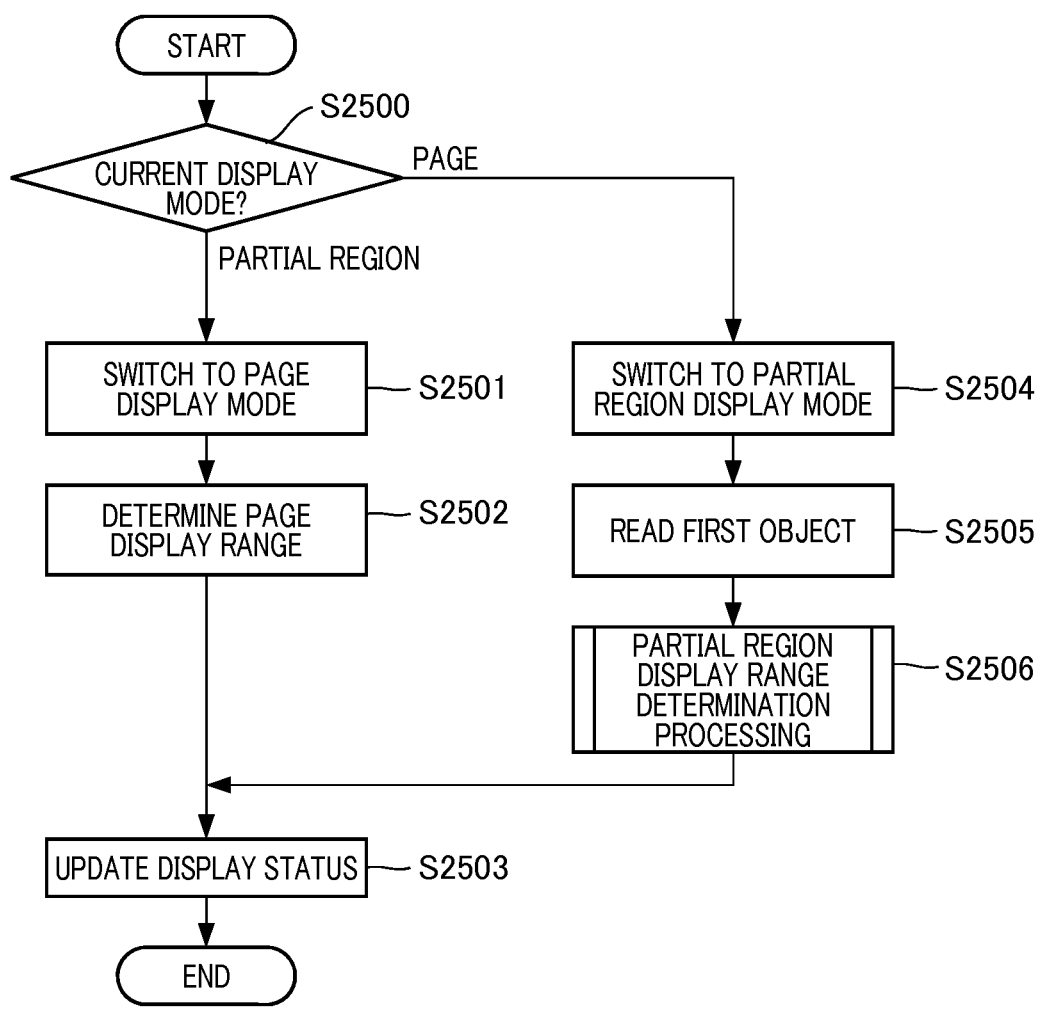
FIG. 20 is a flowchart illustrating mode switch processing.

Next, a description will be given of software modules related to operation control of the application image data of the mobile terminal 107 with reference to FIGS. 19 and 20. FIG. 19 is a block diagram illustrating a software module configuration in the gesture event processing unit 2002 related to operation control of the application image data. The gesture event processing unit 2002 includes a display change event processing unit 2400, a swipe event processing unit 2401, an enlargement/reduction event processing unit 2405, and an object selection processing unit 2408.

The gesture event processing unit 2002 receives any one of gesture events shown in FIGS. 16A to 16L from the gesture event generation unit 2001. The display change event processing unit 2400 processes the single-tap event (FIG. 16J) out of the gesture events received by the gesture event processing unit 2002. Upon reception of the single-tap event, the display change event processing unit 2400 determines whether coordinate values of the touch coordinates of the single-tap event correspond to any one of a "CHANGE MODE" button 2301, a "NEXT" button 2302, and a "PREVIOUS" button 2303 shown in FIG. 18. When touch coordinates of the single-tap event correspond to the "CHANGE MODE" button 2301, the display change event processing unit 2400 performs "mode switch processing" to be described below. When touch coordinates of the single-tap event correspond to the "NEXT" button 2302, the display change event processing unit 2400 performs "NEXT selection processing" ("NEXT" button selection processing) to be described below. When touch coordinates of the single-tap event correspond to the "PREVIOUS" button 2303, the display change event processing unit 2400 performs "PREVIOUS selection processing" ("PREVIOUS" button selection processing) to be described below. The "NEXT selection processing" and the "PREVIOUS selection processing" are performed by a display order control unit 2402 and a display range control unit 2403 provided in the display change event processing unit 2400.

The swipe event processing unit 2401 processes the swipe event described with reference to FIG. 16B. Upon reception of the swipe event, the gesture event processing unit 2002 moves the starting point of the page 2300 in the coordinates on the touch UI 1904 according to the moving distance included in swipe event information. Then, the gesture event processing unit 2002 updates the display status of the touch UI 1904. A moving range restriction unit 2404 provided in the swipe event processing unit 2401 performs moving range restriction processing to be described below with reference to FIGS. 30A to 30D to thereby restrict the moving range of a partial area displayed on the touch UI 1904.

Furthermore, a horizontal moving restriction unit 2407 provided in the moving range restriction unit 2404 performs horizontal moving range restriction processing to be described below to thereby move the starting point of the page 2300 displayed on the touch UI 1904. A vertical moving restriction unit 2409 provided in the moving range restriction unit 2404 performs vertical moving range restriction processing to be described below to thereby move the starting point of the page 2300 displayed on the touch UI 1904.

The enlargement/reduction event processing unit 2405 processes the pinch-in event shown in FIG. 16C and the pinch-out event shown in FIG. 16D. Upon reception of the pinch-in event or the pinch-out event, the gesture event processing unit 2002 changes the character sizes of the page 2300 upon rendering according to the reduction rate or the enlargement rate of the two events. The enlargement/reduction event processing unit 2405 updates the display status of the touch UI 1904 by using the changed image. A reduction-time display mode switching unit 2406 provided in the enlargement/reduction event processing unit 2405 performs reduction-time display mode switch processing to be described below.

The object selection processing unit 2408 processes the double-tap event shown in FIG. 16I. Upon reception of the double-tap event, the gesture event processing unit 2002 performs object selection processing to be described below with reference to FIG. 26 by using coordinate values of the touch coordinates of the double-tap event. The object selection processing is controlled by the object selection processing unit 2408 so that the processing is operated only in the page display mode.

Figure 21A:
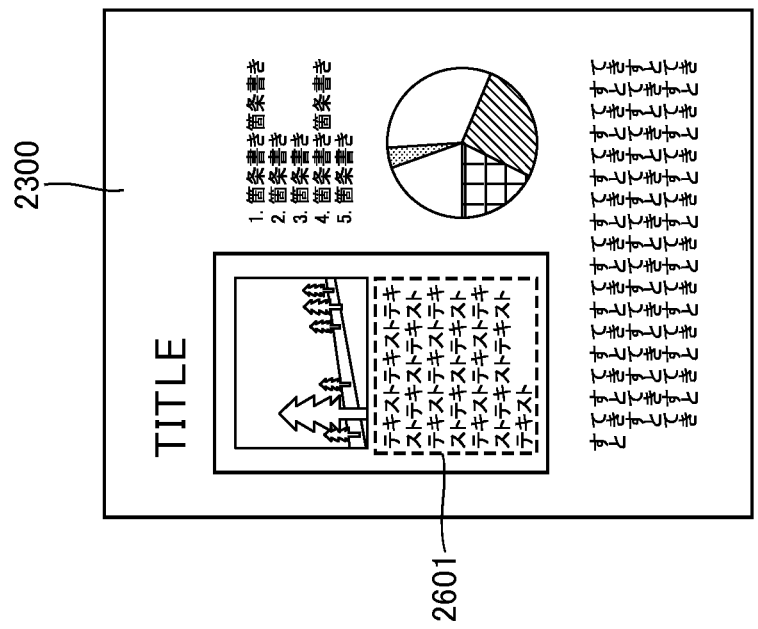
FIGS. 21A and 21B illustrate examples of screen display of the touch UI of the mobile terminal.
Figure 21B:
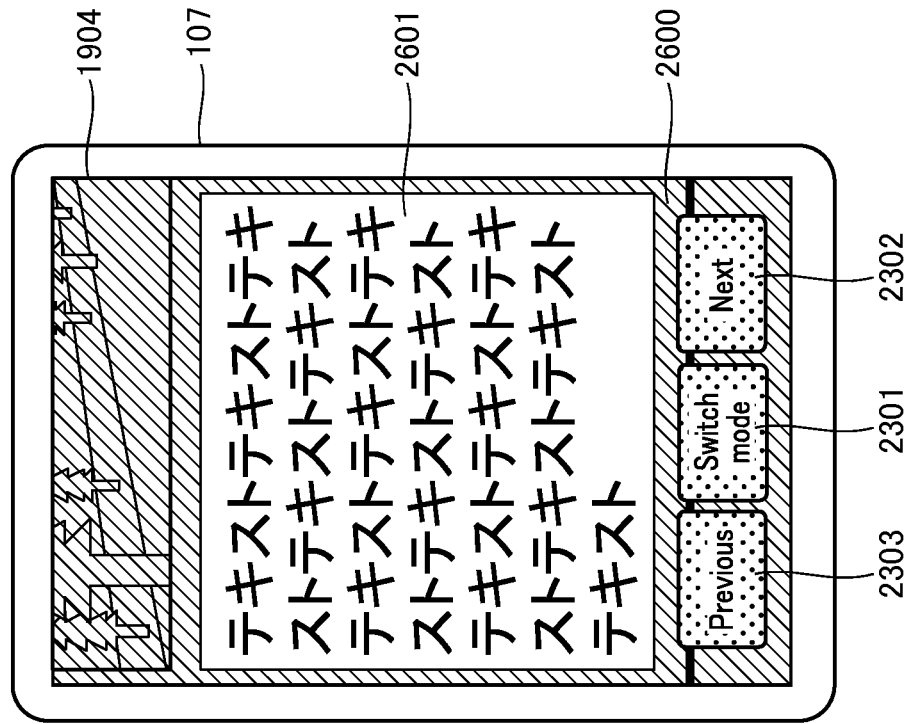

Next, a description will be given of the mode switch processing performed by the display change event processing unit 2400 with reference to FIGS. 18, 20, 21A, and 21B. FIG. 20 is a flowchart illustrating the mode switch processing. The mode switch processing is executed when the "CHANGE MODE" button 2301 which is the display mode switching item shown in FIG. 18 or FIG. 21B is tapped by the user. FIGS. 21A and 21B illustrate examples of screen display of the touch UI 1904 of the mobile terminal 107.

Firstly, in step S2500, the display change event processing unit 2400 acquires the display mode set in the mobile terminal 107 when the display change event processing unit 2400 determines that the "CHANGE MODE" button is tapped by the user. The display mode refers to a method used by the mobile terminal 107 to display the application image data on the touch UI 1904. In the present embodiment, the mobile terminal 107 has the following two display modes as an example. The first display mode is the page display mode suitable for displaying the entire page as shown in FIG. 18. The second display mode is the partial area display mode suitable for enlarging and displaying a partial area in the page as shown in FIG. 21B. As described above, the page display mode is set immediately after the mobile terminal 107 receives the application image data. As shown in FIG. 21B, the partial area display mode is a display mode in which the display magnification and the starting point of the page 2300 are controlled so that each object in the page 2300 is enlarged and displayed.

A display event processing unit may switch the display mode in step S2500 when the character object 2601 shown in FIG. 21A is single-tapped by the user. Alternatively, the display event processing unit may display the screen shown in FIG. 21A when the "CHANGE MODE" button 2301 shown in FIG. 18 is pressed by the user to thereby cause the user to select an object to be enlarged. When the character object 2601 is selected by the user as an object to be enlarged and displayed, the image shown in FIG. 21B is displayed.

A broken line surrounding the object 2601 shown in FIG. 21A is drawn to help facilitate understanding of the description, and does not actually exist on the page 2300. In the present embodiment, as shown in FIG. 21B, a semi-transparent mask 2600 is transparent for the area of the object 2601 to be enlarged and displayed and semi-transparent gray shown by hatching for the areas of other objects. The semi-transparent mask 2600 is displayed by superimposing it onto the page 2300. By displaying the semi-transparent mask 2600 and the object 2601 with contrast as described above, only the target object is made easily viewable. In other words, superimposing such a semi-transparent mask enables highlighting the target object and dimly displaying objects other than the target object, allowing the user to easily identify the area of the object to be displayed.

When the display mode set when the "CHANGE MODE" button 2301 is tapped is the partial area display mode, the display change event processing unit 2400 executes processing in step S2501, whereas when the display mode at that time is the page display mode, the display change event processing unit 2400 executes processing in step S2504.

In step S2501, the display change event processing unit 2400 sets not to display the semi-transparent mask 2600 shown in FIG. 21B (semi-transparent mask OFF), and switches the display mode to the page display mode for displaying the entire page image. In step S2502, the display change event processing unit 2400 controls the display magnification of the page 2300 according to the width of the touch UI 1904, as described above, and controls the starting point of the page 2300 to thereby determine the page display range. In step S2503, the display change event processing unit 2400 updates the display status of the touch UI 1904 based on the determined page display range.

When the display mode set when the "CHANGE MODE" button 2301 is tapped is the page display mode, in step S2504, the display change event processing unit 2400 switches the display mode to the partial area display mode. Then, the display change event processing unit 2400 sets to display the semi-transparent mask 2600 (semi-transparent mask ON).

Next, in step S2505, the display change event processing unit 2400 reads the first object in the page 2300, and acquires the starting point, width, and height of the first object. Here, the first object refers to an object which is read first in the document structure tree of the application image data.

In step S2506, the display range control unit 2403 provided in the display change event processing unit 2400 performs partial area display range determination processing to be described below. In step S2503, the display range control unit 2403 updates the display status of the touch UI 1904 based on the determined partial area display range. In the partial area display range determination processing in step S2506, the display change event processing unit 2400 controls the display magnification and the starting point of the page according to the attribute of the object read in step S2505 to thereby determine a display range of the partial area to be displayed on the touch UI 1904. A semi-transparent (gray) mask is applied to areas other than the partial area of the object to be displayed, allowing the user to easily identify the object to be displayed.

Figure 22:
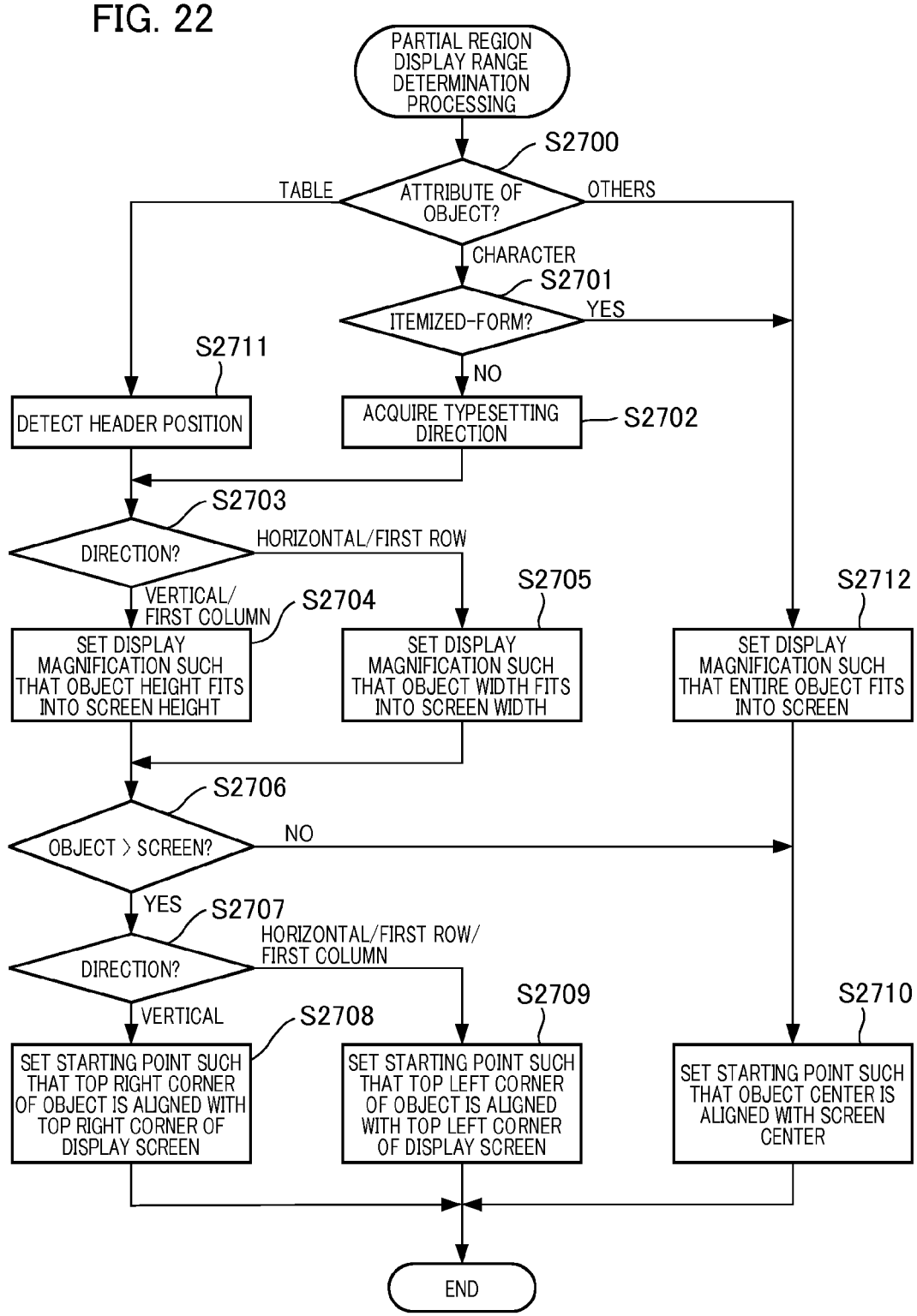
FIG. 22 is a flowchart illustrating partial area display range determination processing.

Next, a detailed description will be given of the partial area display range determination processing performed by the display range control unit 2403 in step S2506 shown in FIG. 20 with reference to the flowchart shown in FIG. 22. Firstly, in step S2700, the display range control unit 2403 determines the attribute of the read object. When the attribute is determined to be character, the processing proceeds to step S2701. When the attribute is determined to be table, the processing proceeds to step S2711. On the other hand, when the attribute is determined to be others, the processing proceeds to step S2712.

In step S2701, the display range control unit 2403 determines whether or not the object to be displayed having the character attribute is in itemized form. An object in itemized form refers to an object having a point or numeral as a line head character for each character string or line. The line head character can be acquired from the result of the OCR processing. When the object is determined not to be in itemized form but to be an ordinary character string, the processing proceeds to step S2702. On the other hand, when the object is determined to be in itemized form, the processing proceeds to step S2712.

In step S2702, the display range control unit 2403 acquires the typesetting direction of characters in the object. The typesetting direction of the object has been acquired in the vectorization processing in step S504. In step S2703, the display range control unit 2403 determines the typesetting direction of characters. When the typesetting direction is vertical, the processing proceeds to step S2704. On the other hand, when the typesetting direction is horizontal, the processing proceeds to step S2705. When the typesetting direction of characters is vertical, in step S2704, the display range control unit 2403 sets the display magnification of the page such that the height of the relevant object fits into the height of the screen of the touch UI 1904. When the typesetting direction of characters is horizontal, in step S2705, the display range control unit 2403 sets the display magnification of the page such that the width of the relevant object fits into the width of the screen of the touch UI 1904.

Next, in step S2706, the display range control unit 2403 determines whether or not the entire object which has been reduced/enlarged to the display magnification set in step S2704 or S2705 can be displayed on the touch UI 1904. When the entire object is determined to be larger than the touch UI 1904 and the entire object cannot be displayed thereon, the processing proceeds to step S2707. On the other hand, when the entire object is determined to be smaller than the touch UI 1904 and the entire object can be displayed thereon, the processing proceeds to step S2710.

In step S2707, the display range control unit 2403 determines the typesetting direction of characters in the relevant object. When the typesetting direction of characters is determined to be vertical, the processing proceeds to step S2708. On the other hand, when the typesetting direction of characters is determined to be horizontal, the processing proceeds to step S2709.

In step S2708, the display range control unit 2403 sets the starting point position of the page 2300 such that the top right corner of the relevant object is aligned with the top right corner of the touch UI 1904 since the entire object displays the vertical character area which cannot be displayed on the touch UI 1904. Specifically, the display range control unit 2403 sets the display position such that the first line for vertical writing is displayed.

In step S2709, the display range control unit 2403 sets the starting point of the page 2300 such that the top left corner of the relevant object is aligned with the top left corner of the touch UI 1904 since the entire object displays the horizontal writing character area which cannot be displayed on the touch UI 1904. Specifically, the display range control unit 2403 sets the display position such that the first line for horizontal writing is displayed.

In step S2710, since the entire object fits into the screen of the touch UI 1904, the display range control unit 2403 sets the starting point of the page 2300 such that the center of the relevant object is aligned with the center of the touch UI 1904.

When the attribute of the object is determined to be table in step S2700, in step S2711, the display range control unit 2403 detects a header position of the table. The header position can be determined, for example, based on whether or not the font type of the character of the first line (top line) and the first line (leftmost line) is bold, the thickness of the approximation curve of the vector data at the time of vectorization, the thickness of the table ruled line, the background color of each cell in the table, and the like. When the header position of the table detected in step S2711 is determined to be the first line (first row), the processing proceeds to step S2705 from step S2703. When the header position of the table is determined to be the first line (first column), the processing proceeds to step S2704 from step S2703. Since the table header commonly exists at the top line or leftmost line in step S2707, the processing proceeds to step S2709. In step S2709, the display range control unit 2403 sets the starting point of the page such that the top left corner of the object is aligned with the top left corner of the touch UI. Thus, the display position is set such that the table header is displayed. Specifically, in the aforementioned processing, the display range control unit 2403 sets the display magnification and the display position of the first object such that the range of characters in the typesetting direction fits into the screen when the attribute of the object is character or table.

When the attribute of the object is determined to be others (attributes other than character and table) in step S2700 or when the object is determined to be in itemized form in step S2701, the display range control unit 2403 performs the following processing in step S2712. Specifically, the display range control unit 2403 sets the display magnification of the page such that the entire relevant object fits into the touch UI 1904. In step S2710, the display range control unit 2403 sets the starting point of the page 2300 such that the center of the object is aligned with the center of the touch UI 1904.

Figure 23:
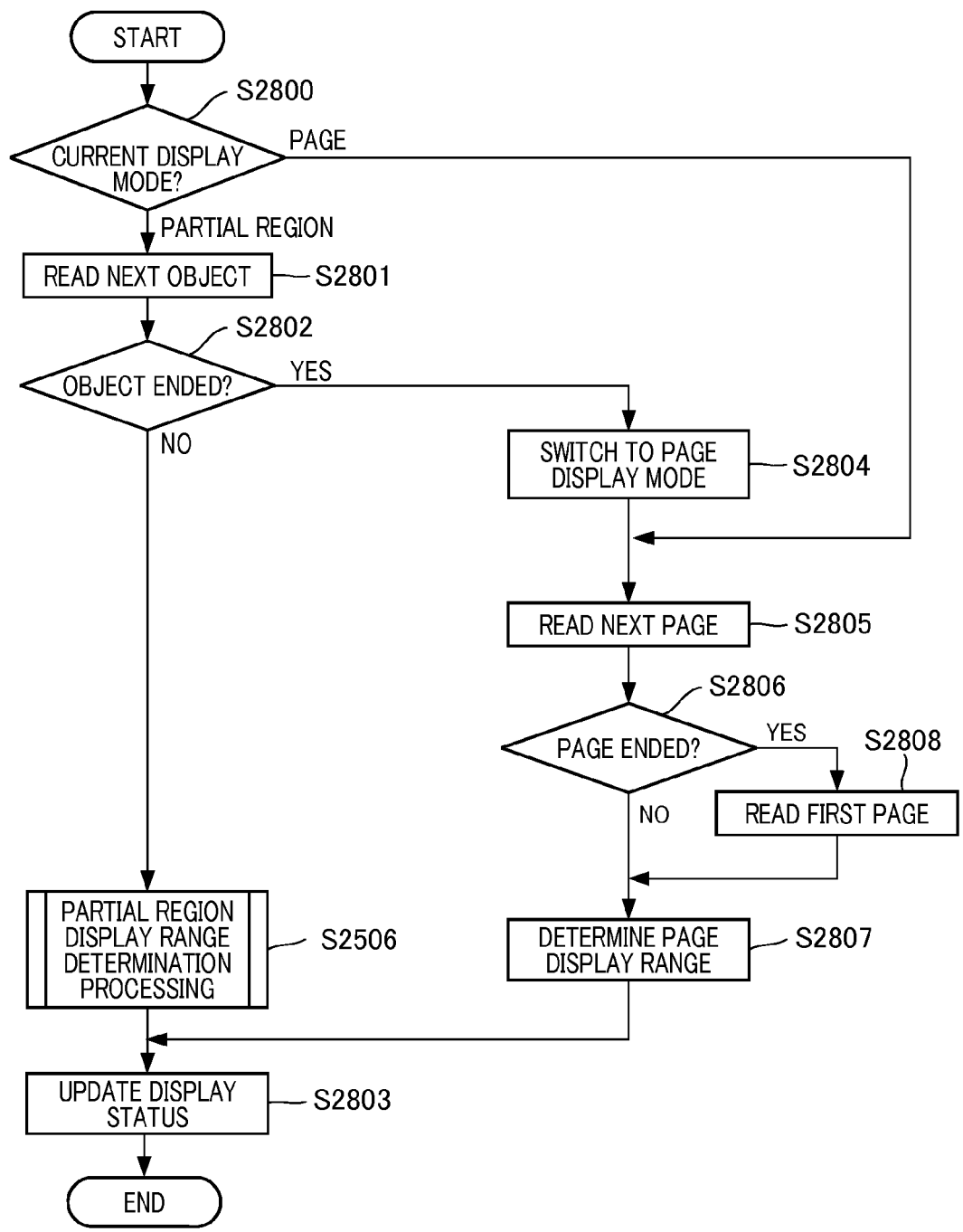
FIG. 23 is a flowchart illustrating NEXT selection processing.

A description will be given of the "NEXT selection processing ("NEXT" button selection processing)" executed when the "NEXT" button 2302 is tapped (instructed) by the user with reference to the flowchart shown in FIG. 23. In step S2800, the display change event processing unit 2400 acquires the display mode set in the mobile terminal 107 when the "NEXT" button 2302 serving as a next processing item is tapped. When the acquired display mode is the partial area display mode, the processing proceeds to step S2801. When the acquired display mode is the page display mode, the processing proceeds to step S2805.

In step S2801, the display order control unit 2402 selects a next display target object based on the document structure tree out of all of the objects of the currently read page, and reads the relevant object. In the present embodiment, objects on the document tree structure are displayed from the first highest hierarchical level downward, specifically, in order of an object belonging to the first highest hierarchical level, an object belonging to the second hierarchical level, and so on. When all of objects belonging to the next lower hierarchical levels have been displayed, objects are displayed from a higher hierarchical level downward, specifically, in order of an object belonging to the next higher hierarchical level, an object belonging to the lower hierarchical level under the next higher hierarchical level, and so on.

For example, as shown in FIG. 12B, V0 denotes a page and H1 denotes an object which is read first. When the "NEXT selection processing" is performed in a state where the object H1 is displayed on the touch UI 1904 in the partial area display mode, the object H1 has a lower hierarchical level, and thus, an object T1 is read. Furthermore, when the "NEXT selection processing" is performed in a state where the object T1 is displayed, the object T1 does not have a lower hierarchical level and an object T2 exists in the same hierarchical level as the object T1, and thus, the object T2 is read. When the "NEXT selection processing" is performed in a state where the object T2 is displayed, the object T2 does not have a lower hierarchical level and no more object exists in the relevant hierarchical level, and thus, an object S1 belonging to the next higher hierarchical level is read. Although, in the present embodiment, the object H1 not having a rendering element is selected and read, it goes without saying that only the objects T1 and T2 having a rendering element may be selected. Also, only an object having a specific attribute, for example, an object having the "character" attribute may be selected, or only an object having a specific attribute may be excluded. Furthermore, only an object such as H1 or V1 not having a rendering element itself but having a rendering element in a lower hierarchical level may be selected.

In step S2802, the display order control unit 2402 determines whether or not the next object has been read in step S2801. When the next object is determined to have been read in step S2801 (when a selectable object exists), the processing proceeds to step S2506 to process the read object. The partial area display range determination processing in step S2506 is similar to the processing described with reference to FIG. 20, and thus, redundant description thereof will be omitted. In step S2803, the display order control unit 2402 updates the display status of the touch UI 1904 by using the display magnification and the starting point of the page controlled based on the attribute, starting point, width, and height of the read object.

On the other hand, when the next object is determined not to have been read in step S2801 (when no selectable object exists), the last object in the page has already been read. Thus, the display order control unit 2402 determines that the display processing is completed for all objects in step S2802, and the processing proceeds to step S2804. In step S2804, the display order control unit 2402 ends the partial area display mode, sets not to display the semi-transparent mask 2600, and switches the display mode to the page display mode.

In step S2805, since the display mode is the page display mode, the display order control unit 2402 analyzes the syntax of the application image data stored in the RAM 1911, and reads the next page and objects contained therein.

In step S2806, the display order control unit 2402 determines whether or not the next page has been read. When the next page has been read in step S2805, the processing proceeds to step S2807. On the other hand, when the last page of the application image data stored in the RAM 1911 has already been read and there is no next readable page in step S2805, the processing proceeds to step S2808. In step S2808, the display order control unit 2402 analyzes the syntax of the application image data stored in the RAM 1911, and reads the first page and objects contained therein.

Next, in step S2807, the display range control unit 2403 controls the display magnification of the page according to the width of the touch UI 1904 as described above and controls the starting point of the page to thereby determine the page display range. In step S2803, the display range control unit 2403 updates the display status of the touch UI 1904 based on the determined page display range.

Figure 24:
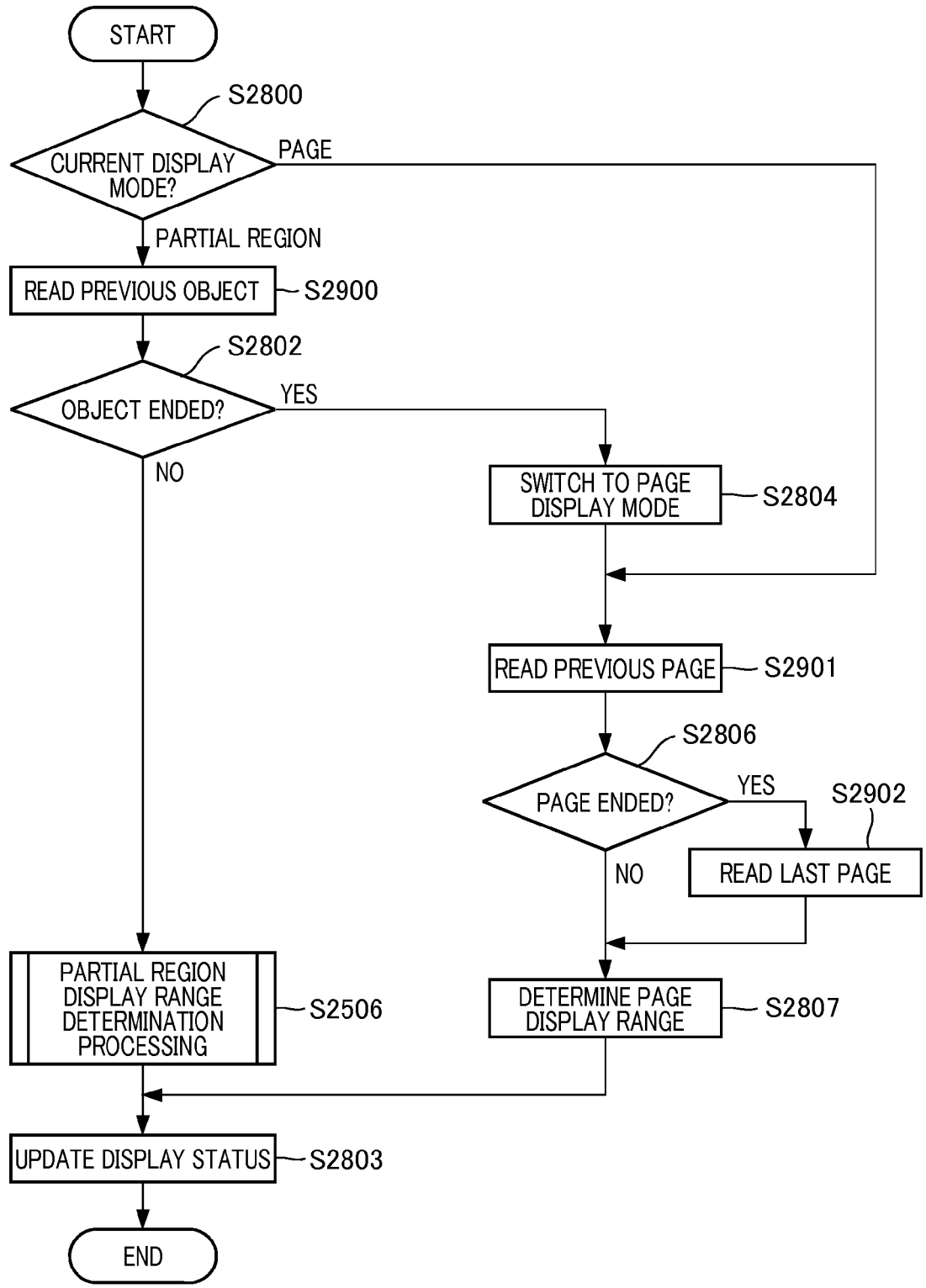
FIG. 24 is a flowchart illustrating PREVIOUS selection processing.

Next, a description will be given of the "PREVIOUS selection processing ("PREVIOUS" button selection processing)" executed when the "PREVIOUS" button 2303 is tapped (instructed) by the user with reference to the flowchart shown in FIG. 24. The PREVIOUS selection processing has almost the same configuration as the NEXT selection processing, and redundant description thereof will be omitted and only different portions (steps S2900, S2901, and S2902) will be described below.

When the current display mode is the partial area mode, the display order control unit 2402 selects a next display target object based on the document structure tree out of all of the objects of the currently read page, and reads the relevant object in step S2900. In the present embodiment, when the "PREVIOUS" button 2303 is tapped, objects on the document tree structure are displayed from the lowest hierarchical level upward, specifically, in order of objects belonging to the lowest hierarchical level, objects belonging to the second lowest hierarchical level, and so on. Specifically, when all of objects belonging to a lower hierarchical level have been displayed, other objects belonging to the higher hierarchical level are displayed.

For example, as shown in FIG. 12B, a last object T7 belonging to the lowest hierarchical level is read first. In the partial area display mode, when the "PREVIOUS" button 2302 serving as a PREVIOUS processing item is tapped in a state where the object T7 is displayed on the touch UI 1904, an object T6 existing in the same hierarchical level is read. Furthermore, when the "PREVIOUS selection processing" is performed in a state where the object T6 is displayed, an object V2 belonging to the higher hierarchical level is read since no other objects exist in the same hierarchical level. When the "PREVIOUS selection processing" is performed in a state where the object V2 is displayed, a last object T5 belonging to the lower hierarchical level of the object V1 is read since an object V1 exists in the same hierarchical level as V2 and has objects in the lower hierarchical level.

Also in the "PREVIOUS selection processing", as in the "NEXT selection processing", it is also possible to select only objects having a rendering element, select only objects having a specific attribute, or select objects by excluding only objects having a specific attribute. Furthermore, only an object such as H1 or V1 not having a rendering element itself but having a rendering element in a lower hierarchical level may be selected.

In step S2901, since the display mode is the page display mode, the display order control unit 2402 analyzes the syntax of the application image data stored in the RAM 1911, and reads the previous page and objects contained therein.

In step S2806, the first page of the application image data stored in the RAM 1911 has already been read. When there is no next readable page in step S2901, the processing proceeds to step S2902. In step S2902, the display order control unit 2402 analyzes the syntax of the application image data stored in the RAM 1911, and reads the last page and objects contained therein.

Figure 25:
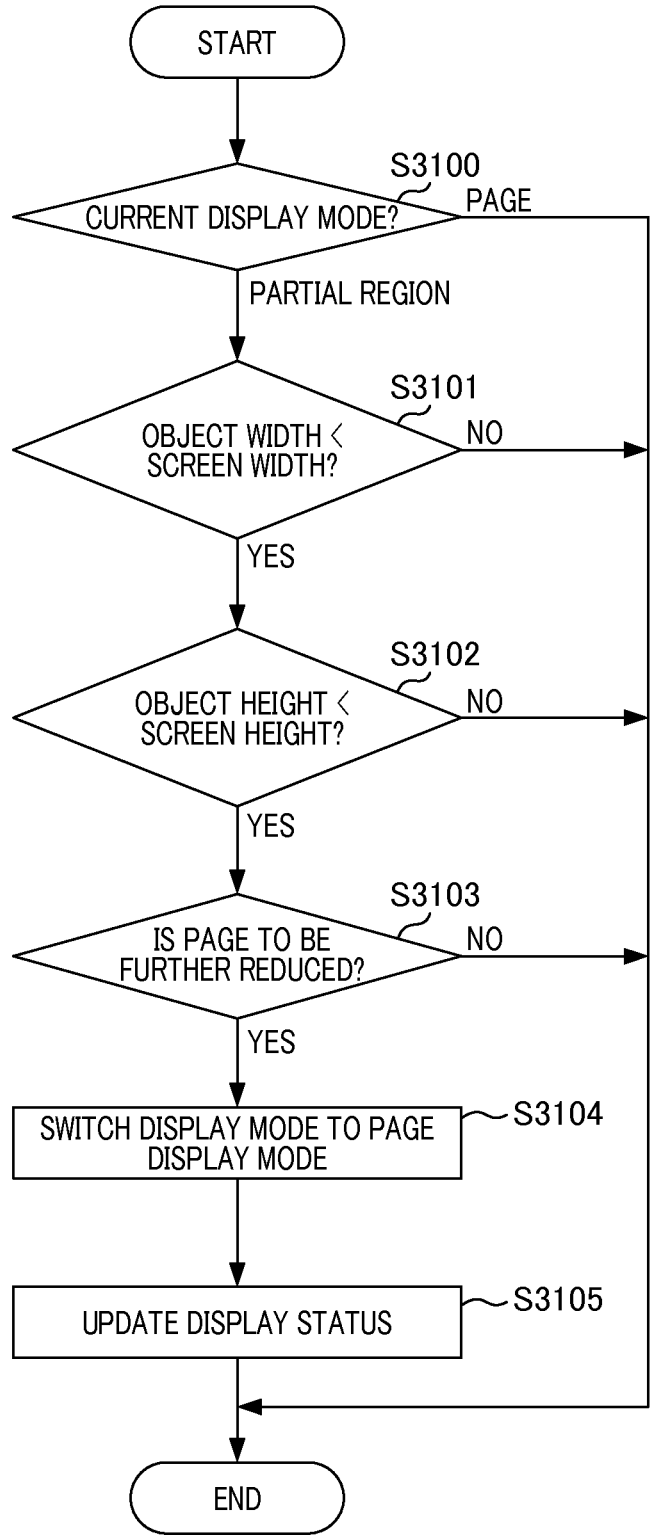
FIG. 25 is a flowchart illustrating reduction-time display mode switch processing.

Next, a description will be given of the reduction-time display mode switch processing performed by the reduction-time display mode switching unit 2406 when the pinch-in operation is performed with reference to the flowchart shown in FIG. 25. In step S3100, the reduction-time display mode switching unit 2406 acquires the display mode set in the mobile information terminal 107 when an operation is performed by the user. When the acquired display mode is the partial area display mode, the processing proceeds to step S3101. Otherwise, the processing ends without performing any processing.

In step S3101, the reduction-time display mode switching unit 2406 determines whether or not the width of the currently read object when displayed with the display magnification for the current page is smaller than the width of the screen of the touch UI 1904. When the width of the relevant object is determined to be smaller than the width of the screen of the touch UI 1904, the processing proceeds to step S3102. Otherwise, the processing ends without performing any processing.

In step S3102, the reduction-time display mode switching unit 2406 determines whether or not the height of the currently read object when displayed with the display magnification for the current page is smaller than the height of the screen of the touch UI 1904. When the height of the relevant object is determined to be smaller than the screen height of the touch UI 1904, the processing proceeds to step S3103. Otherwise, the processing ends without performing any processing.

In step S3103, the reduction-time display mode switching unit 2406 determines whether or not the display magnification of the page containing the relevant object is to be further reduced. Specifically, the reduction-time display mode switching unit 2406 determines whether or not the received event is the pinch-in event. When the reduction-time display mode switching unit 2406 determines that the page is to be further reduced, the processing proceeds to step S3104. Otherwise, the processing ends without performing any processing.

In step S3104, the reduction-time display mode switching unit 2406 sets not to display the semi-transparent mask 2600, and switches the display mode of the mobile information terminal 107 from the partial area display mode to the page display mode. Finally, in step S3105, the display change event processing unit 2400 updates the display status of the touch UI 1904 according to the display magnification and the starting point of the page determined based on the pinch-in event.

Figure 26:
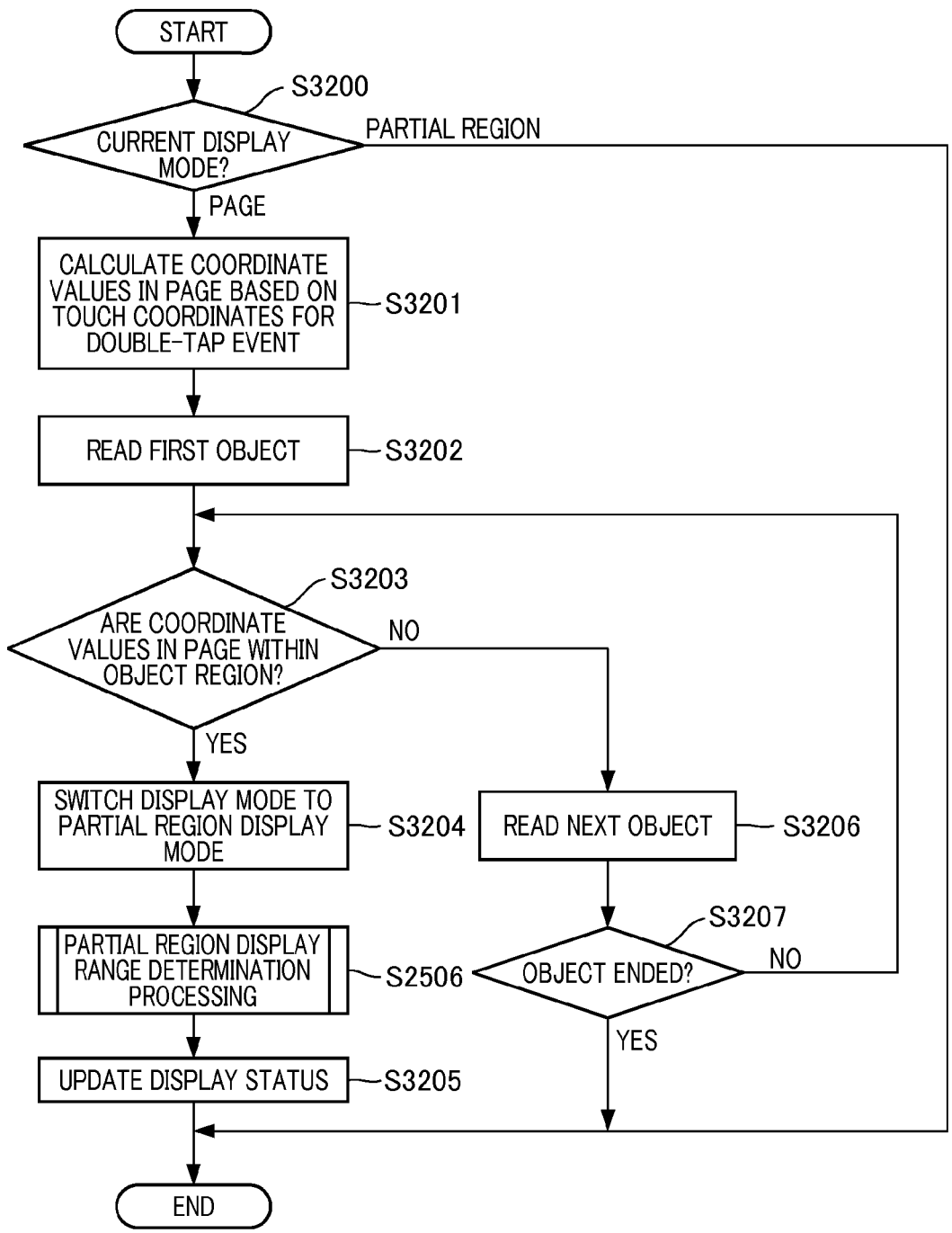
FIG. 26 is a flowchart illustrating object selection processing.

Next, a description will be given of the object selection processing performed by the object selection processing unit 2408 when the double-tap operation is performed with reference to the flowchart shown in FIG. 26. Firstly, in step S3200, the object selection processing unit 2408 acquires the display mode set in the mobile information terminal 107 when the double-tap operation is performed by the user. When the acquired display mode is the page display mode, the processing proceeds to step S3201. When the acquired display mode is the partial area display mode, the processing ends without performing any processing.

In step S3201, the object selection processing unit 2408 acquires coordinate values of the touch coordinates for the received double-tap event. Since the coordinate values of the touch coordinates are coordinate values on the touch UI 1904, the object selection processing unit 2408 converts them into coordinate values in the page based on the display magnification and the starting point of the page displayed on the touch UI 1904.

In step S3202, the object selection processing unit 2408 reads information about the first object out of all of objects in the current page displayed on the touch UI 1904. In step S3203, the object selection processing unit 2408 determines whether or not coordinate values in the page acquired in step S3201 are included in the area information of the read object. When the coordinate values in the page are included in the area information of the read object, the processing proceeds to step S3204. Otherwise, the processing proceeds to step S3206.

In step S3204, the object selection processing unit 2408 switches the display mode of the mobile terminal 107 from the page display mode to the partial area display mode. At the same time, the object selection processing unit 2408 displays the semi-transparent mask 2600 to apply a semi-transparent mask to the areas other than the double-tapped object, and the processing proceeds to step S2506.

In step S2506, the display range control unit 2403 performs the partial area display range determination processing for the object (i.e., the double-tapped object) read in step S3202 or S3206. The partial area display range determination processing is as described above, and redundant description thereof will be omitted.

In step S3205, the display change event processing unit 2400 updates the display status of the touch UI 1904 according to the display magnification and the starting point of the page determined in the partial area display range determination processing.

On the other hand, in step S3206, the object selection processing unit 2408 reads information about an object next to the currently read object out of all of objects in the current page.

In step S3207, the object selection processing unit 2408 determines whether or not the next object has been read in step S3206. When the next object is determined to have been read, the processing returns to step S3203. When the next object is determined not to have been read, the processing ends without performing any processing.

Although, in the present embodiment, the object selection processing unit 2408 determines whether or not the coordinate values in the page are included in the area information of each object for all of objects in the page currently displayed on the touch UI 1904, the processing is not limited thereto. For example, as in the PREVIOUS selection processing and the NEXT selection processing, it is also possible to ignore objects not having a rendering element and select only objects having a rendering element. Furthermore, it is also possible to select only objects having a specific attribute (such as objects having the character attribute) and select objects by excluding only objects having a specific attribute. Furthermore, an object not having a rendering element itself but having a rendering element in a lower hierarchical level may also be selected.

Figure 27:
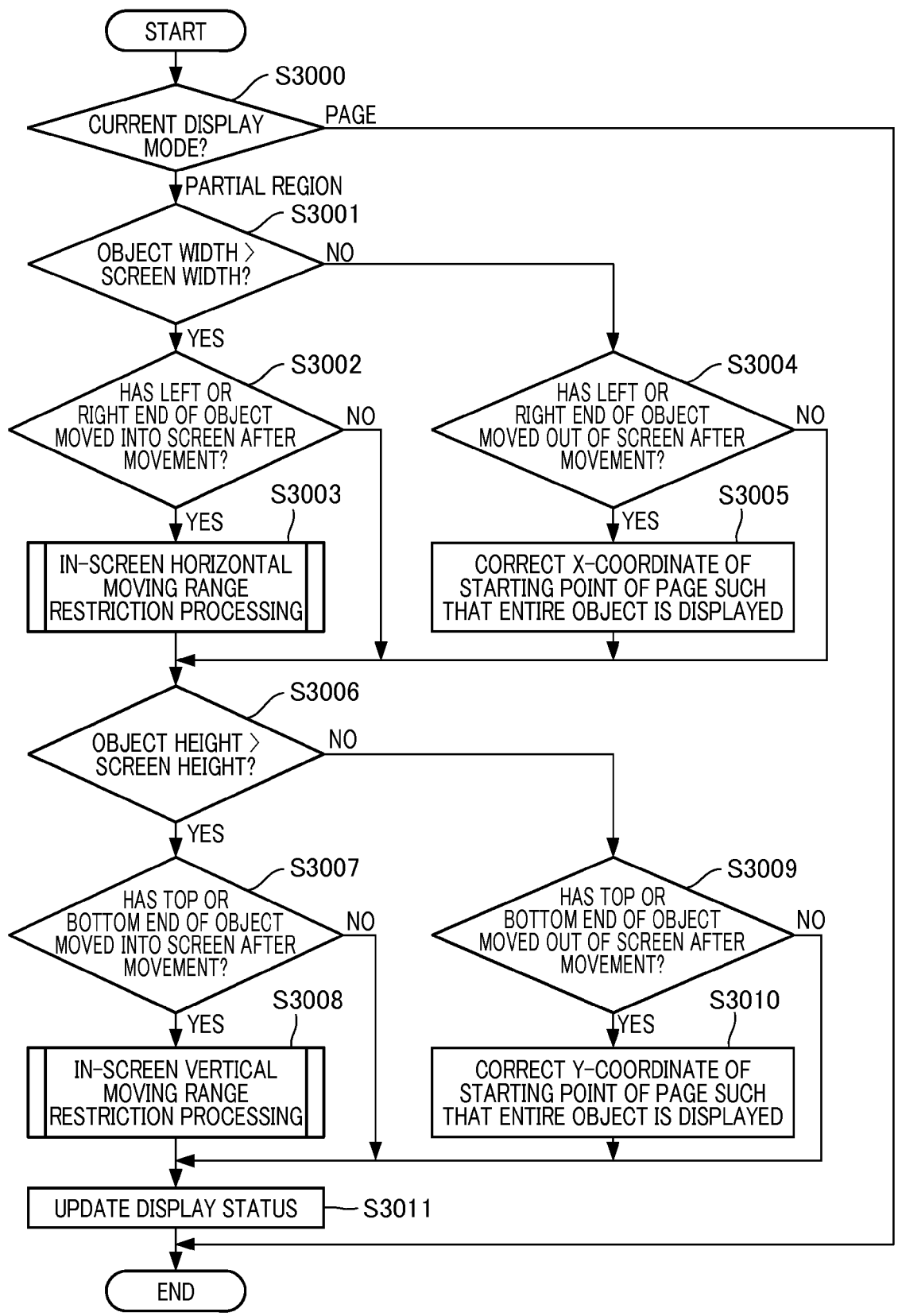
FIG. 27 is a flowchart illustrating moving range restriction processing according to a first embodiment.

Next, a description will be given of the moving range restriction processing performed by the moving range restriction unit 2404 with reference to the flowchart shown in FIG. 27. In the present embodiment, the moving range restriction processing is performed when the swipe operation is completed, i.e., when the user's finger separates from the touch UI 1904.

In step S3000, the moving range restriction unit 2404 acquires the display mode set in the mobile information terminal 107 when the swipe operation is completed, and determines whether the display mode is the partial area display mode. When the moving range restriction unit 2404 determines that the display mode is the partial area display mode, the processing proceeds to step S3001. When the moving range restriction unit 2404 determines that the display mode is the page display mode, the processing ends without performing any processing.

When the display mode is determined to be the partial area display mode in step S3000, the processing proceeds to step S3001. In step S3001, the moving range restriction unit 2404 determines whether or not the width of the currently read object when displayed with the display magnification for the current page is larger than the width of the screen of the touch UI 1904. When the width of the relevant object is larger than the width of the screen of the touch UI 1904, the processing proceeds to step S3002. Otherwise, the processing proceeds to step S3004.

In step S3002, the swipe event processing unit 2401 moves the display position of the page containing the relevant object depending on the moving distance of the swipe event. At this time, the moving range restriction unit 2404 determines whether or not the left or right end of the object has moved into the screen of the touch UI 1904. Consequently, when the left or right end of the object is determined to be within the screen of the touch UI 1904, the processing proceeds to step S3003. Otherwise, the processing proceeds to step S3006.

Figure 28:
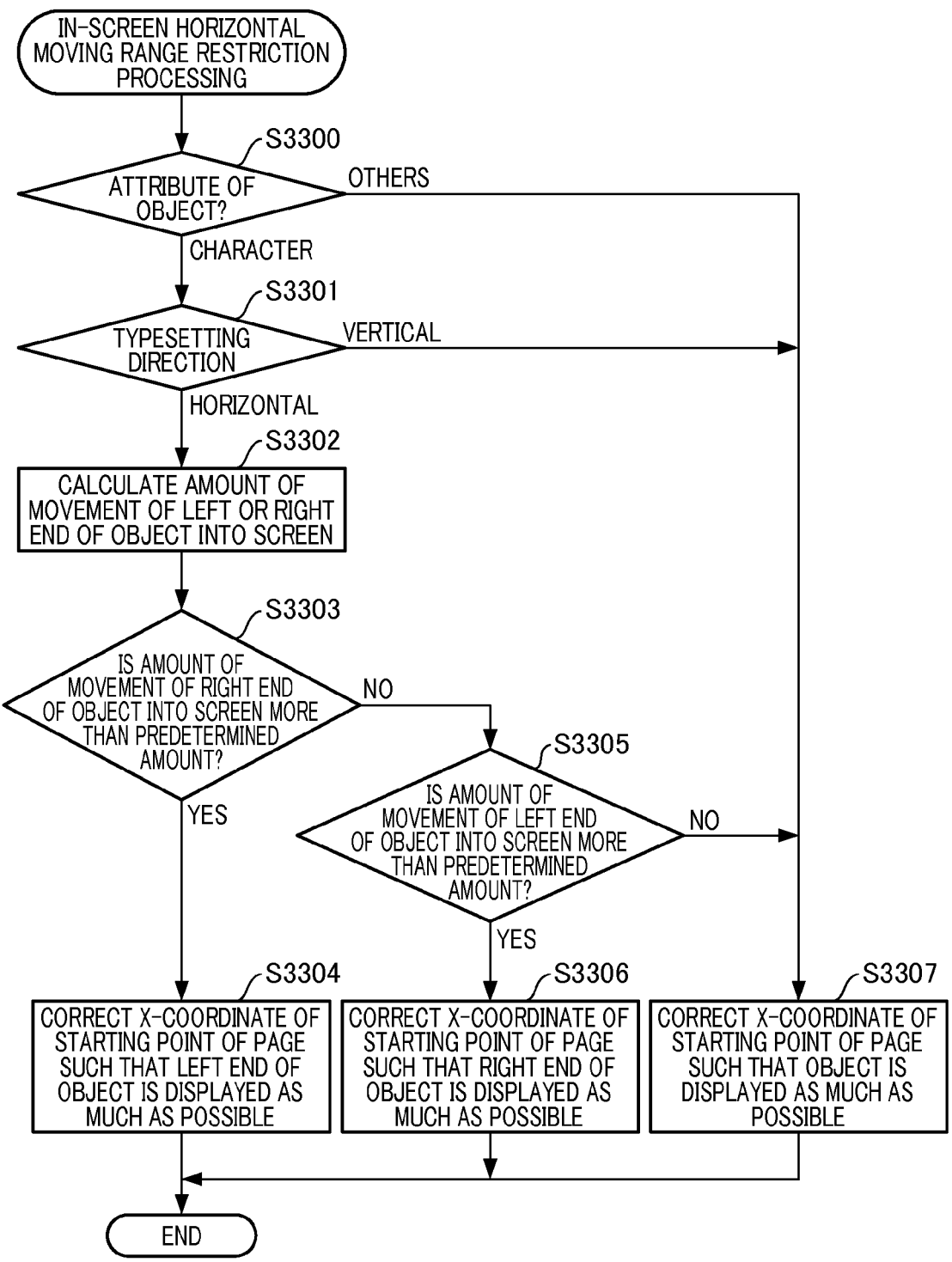
FIG. 28 is a flowchart illustrating horizontal moving range restriction processing.

In step S3003, the moving range restriction unit 2404 performs in-screen horizontal moving range restriction processing to be described below with reference to FIG. 28, and the processing proceeds to step S3006. When the width of the relevant object is not larger than the width of the screen of the touch UI 1904, the processing proceeds to step S3004. In step S3004, the swipe event processing unit 2401 moves the display position of the page containing the relevant object depending on the moving distance of the swipe event. At this time, the moving range restriction unit 2404 determines whether or not the left or right end of the object has moved out of the screen of the touch UI 1904. Consequently, when the left or right end of the object is determined to be outside of the screen of the touch UI 1904, the processing proceeds to step S3005. Otherwise, the processing proceeds to step S3006. In step S3005, the moving range restriction unit 2404 corrects the x-coordinate of the starting point of the page to move the left or right end of the relevant object respectively to the left or right end of the screen so that the entire relevant object is displayed.

In step S3006, the moving range restriction unit 2404 determines whether or not the height of the currently read object when displayed with the display magnification for the current page is larger than the height of the screen of the touch UI 1904. At this time, when the height of the relevant object is determined to be larger than the screen height of the touch UI 1904, the processing proceeds to step S3007. Otherwise, the processing proceeds to step S3009. In step S3007, the moving range restriction unit 2404 determines whether or not the top or bottom end of the object has moved into the screen of the touch UI 1904 when the swipe event processing unit 2401 moves the display position of the page containing the relevant object depending on the moving distance of the swipe event. Consequently, when the top or bottom end of the object is determined to be within the screen of the touch UI 1904, the processing proceeds to step S3008. Otherwise, the processing proceeds to step S3011. In step S3008, the moving range restriction unit 2404 performs in-screen vertical moving range restriction processing to be described below with reference to FIG. 29, and the processing proceeds to step S3011.

When the height of the relevant object is determined not to be larger than the screen height of the touch UI 1904 in step S3006, the processing proceeds to step S3009. In step S3009, the moving range restriction unit 2404 determines whether or not the top or bottom end of the object has moved out of the screen of the touch UI 1904 when the swipe event processing unit 2401 moves the display position of the page containing the relevant object depending on the moving distance of the swipe event. When the top or bottom end of the object is determined to have moved out of the screen of the touch UI 1904, the processing proceeds to step S3010. Otherwise, the processing proceeds to step S3011.

In step S3010, the moving range restriction unit 2404 corrects the y-coordinate of the starting point of the page to move the top or bottom end of the relevant object into the screen so that the entire relevant object is displayed. Finally, in step S3011, the display change event processing unit 2400 updates the display status of the touch UI 1904 according to the display magnification and the starting point of the page.

Next, a detailed description will be given of the in-screen horizontal moving range restriction processing performed by the horizontal moving restriction unit 2407 provided in the moving range restriction unit 2404 with reference to the flowchart shown in FIG. 28. In step S3300, the horizontal moving restriction unit 2407 determines the attribute of the currently read object. When the attribute of the object is character, the processing proceeds to step S3301. When the attribute of the object is others, the processing proceeds to step S3307.

In step S3301, the horizontal moving restriction unit 2407 acquires and determines the typesetting direction of characters in the object. When the typesetting direction is horizontal, the processing proceeds to step S3302. When the typesetting direction is vertical, the processing proceeds to step S3307. Note that the typesetting direction of the object has been acquired in the vectorization processing in step S504. In step S3302, the horizontal moving restriction unit 2407 calculates the amount of movement of the left or right end of the object which has moved into the screen of the touch UI 1904, and the processing proceeds to step S3303.

In step S3303, the horizontal moving restriction unit 2407 determines whether or not the amount of movement of the right end of the object which has moved into the screen is more than a predetermined amount. Consequently, when the amount of movement is more than a predetermined amount, the processing proceeds to step S3304. Otherwise, the processing proceeds to step S3305. In step S3304, the horizontal moving restriction unit 2407 sets the display position of the object such that the opposite end of the object against the end of the object which has moved to the inside of the screen in a movement direction is displayed at a position of the end of the screen. More specifically, the horizontal moving restriction unit 2407 corrects the x-coordinate of the starting point of the page to move the right end and the left end of the object, of which the amount of movement to the inside of the screen is more than a predetermined amount, respectively out of the screen and to the end of the screen of the touch UI so that the left side of the relevant object is displayed as much as possible. The horizontal moving restriction unit 2407 performs control such that the left end of the object is displayed at the left end position of the touch UI, and then ends processing.

When the amount of movement of the right end of the object which has moved into the screen is less than a predetermined amount in step S3303, the horizontal moving restriction unit 2407 determines in step S3305 whether or not the amount of movement of the left end of the object which has moved into the screen is more than a predetermined amount. Consequently, when the amount of movement is more than a predetermined amount, the processing proceeds to step S3306. Otherwise, the processing proceeds to step S3307.

In step S3306, the horizontal moving restriction unit 2407 corrects the x-coordinate of the starting point of the page to move the left end and the right end of the object, of which the amount of movement to the inside of the screen is more than a predetermined amount, respectively out of the screen and to the right end position of the screen of the touch UI so that the right side of the relevant object is displayed as much as possible. In other words, the horizontal moving restriction unit 2407 performs control such that the right end of the object is displayed at the right end position of the touch UI, and then ends processing. When the conditions are not met in step S3300, step S3301, or step S3305, the processing proceeds to step S3307. In step S3307, the horizontal moving restriction unit 2407 moves the left or right end of the relevant object which has moved into the screen respectively to the left or right end of the screen of the touch UI. In other words, the horizontal moving restriction unit 2407 corrects the x-coordinate of the starting point of the page such that the relevant object is displayed as much as possible, and then ends processing.

Figure 29:
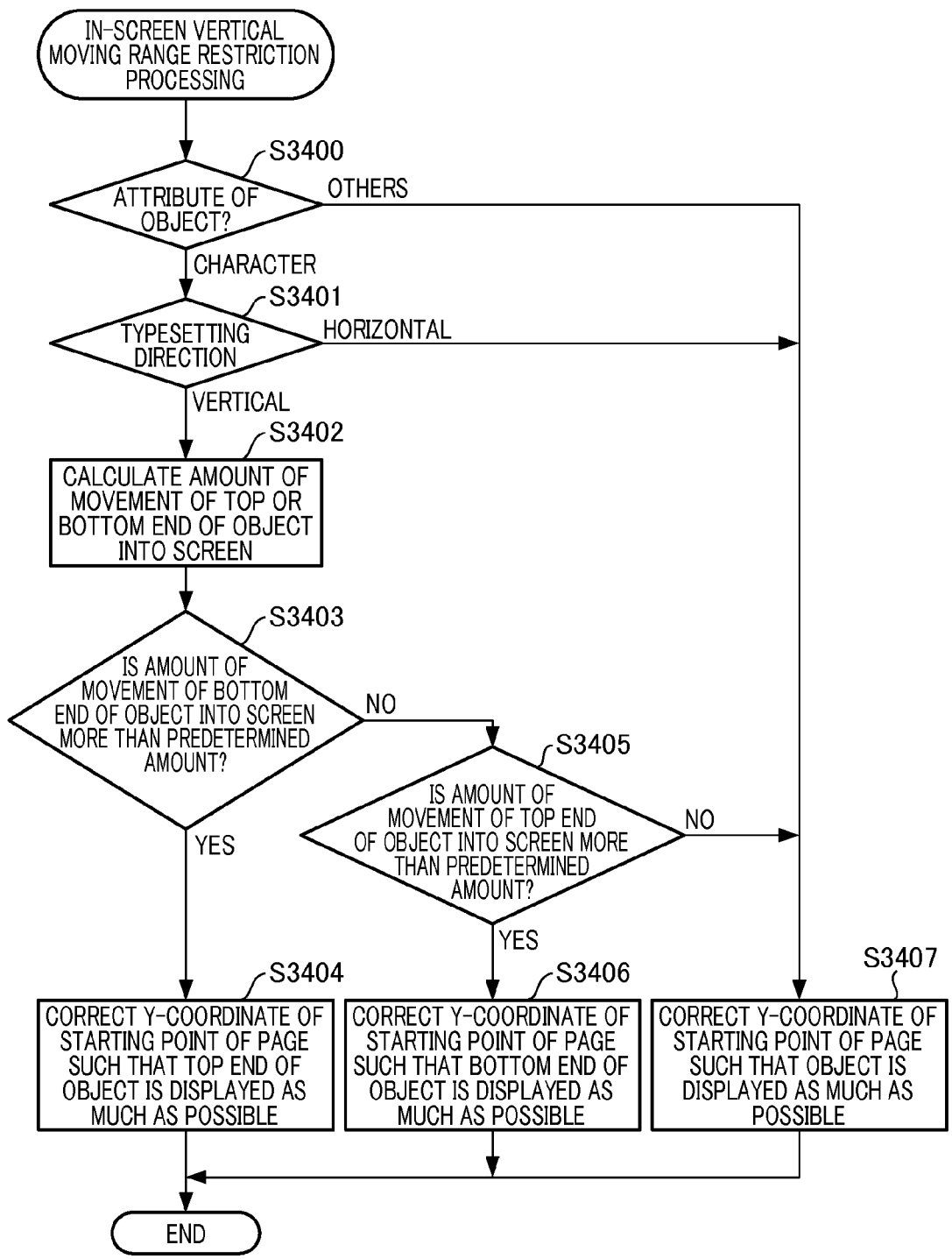
FIG. 29 is a flowchart illustrating vertical moving range restriction processing.

Next, a detailed description will be given of in-screen vertical moving range restriction processing performed by the vertical moving restriction unit 2409 provided in the moving range restriction unit 2404 with reference to the flowchart shown in FIG. 29. In step S3400, the vertical moving restriction unit 2409 determines the attribute of the currently read object. When the attribute of the object is character, the processing proceeds to step S3401. When the attribute of the object is others, the processing proceeds to step S3407.

In step S3401, the vertical moving restriction unit 2409 acquires and determines the typesetting direction of characters in the object. When the typesetting direction is vertical, the processing proceeds to step S3402. When the typesetting direction is horizontal, the processing proceeds to step S3407. Note that the typesetting direction of the object has been acquired in the vectorization processing in step S504. In step S3402, the vertical moving restriction unit 2409 calculates the amount of movement of the top or bottom end of the object which has moved into the screen of the touch UI 1904, and the processing proceeds to step S3403.

In step S3403, the vertical moving restriction unit 2409 determines whether or not the amount of movement of the bottom end of the object which has moved into the screen is more than a predetermined amount. Consequently, when the amount of movement is more than a predetermined amount, the processing proceeds to step S3404. Otherwise, the processing proceeds to step S3405.

In step S3404, the vertical moving restriction unit 2409 moves the bottom end and the top end of the object, of which the amount of movement to the inside of the screen is more than a predetermined amount, respectively out of the screen and to the top end position of the screen of the touch UI. The vertical moving restriction unit 2409 corrects the y-coordinate of the starting point of the page such that the top side of the relevant object is displayed as much as possible, and then ends processing.

When the amount of movement of the bottom end of the object which has moved into the screen is less than a predetermined amount in step S3403, the vertical moving restriction unit 2409 determines in step S3405 whether or not the amount of movement of the top end of the object which has moved into the screen is more than a predetermined amount. Consequently, when the amount of movement is more than a predetermined amount, the processing proceeds to step S3406. Otherwise, the processing proceeds to step S3407. In step S3406, the vertical moving restriction unit 2409 moves the top end and the bottom end of the object, of which the amount of movement to the inside of the screen is more than a predetermined amount, respectively out of the screen and to the bottom end position of the screen of the touch UI. The vertical moving restriction unit 2409 corrects the y-coordinate of the starting point of the page such that the bottom side of the relevant object is displayed as much as possible, and then ends processing.

When the conditions are not met in step S3400, step S3401, or step S3405, the processing proceeds to step S3407. In step S3407, the vertical moving restriction unit 2409 moves the top or bottom end of the relevant object which has moved into the screen respectively to the top or bottom end of the screen of the touch UI. The vertical moving restriction unit 2409 corrects the y-coordinate of the starting point of the page such that the entire relevant object is displayed as much as possible, and then ends processing.

As has been described with reference to FIGS. 28 and 29, the mobile terminal 107 sets the end position of the object based on the amount of movement when the object to be displayed is larger than the screen. As described above, the user can readily and surely identify the end of the object by restricting the moving range of the object. Furthermore, when the amount of movement of the end of the object which has moved into the screen is more than a predetermined amount, the opposite end of the object against the end of the object which has moved into the screen is moved to the end of the screen of the touch UI based on the typesetting direction of characters. In this manner, the user can move the object from the end to the head of a line of characters with less operation.

Figure 30A:
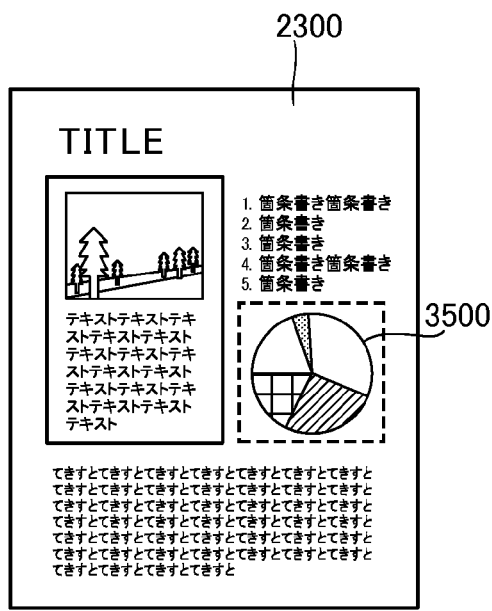
FIGS. 30A to 30D illustrate examples of screen display of the touch UI of a mobile information terminal.
Figure 30B:
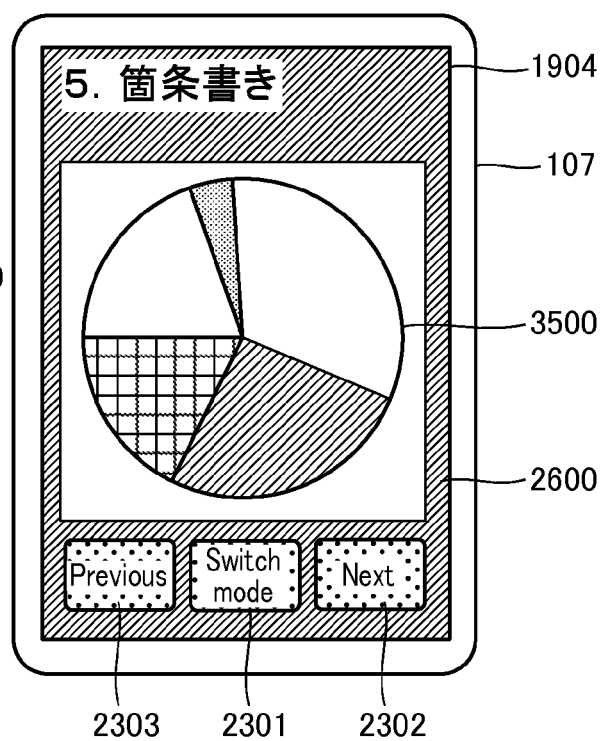

Next, a specific description will be given of moving range restriction processing and in-screen horizontal moving range restriction processing according to the present embodiment with reference to FIGS. 30A to 33D. FIGS. 30A to 33D illustrate examples of screen display of the touch UI 1904 of the mobile information terminal 107 according to the present embodiment. As shown in FIGS. 30A to 30D, an object 3500 is an object having the drawing attribute. The object 3500 has area information enclosed by the broken line shown in FIG. 30A. Since the object 3500 has the drawing attribute, the display magnification of the page is set immediately after the object 3500 is read. In other words, the display range control unit 2403 sets the display magnification of the page to a magnification with which the width and height of the relevant object fits into the width and height of the screen of the touch UI 1904 in the screen area display range determination processing. The display range control unit 2403 also sets the starting point of the page such that the center of the relevant object is aligned with the center of the touch UI 1904. An example of the set screen display is shown in FIG. 30B.

Figure 30D:
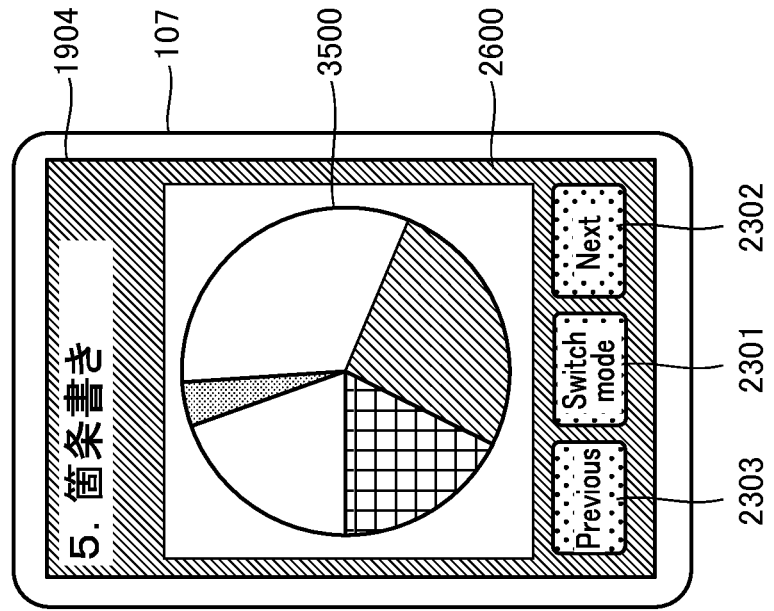
Figure 30C:
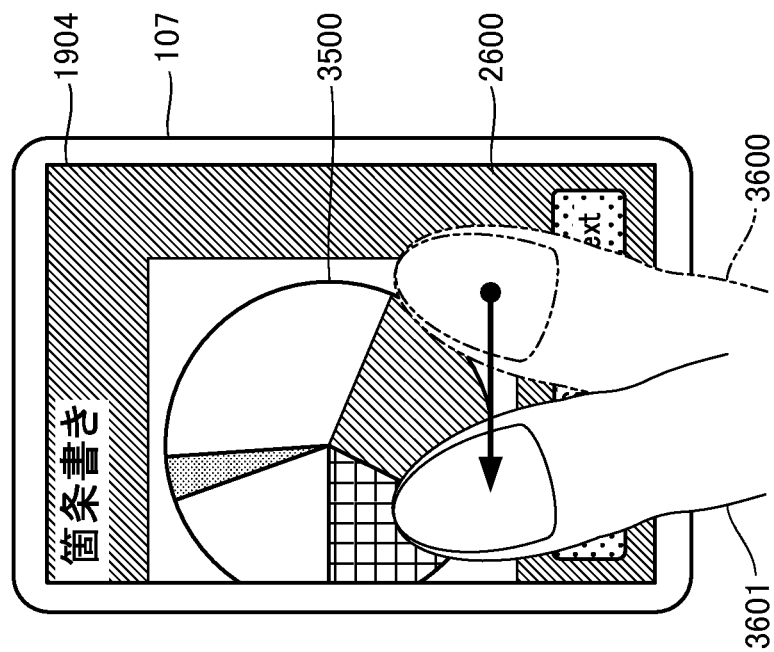

FIG. 30C illustrates an example of screen display when the swipe operation is performed in the leftward direction from the finger 3600 to the finger 3601 of the user. The swipe event processing unit 2401 updates the screen display of the touch UI 1904 by moving the starting point of the page by the moving distance each time the swipe event processing unit 2401 receives the swipe event. As shown in FIG. 30C, the left end of the object 3500 is moved out of the screen of the touch UI 1904 by the user's swipe operation.

FIG. 30D illustrates an example of screen display when the swipe event processing unit 2401 corrects the starting point of the page such that the object 3500 is displayed within the screen. The width and height of the object 3500 are smaller than the width and height of the screen of the touch UI 1904. Thus, when the object 3500 is moved out of the screen, the starting point of the page is corrected by the moving range restriction processing such that the entire relevant object is displayed within the screen.

Figure 31B:
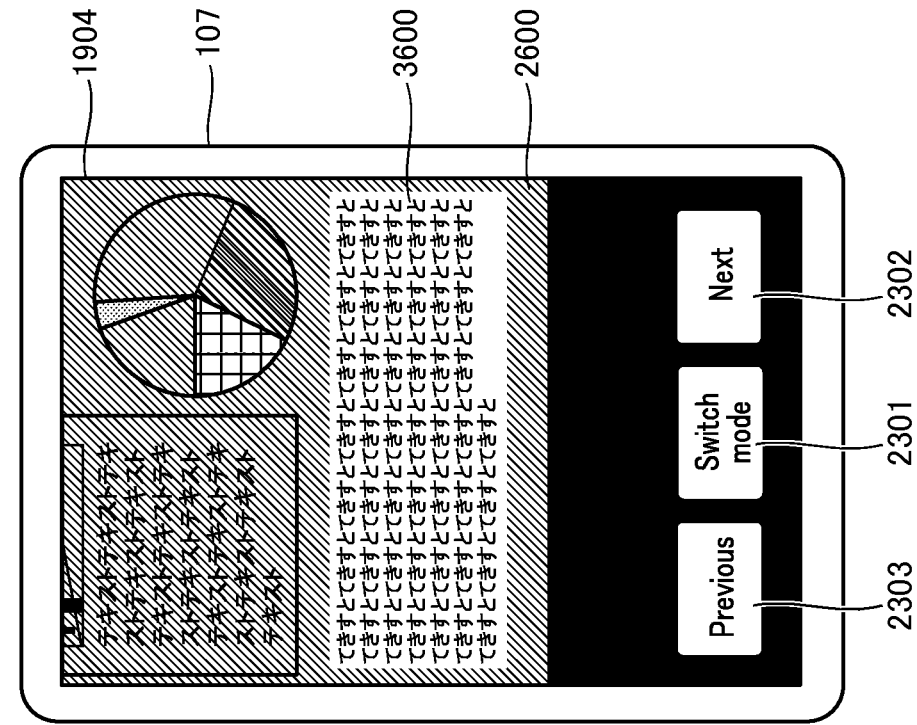
FIGS. 31A and 31B illustrate examples of screen display of the touch UI of a mobile information terminal.
Figure 31A:
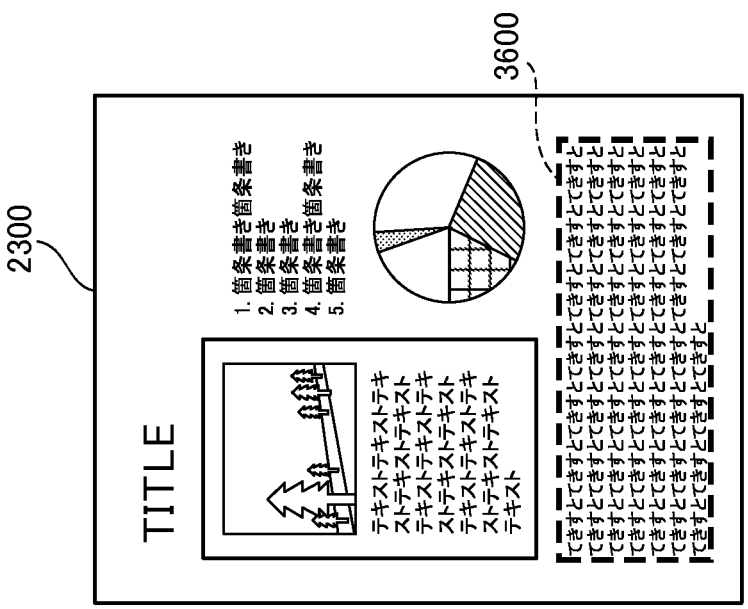

FIGS. 31A and 31B illustrate examples of screen display including an object 3600 having the character attribute for horizontal writing. The object 3600 has area information enclosed by the broken line shown in FIG. 31A. Since the object 3600 has the character attribute, the display magnification of the page is set immediately after the object 3600 is read in the partial area display mode. In other words, the display range control unit 2403 sets the display magnification of the page to a magnification with which the width of the object fits into the width of the screen of the touch UI 1904 in the partial area display range determination processing.

In the case of the object 3600, the height of the relevant object is also smaller than the height of the screen of the touch UI 1904 with the set display magnification of the page. Thus, the display range control unit 2403 sets the starting point of the page such that the center of the relevant object is aligned with the center of the touch UI 1904. An example of the set screen display is shown in FIG. 31B.

Figures 32A, 32B, 32C:
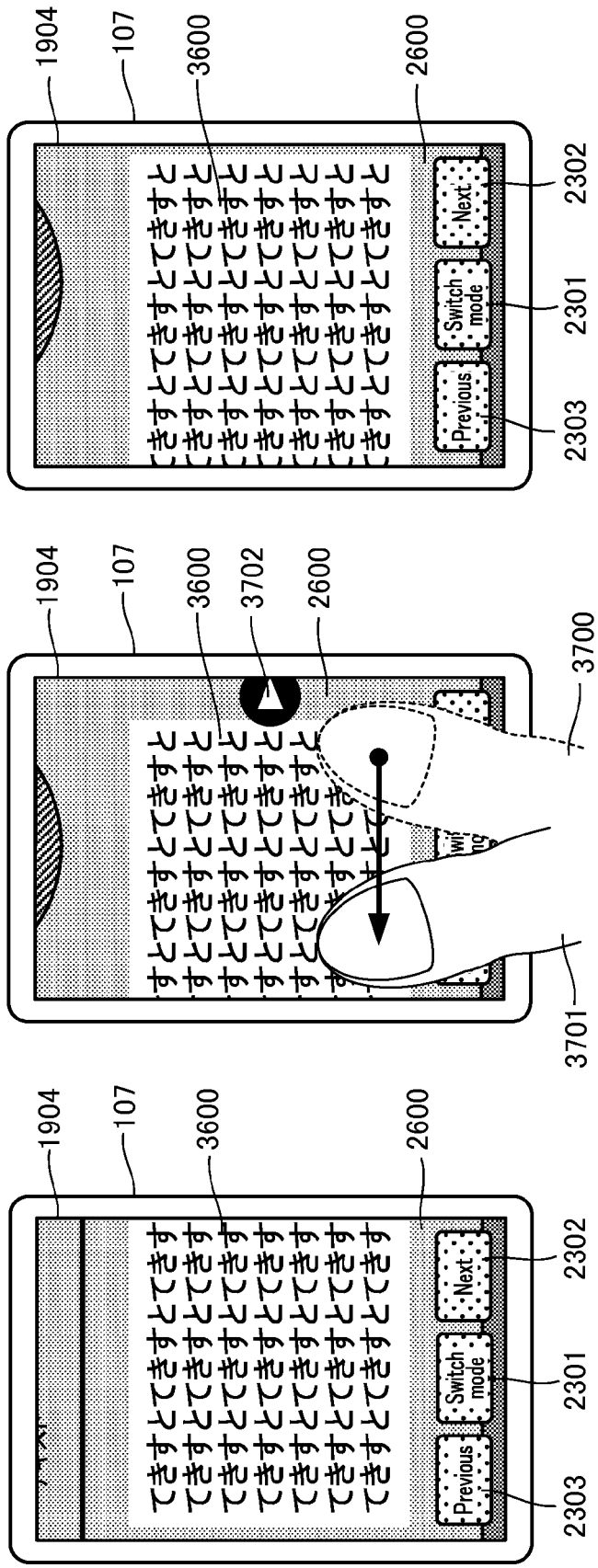
FIGS. 32A to 32E illustrate examples of screen display of the touch UI of a mobile information terminal.

FIGS. 32A to 32E illustrate examples of screen display of the touch UI 1904 by enlarging the object 3600 by the pinch-out operation. In FIG. 32A, the width of the object 3600 is larger than the width of the screen of the touch UI 1904, the right end of the object 3600 is displayed outside the screen of the touch UI 1904, and the top and bottom ends of the object 3600 are displayed within the screen.

FIG. 32B illustrates an example of screen display when the swipe operation is performed in the leftward direction from the finger 3700 to the finger 3701 of the user. The swipe event processing unit 2401 updates the screen display of the touch UI 1904 by moving the starting point of the page by the moving distance each time the swipe event processing unit 2401 receives the swipe event. As shown in FIG. 32B, the right end of the object 3600 is moved into the screen of the touch UI 1904 by the user's swipe operation. When the currently read object has the character attribute and the user's swipe operation is performed for the typesetting direction of characters, an icon 3702 shown in FIG. 32B is displayed depending on the amount of movement of the end of the object which has moved into the screen. The icon 3702 indicates as to whether the right or left end of the object 3600 is displayed on the touch UI 1904 when the user's swipe operation is completed, i.e., when the finger 3701 separates from the touch UI 1904. Since the amount of movement of the object 3600 which has moved into the screen is less than a predetermined amount as shown in FIG. 32B, the horizontal moving restriction unit 2407 displays the icon 3702 for communicating the fact that the right end of the object 3600 is displayed at the right end of the screen of the touch UI 1904 upon completion of the swipe operation to the user.

FIG. 32C illustrates an example of screen display when the horizontal moving restriction unit 2407 corrects the starting point of the page such that the object 3600 of which the right end has moved into the screen by the swipe event processing unit 2401 is displayed at the right end of the screen. The width of the object 3600 is larger than the screen width of the touch UI 1904. When the object 3600 is moved into the screen, the horizontal moving restriction unit 2407 corrects the starting point of the page such that the object 3600 is displayed at the right end of the screen by the in-screen horizontal moving range restriction processing. In the present embodiment, when the horizontal moving restriction unit 2407 corrects the starting point of the page such that the end of the object is displayed at the end of the screen, the horizontal moving restriction unit 2407 performs correction so as to clarify the end of the object. Specifically, the horizontal moving restriction unit 2407 corrects the starting point of the page with a slight margin such that a part of the semi-transparent mask 2600 is displayed at the end of the object.

Figure 32D:
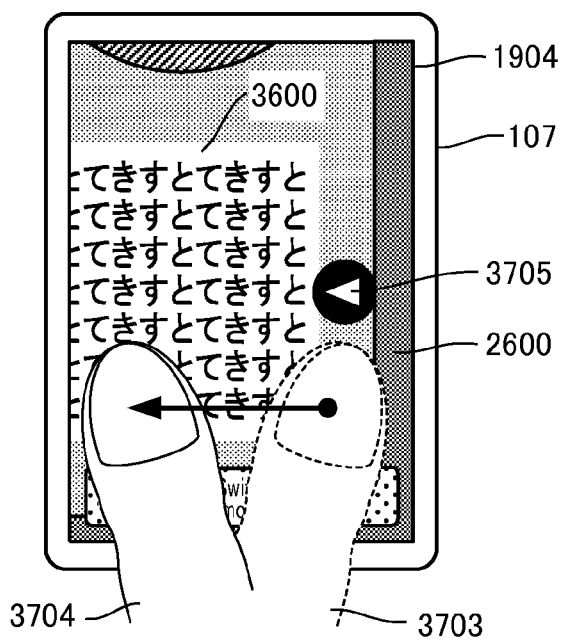

FIG. 32D illustrates an example of screen display when the swipe operation is further performed in the leftward direction from the finger 3703 to the finger 3704 of the user in contrast to the state shown in FIG. 32B. FIG. 32D illustrates an example in which the right end of the object 3600 is largely moved into the screen of the touch UI 1904 by the user's swipe operation. In other words, the horizontal moving restriction unit 2407 determines in step S3303 of the in-screen horizontal moving range restriction processing that the object 3600 has moved into the screen more than a predetermined amount. At this time, the horizontal moving restriction unit 2407 displays an icon 3705 for communicating the fact that the left end of the object 3600 is displayed at the left end of the screen of the touch UI 1904 upon completion of the swipe operation to the user.

Figure 32E:
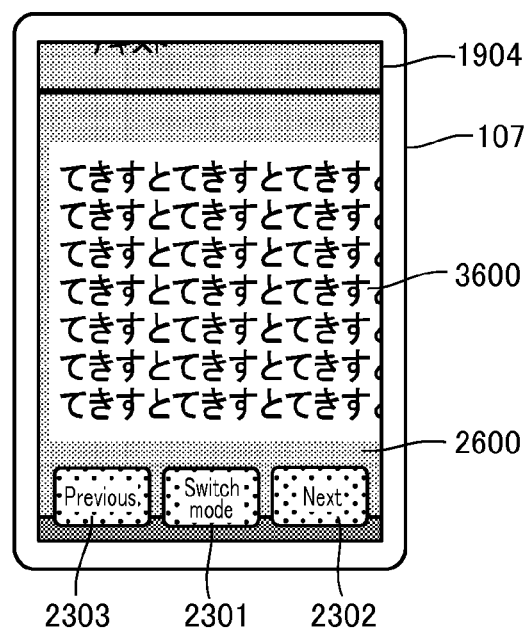

FIG. 32E illustrates an example of screen display when the starting point of the page is corrected by the in-screen horizontal moving range restriction processing upon completion of the swipe operation such that the left end of the relevant object is displayed at the left end of the touch UI 1904. The width of the object 3600 is larger than the screen width of the touch UI 1904. When the right end of the object 3600 is moved into the screen more than a predetermined amount, the horizontal moving restriction unit 2407 corrects the starting point of the page such that the left end of the relevant object is displayed at the left end of the touch UI 1904 by the in-screen horizontal moving range restriction processing. In the present embodiment, the horizontal moving restriction unit 2407 corrects the starting point of the page with a slight margin such that a part of the semi-transparent mask 2600 is displayed at the end of the object as shown in FIG. 32E.

Figure 33B:
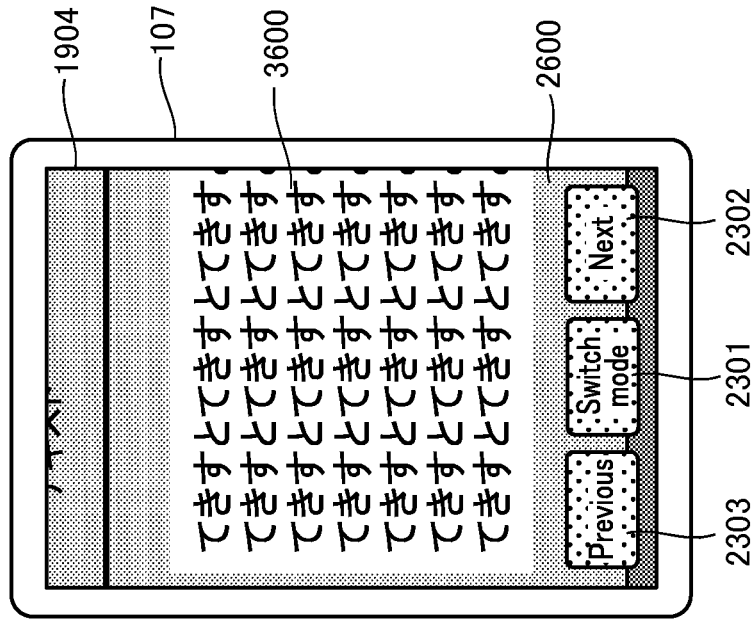
FIGS. 33A to 33D illustrate examples of screen display of the touch UI of a mobile information terminal.
Figure 33A:
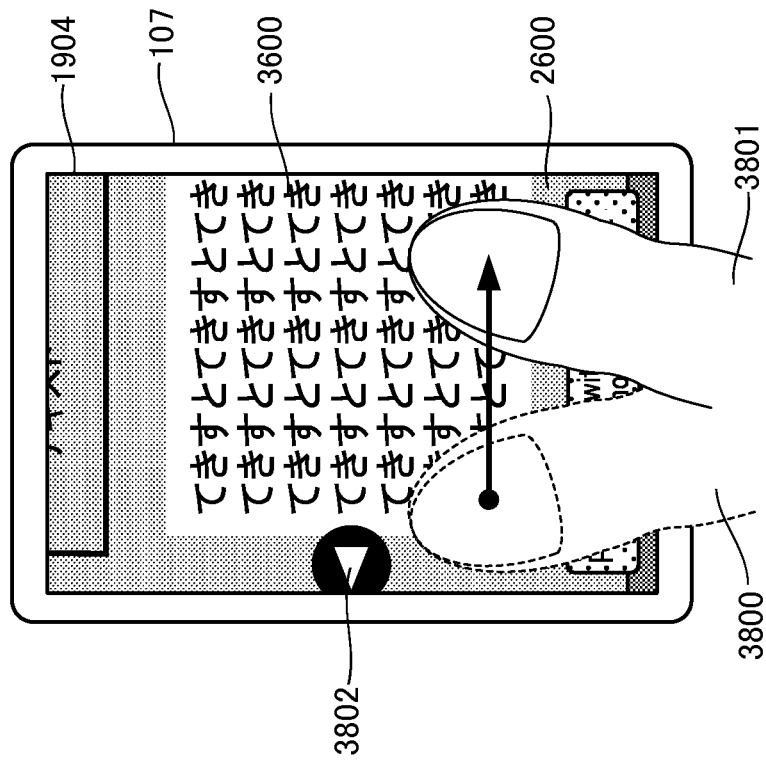

FIGS. 33A to 33D illustrate examples of screen display of the touch UI 1904 by enlarging the object 3600 by the pinch-out operation. FIG. 33A illustrates an example of screen display when the swipe operation is performed from the state shown in FIG. 32E in the rightward direction from the finger 3800 to the finger 3801 of the user. The swipe event processing unit 2401 updates the screen display of the touch UI 1904 by moving the starting point of the page by the moving distance each time the swipe event processing unit 2401 receives the swipe event. In FIG. 33A, the left end of the object 3600 is moved into the screen of the touch UI 1904 by the user's swipe operation. As in the icon 3702 shown in FIG. 32B, an icon 3802 shown in FIG. 33A indicates as to whether the left end of the object 3600 is moved to either the right end or the left end of the touch UI 1904 when the user's swipe operation is completed. In the exemplary screen shown in FIG. 33A, the amount of movement of the object 3600 which has moved into the screen is less than a predetermined amount. Thus, the horizontal moving restriction unit 2407 displays an icon 3802 for communicating the fact that the left end of the object 3600 is displayed at the left end of the screen of the touch UI 1904 upon completion of the swipe operation to the user.

FIG. 33B illustrates an example of screen display when the horizontal moving restriction unit 2407 corrects the starting point of the page such that the object 3600 of which the left end has largely moved into the screen by the swipe event processing unit 2401 is displayed at the left end of the screen. The width of the object 3600 is larger than the screen width of the touch UI 1904. When the object 3600 is moved into the screen, the horizontal moving restriction unit 2407 corrects the starting point of the page such that the left end of the object 3600 is displayed at the left end of the screen. In the present embodiment, the horizontal moving restriction unit 2407 corrects the starting point of the page with a slight margin such that a part of the semi-transparent mask 2600 is displayed at the end of the object as shown in FIG. 33B.

Figure 33D:
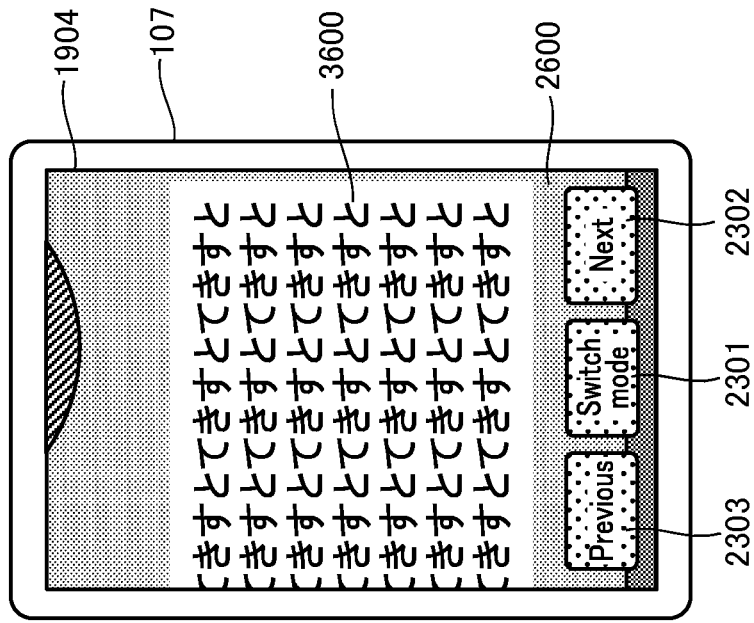
Figure 33C:
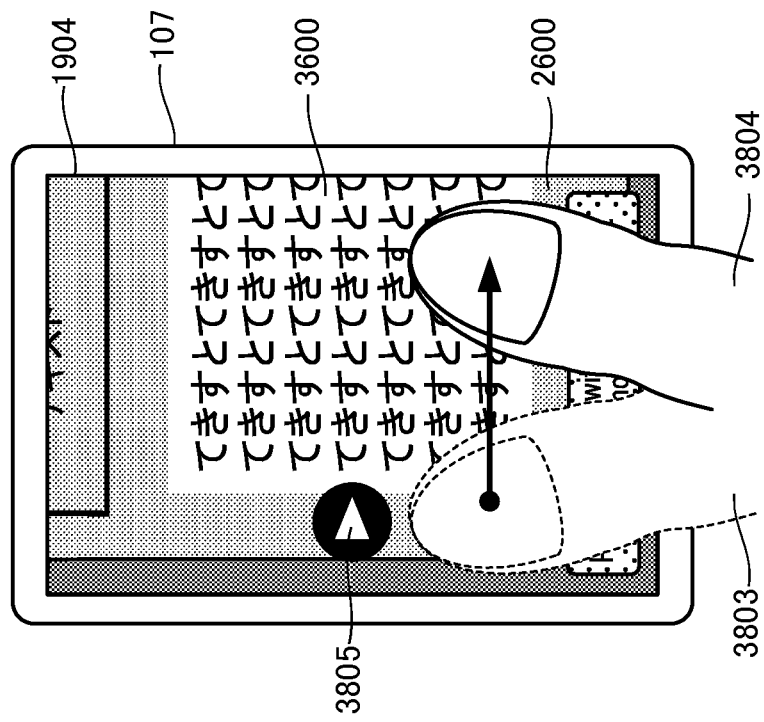

FIG. 33C illustrates an example of screen display when the object 3600 is moved more than a predetermined amount in the rightward direction from the finger 3803 to the finger 3804 of the user in contrast to the state shown in FIG. 33B. In other words, the horizontal moving restriction unit 2407 determines in step S3305 of the in-screen horizontal moving range restriction processing that the object 3600 has moved into the screen more than a predetermined amount. The horizontal moving restriction unit 2407 displays an icon 3805 for communicating the fact that the right end of the object 3600 is displayed at the right end of the screen of the touch UI 1904 upon completion of the swipe operation to the user.

FIG. 33D illustrates an example of screen display when the horizontal moving restriction unit 2407 corrects the starting point of the page for the object 3600 of which the left end has largely moved into the screen by the swipe event processing unit 2401. The width of the object 3600 is larger than the screen width of the touch UI 1904. When the left end of the object 3600 is moved into the screen more than a predetermined amount, the horizontal moving restriction unit 2407 corrects the starting point of the page such that the right end of the relevant object is displayed at the right end of the touch UI 1904. In the present embodiment, the horizontal moving restriction unit 2407 corrects the starting point of the page with a slight margin such that a part of the semi-transparent mask 2600 is displayed at the end of the object as shown in FIG. 33D.

Next, a specific description will be given of in-screen vertical moving range restriction processing in the present embodiment with reference to FIGS. 34A to 36D. FIGS. 34A to 36D illustrate examples of screen display of the touch UI 1904 of the mobile information terminal 107 according to the present embodiment.

As shown in FIG. 34A and FIG. 34B, an object 3901 is an object having the character attribute for vertical writing in a page 3900. The object 3901 has area information enclosed by the broken line shown in FIG. 34A. Since the object 3901 has the character attribute, the display magnification of the page is set immediately after the object 3901 is read in the partial area display mode. In other words, the display range control unit 2403 sets the display magnification of the page to a magnification with which the height of the object fits into the height of the screen of the touch UI 1904 in the partial area display range determination processing. In the case of the object 3901, the width of the relevant object is also smaller than the width of the screen of the touch UI 1904 with the set display magnification of the page. Thus, the display range control unit 2403 sets the starting point of the page 3900 such that the center of the relevant object is aligned with the center of the touch UI 1904. An example of screen display of the set object is shown in FIG. 34B.

Figure 35E:
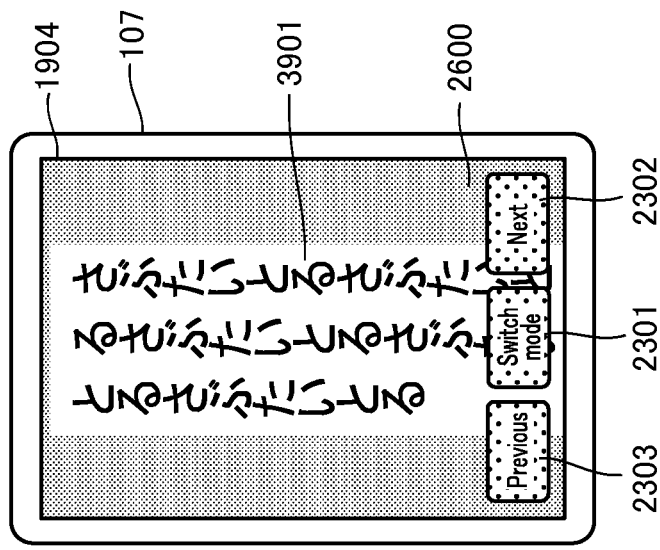

FIGS. 35A to 35E illustrate examples of screen display of the touch UI 1904 by enlarging the object 3901 by the pinch-out operation. As shown in FIG. 35A, the height of the object 3901 is larger than the height of the screen of the touch UI 1904, the top end of the object 3901 is displayed outside the screen of the touch UI 1904, and the left and right ends of the object 3901 are displayed within the screen. FIG. 35B illustrates an example of screen display when the swipe operation is performed in the upward direction from the finger 4000 to the finger 4001 of the user. The swipe event processing unit 2401 updates the screen display of the touch UI 1904 by moving the starting point of the page by the moving distance each time the swipe event processing unit 2401 receives the swipe event. FIG. 35B illustrates an example of screen display when the bottom end of the object 3901 is moved into the screen of the touch UI 1904 by the user's swipe operation.

When the currently read object has the character attribute and the user's swipe operation is performed for the typesetting direction of characters, light 4002 shown in FIG. 35B is displayed depending on the amount of movement of the end of the object which has moved into the screen. The light 4002 indicates as to whether the bottom end of the object 3901 is moved to either the top or bottom end of the touch UI 1904 by light illumination when the user's swipe operation is completed, i.e., when the finger 4001 separates from the touch UI 1904. In the state shown in FIG. 35B, the amount of movement of the object 3600 which has moved into the screen is less than a predetermined amount. The vertical moving restriction unit 2409 displays the light 4002 for communicating the fact that the bottom end of the object 3901 is moved to the bottom end of the screen of the touch UI 1904 upon completion of the swipe operation to the user.

FIG. 35C illustrates an example of screen display when the vertical moving restriction unit 2409 corrects the starting point of the page such that the object 3901 of which the bottom end has moved into the screen by the swipe event processing unit 2401 is displayed at the bottom end of the screen. The height of the object 3901 is larger than the height of the screen of the touch UI 1904. When the object 3901 is moved into the screen, the vertical moving restriction unit 2409 corrects the starting point of the page such that the bottom end of the object 3901 is displayed at the bottom end of the screen by the in-screen vertical moving range restriction processing. In the present embodiment, when the vertical moving restriction unit 2409 corrects the starting point of the page, the vertical moving restriction unit 2409 corrects the starting point of the page with a slight margin such that a part of the semi-transparent mask 2600 is displayed at the end of the object so as to clarify the end of the object.

Figure 35D:
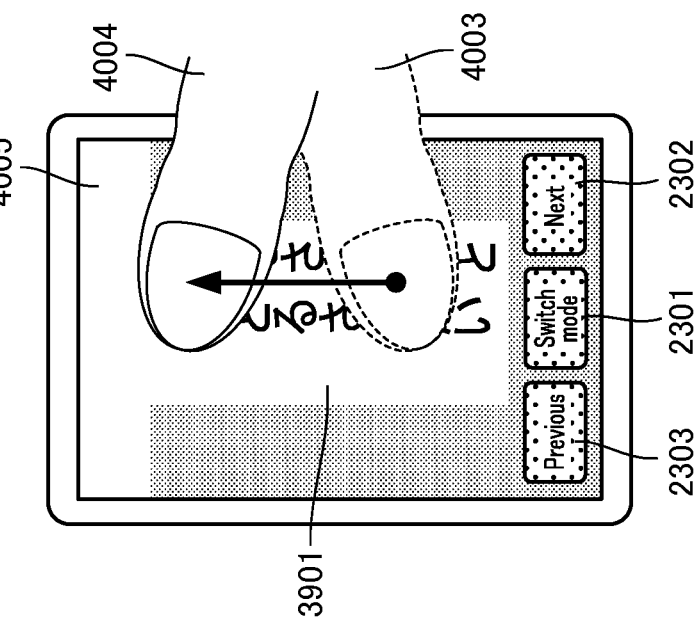

FIG. 35D illustrates an example of screen display when the object 3901 is moved more than a predetermined amount in the upward direction from the finger 4003 to the finger 4004 of the user in contrast to the state shown in FIG. 35B. FIG. 35D illustrates an example in which the bottom end of the object 3901 is largely moved into the screen of the touch UI 1904 by the user's swipe operation. The vertical moving restriction unit 2409 determines in step S3403 of the in-screen vertical moving range restriction processing that the amount of movement of the object 3901 to the inside of the screen is more than a predetermined amount. The vertical moving restriction unit 2409 displays light 4005 for communicating the fact that the top end of the object 3901 is displayed at the top end of the screen of the touch UI 1904 upon completion of the swipe operation to the user.

FIG. 35E illustrates an example of screen display when the vertical moving restriction unit 2409 corrects the starting point of the page for the object 3901 of which the bottom end has largely moved into the screen by the swipe event processing unit 2401. The height of the object 3901 is larger than the height of the screen of the touch UI 1904. Thus, when the bottom end of the object 3901 is moved into the screen more than a predetermined amount, the vertical moving restriction unit 2409 corrects the starting point of the page by the in-screen vertical moving range restriction processing such that the top end of the relevant object is displayed at the top end of the touch UI 1904. In the present embodiment, the vertical moving restriction unit 2409 corrects the starting point of the page with a slight margin such that a part of the semi-transparent mask 2600 is displayed at the end of the object as shown in FIG. 35E.

Figure 36B:
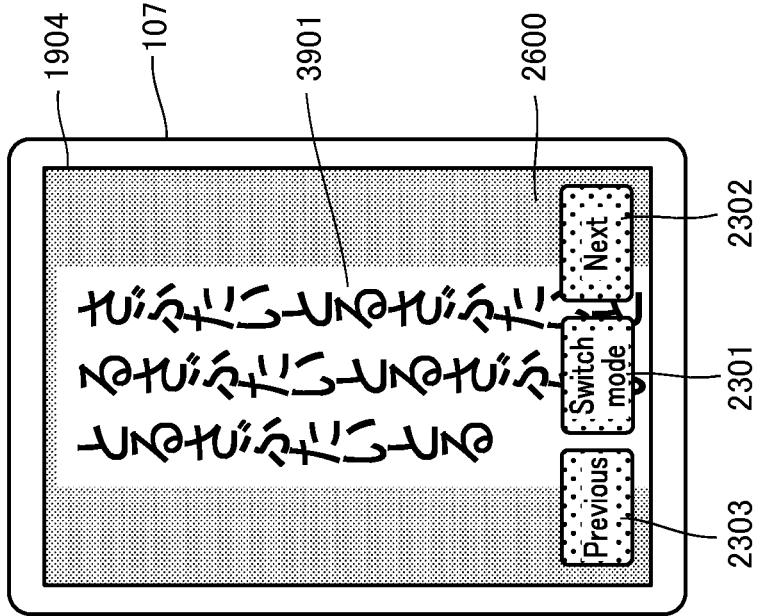
Figure 36A:
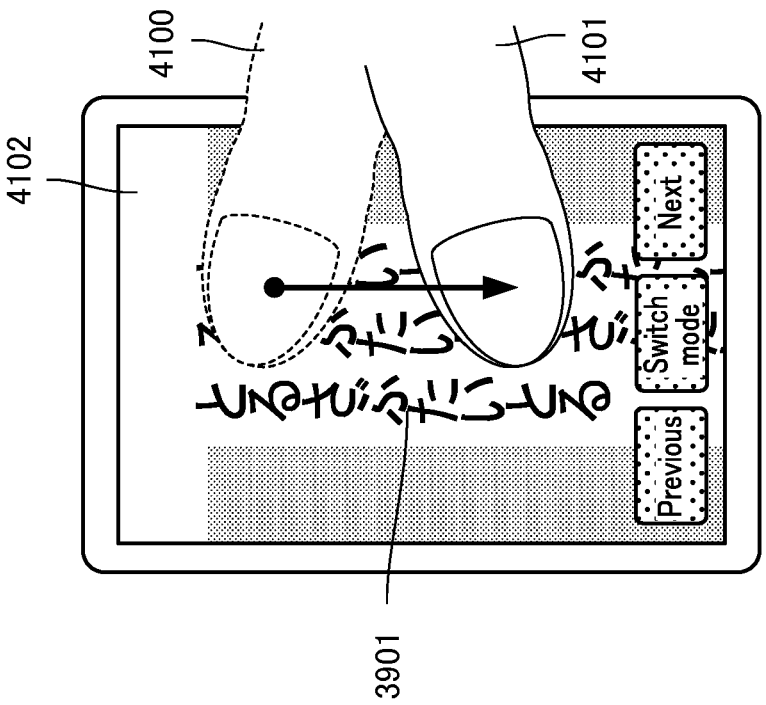

FIGS. 36A to 36D illustrate examples of screen display of the touch UI 1904 by enlarging the object 3901 by the pinch-out operation. FIG. 36A illustrates an example of screen display when the swipe operation is performed from the state shown in FIG. 35E in the downward direction from the finger 4100 to the finger 4101 of the user. The swipe event processing unit 2401 updates the screen display of the touch UI 1904 by moving the starting point of the page by the moving distance each time the swipe event processing unit 2401 receives the swipe event. As shown in FIG. 36A, the top end of the object 3901 is moved into the screen of the touch UI 1904 by the user's swipe operation. As in the light 4002 shown in FIG. 35B, light 4102 shown in FIG. 36A indicates as to whether the top end of the object 3901 is moved to either the top or bottom end of the touch UI 1904 when the user's swipe operation is completed. In the state shown in FIG. 36A, the amount of movement of the object 3600 which has moved into the screen is less than a predetermined amount. The vertical moving restriction unit 2409 displays the light 4102 for communicating the fact that the top end of the object 3901 is displayed at the top end of the screen of the touch UI 1904 upon completion of the swipe operation to the user.

FIG. 36B illustrates an example of screen display when the vertical moving restriction unit 2409 corrects the starting point of the page such that the object 3901 of which the top end has moved into the screen by the swipe event processing unit 2401 is displayed at the top end of the screen. The height of the object 3901 is larger than the height of the screen of the touch UI 1904. When the object 3901 is moved into the screen, the vertical moving restriction unit 2409 corrects the starting point of the page such that the top end of the object 3901 is displayed at the top end of the screen by the in-screen vertical moving range restriction processing. In the present embodiment, the vertical moving restriction unit 2409 corrects the starting point of the page with a slight margin such that a part of the semi-transparent mask 2600 is displayed at the end of the object as shown in FIG. 36B.

FIG. 36C illustrates an example of screen display when the object 3901 is moved more than a predetermined amount in the downward direction from the finger 4103 to the finger 4104 of the user in contrast to the state shown in FIG. 36B. FIG. 36C illustrates an example of screen display when the top end of the object 3901 is largely moved into the screen of the touch UI 1904 by the user's swipe operation. The vertical moving restriction unit 2409 determines in step S3405 that the top end of the object 3901 is moved into the screen more than a predetermined amount. Thus, the vertical moving restriction unit 2409 displays light 4105 for communicating the fact that the bottom end of the object 3901 is displayed at the bottom end of the screen of the touch UI 1904 upon completion of the swipe operation to the user.

FIG. 36D illustrates an example of screen display when the vertical moving restriction unit 2409 corrects the starting point of the page for the object 3901 of which the top end has largely moved into the screen by the swipe event processing unit 2401. The height of the object 3901 is larger than the height of the screen of the touch UI 1904. When the top end of the object 3901 is moved into the screen more than a predetermined amount, the vertical moving restriction unit 2409 corrects the starting point of the page by the in-screen vertical moving range restriction processing such that the bottom end of the relevant object is displayed at the bottom end of the touch UI 1904. In the present embodiment, the vertical moving restriction unit 2409 corrects the starting point of the page with a slight margin such that a part of the semi-transparent mask 2600 is displayed at the end of the object as shown in FIG. 36D.

Upon completion of the user's swipe operation, the starting point of the page is corrected to a predetermined position by the moving range restriction processing, the in-screen horizontal moving range restriction processing, or the in-screen vertical moving range restriction processing. At this time, the change in display content of the touch UI 1904 caused by correction is smoothly changed by animation from a pre-corrected position to a corrected position. Although the time taken for movement is preferably about 0.5 seconds, it goes without saying that the time may vary depending on the moving distance.

In FIGS. 32A to 32E, the moved position of the object upon completion of the swipe operation is presented to the user via the icons 3702 and 3705. In FIGS. 33A to 33D, the moved position of the object upon completion of the swipe operation is presented to the user via the icons 3802 and 3805. In FIGS. 35A to 35E, the moved position of the object is presented to the user via the lights 4002 and 4005. In FIGS. 36A to 36E, the moved position of the object is presented to the user via the lights 4102 and 4105. As described above, while, in the present embodiment, a description has been given by taking an example of screen display of the moved position of two objects which may vary depending on a direction thereof, the present invention is not limited thereto. For example, it goes without saying that the same display method may be used in the different typesetting direction of characters or the user may also be informed of the moved position of the object via not only an icon or light but also characters and the like.

As described above, the image display apparatus of the present embodiment precisely controls the display position of an image object larger than the screen, so that the user operability and visibility can be improved. Thus, the user can move a character attribute object which has been enlarged larger than the screen size by a user enlargement instruction due to the small size of the characters from the end to the head of a line or from the head to the end of a line by the user's simple operation. Only when the amount of movement of the end of the object which has moved into the screen is more than a predetermined amount, the opposite end of the object against the end of the object which has moved into the screen is moved to the end of the screen of the touch UI, so that the user can surely recognize the end of the object. In this manner, the user can move the character object to the head or the end of a line with less operation after the user has read all characters included in the line, so that the user can smoothly view the characters included in the object.

(Second Embodiment)

In the second embodiment, when the end of the object is moved into the screen and out of the screen more than a predetermined amount with respect to the typesetting direction of characters in the object, the starting point of the page is corrected by the moving range restriction processing not only in the typesetting direction of characters but also in the direction perpendicular thereto. Since the moving range control processing is only partially different from that in the first embodiment, the same reference numerals denote the same portions as those in the first embodiment and only a different portion different from the first embodiment will be described below.

Figure 37:
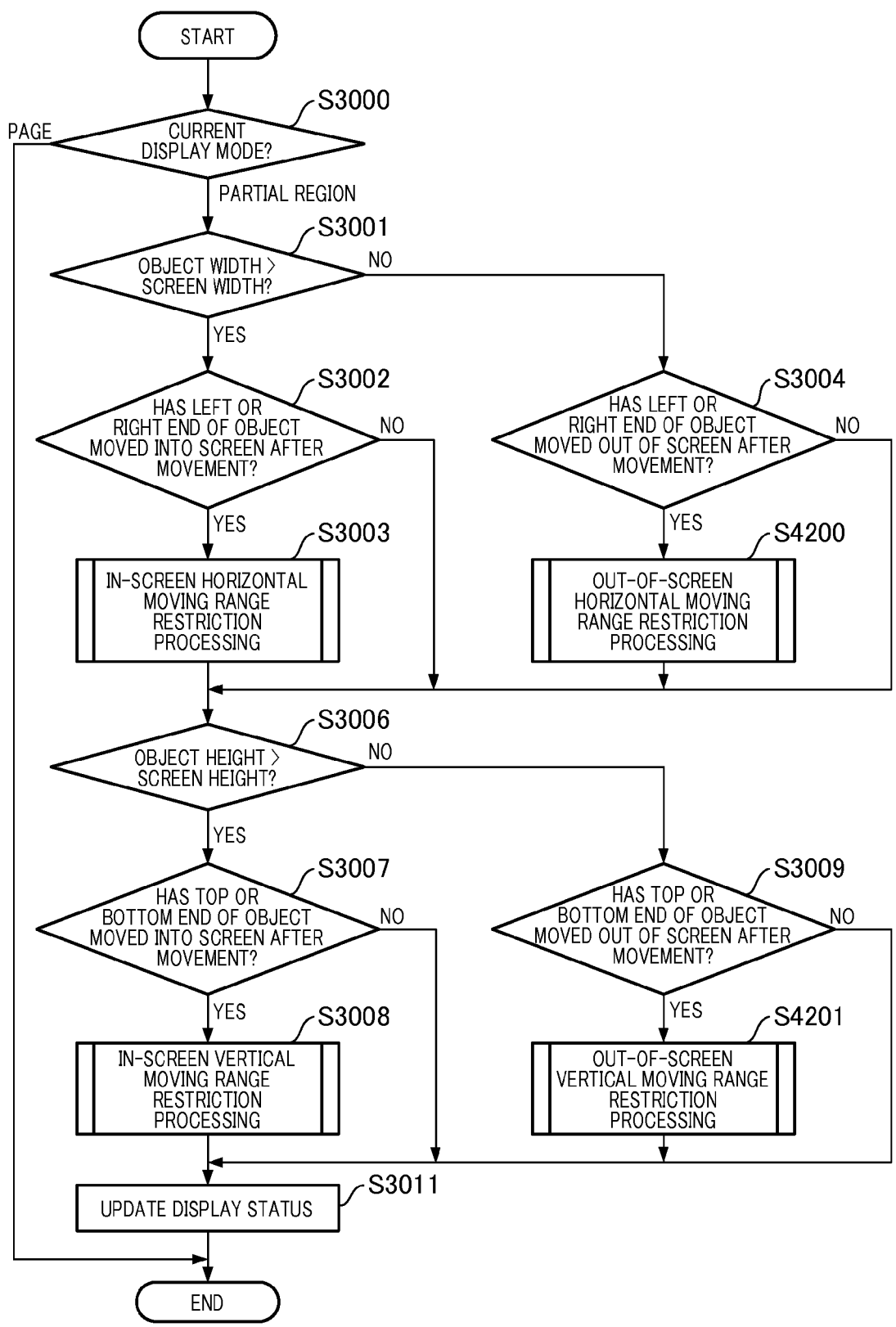
FIG. 37 is a flowchart illustrating moving range restriction processing according to a second embodiment.

FIG. 37 is a flowchart illustrating moving range control processing according to the second embodiment. The out-of-screen horizontal moving range restriction processing in step S4200 and the out-of-screen vertical moving range restriction processing in step S4201 are different from the first embodiment (FIG. 27). In the present embodiment, when the width of the relevant object is not larger than the width of the screen of the touch UI 1904 in step S3001, the swipe event processing unit 2401 moves the display position of the page containing the relevant object depending on the moving distance of the swipe event in step S3004. At this time, the moving range restriction unit 2404 determines whether or not the left or right end of the object has moved out of the screen of the touch UI 1904. Consequently, when the left or right end of the object is determined to be outside of the screen of the touch UI 1904, the processing proceeds to step S4200. Otherwise, the processing proceeds to step S3006. When the height of the object is not larger than the height of the screen of the touch UI 1904 in step S3006, the swipe event processing unit 2401 moves the display position of the page containing the relevant object depending on the moving distance of the swipe event in step S3009. At this time, the moving range restriction unit 2404 determines whether or not the top or bottom end of the object has moved out of the screen of the touch UI 1904. Consequently, when the top or bottom end of the object is determined to be outside of the screen of the touch UI 1904, the processing proceeds to step S4201. Otherwise, the processing proceeds to step S3011.

Figure 38:
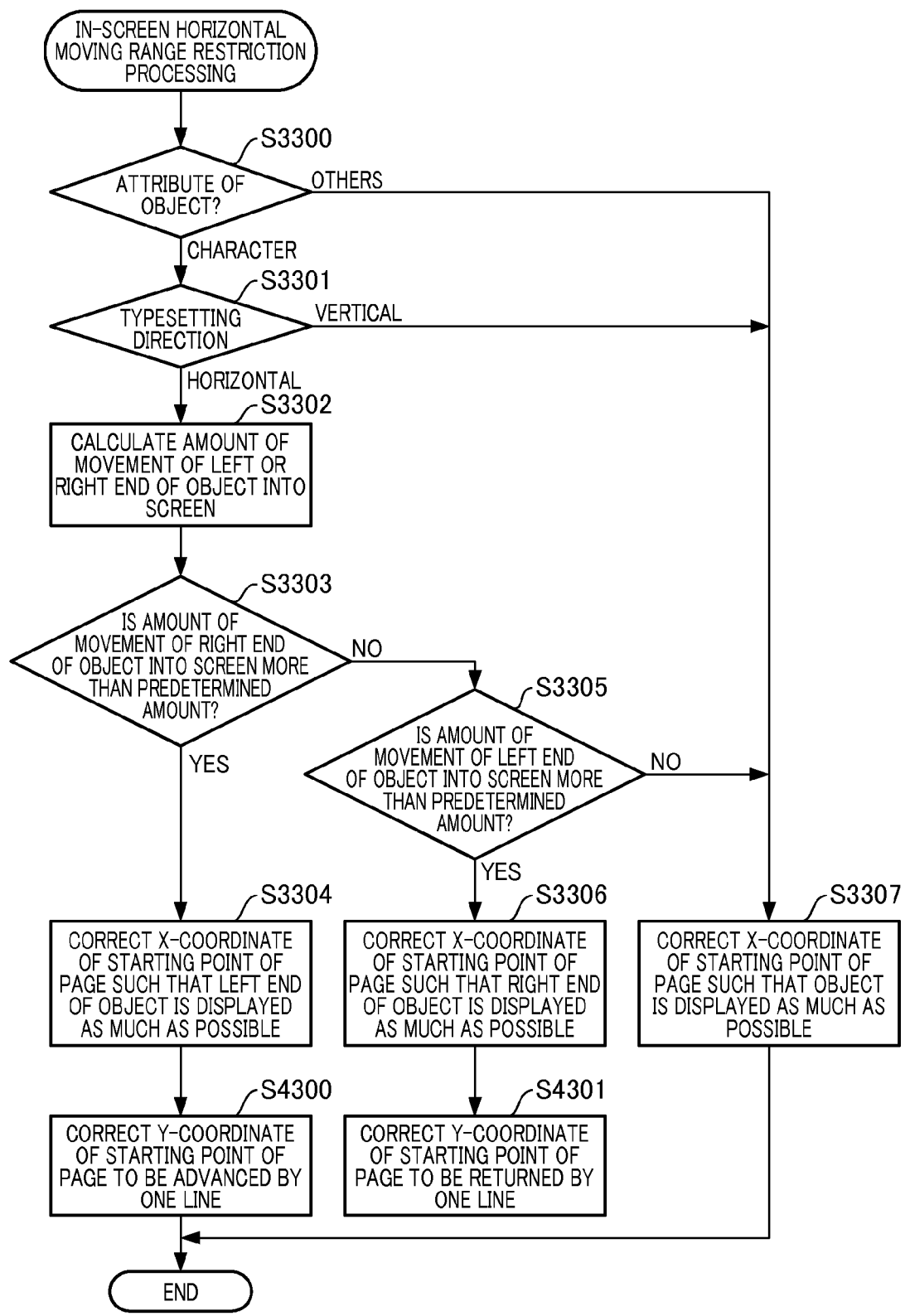
FIG. 38 is a flowchart illustrating horizontal moving range restriction processing.

Next, a description will be given of in-screen horizontal moving range restriction processing according to the present embodiment with reference to FIG. 38. FIG. 38 is a flowchart illustrating the in-screen horizontal moving range restriction processing according to the present embodiment. The in-screen horizontal moving range restriction processing is different from the first embodiment (FIG. 28) in that steps S4300 and S4301 are included in the processing.

In step S4300, the horizontal moving restriction unit 2407 performs correction such that the y-coordinate of the starting point of the page is advanced by the height of the character size obtained by the vectorization processing in step S504, and then ends processing. In step S4301, the horizontal moving restriction unit 2407 performs correction such that the y-coordinate of the starting point of the page is returned by the height of the character size, and then ends processing.

In this manner, when the right end of the object is moved into the screen more than a predetermined amount, the starting point of the page is controlled such that the left end of the object comes at the left end of the screen. Characters can be sent to the next line by one line at the same time that the object is moved from the end to the head of a line of characters. Thus, the user can read the next line without vertically displacing his view point. When the left end of the object is moved into the screen more than a predetermined amount, the starting point of the page is controlled such that the right end of the object comes at the right end of the screen. Characters can be moved to the preceding line by one line at the same time that the object is moved from the head to the end of a line of characters. Thus, the user can read the preceding line without vertically displacing his view point.

Figure 39:
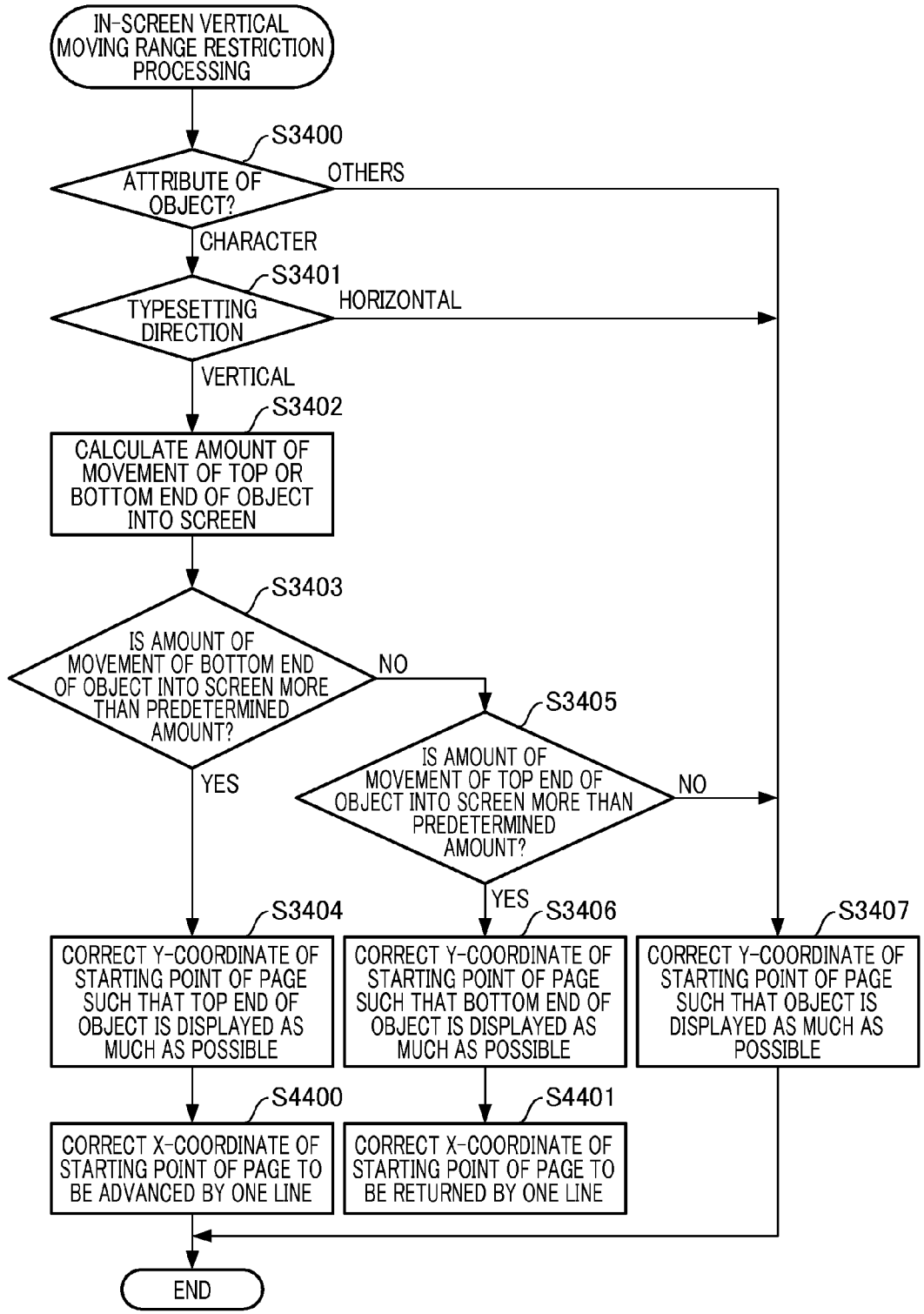
FIG. 39 is a flowchart illustrating vertical moving range restriction processing.

Next, a description will be given of in-screen vertical moving range restriction processing according to the present embodiment with reference to FIG. 39. FIG. 39 is a flowchart illustrating the in-screen vertical moving range restriction processing according to the present embodiment. The in-screen vertical moving range restriction processing is different from the first embodiment (FIG. 29) in that steps S4400 and S4401 are included in the processing. In step S4400, the vertical moving restriction unit 2409 performs correction such that the x-coordinate of the starting point of the page is advanced by the width of the character size obtained by the vectorization processing in step S504, and then ends processing. In step S4401, the vertical moving restriction unit 2409 performs correction such that the x-coordinate of the starting point of the page is returned by the width of the character size, and then ends processing.

In this manner, when the bottom end of the object is moved into the screen more than a predetermined amount, the starting point of the page is controlled such that the top end of the object comes at the top end of the screen. Characters can be sent to the next line by one line at the same time that the object is moved from the end to the head of a line of characters. Thus, the user can read the next line without horizontally displacing his view point. When the top end of the object is moved into the screen more than a predetermined amount, the starting point of the page is controlled such that the bottom end of the object comes at the bottom end of the screen. Characters can be moved to the preceding line by one line at the same time that the object is moved from the head to the end of a line of characters. Thus, the user can read the preceding line without horizontally displacing his view point.

Figure 40:
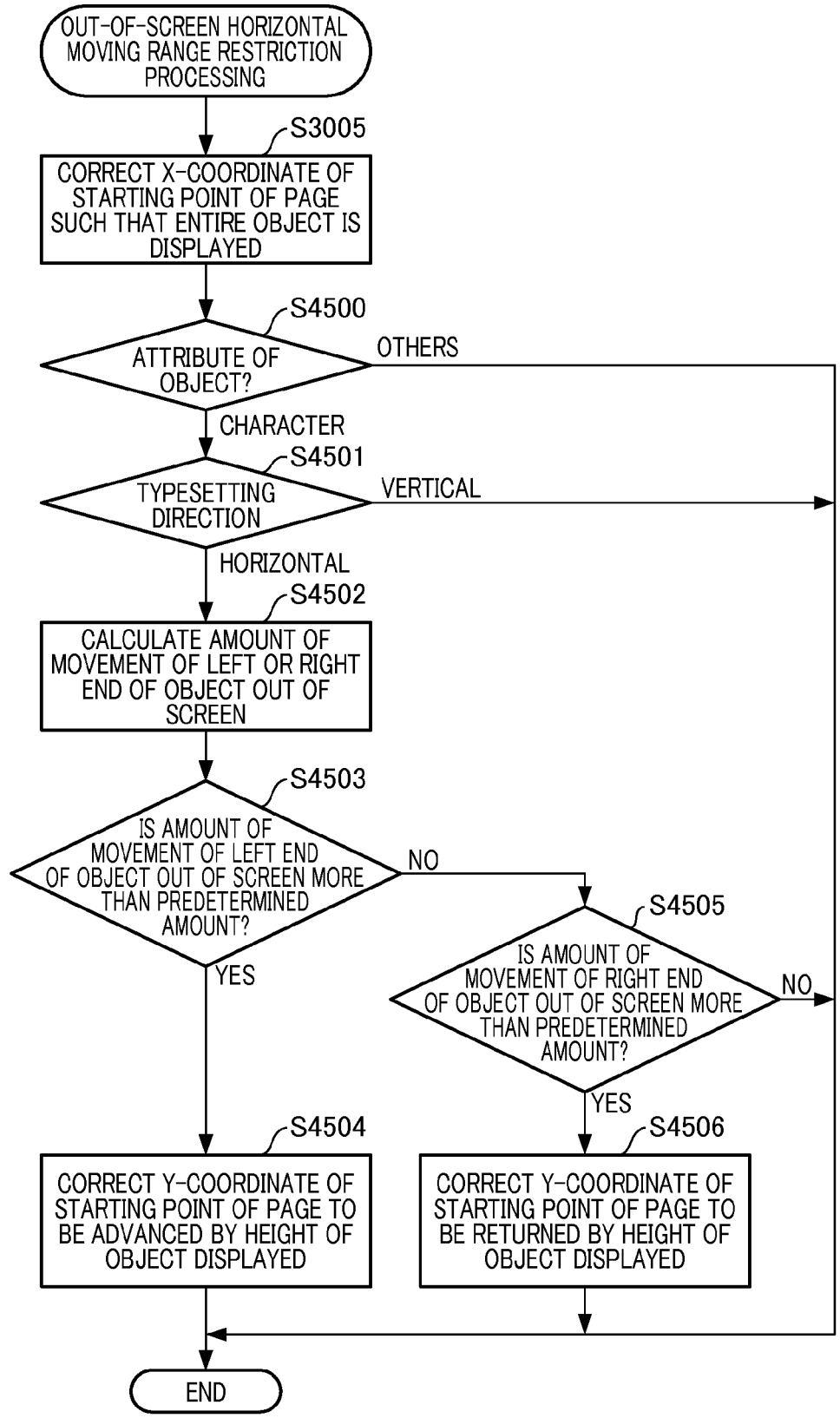
FIG. 40 is a flowchart illustrating out-of-screen horizontal moving range restriction processing.

Next, a description will be given of out-of-screen horizontal moving range restriction processing according to the present embodiment with reference to FIG. 40. FIG. 40 is a flowchart illustrating out-of-screen horizontal moving range restriction processing according to the present embodiment. As in step S3005 in the first embodiment, in step S3005, the x-coordinate of the starting point of the page is corrected by moving the left or right end of the object to the end of the screen so that the entire relevant object is displayed.

In step S4500, the horizontal moving restriction unit 2407 determines the attribute of the currently read object. When the attribute of the object is character, the processing proceeds to step S4501. When the attribute of the object is others, the processing ends. In step S4501, the horizontal moving restriction unit 2407 acquires and determines the typesetting direction of characters in the object. When the typesetting direction is horizontal, the processing proceeds to step S4502. When the typesetting direction is vertical, the processing ends. Note that the typesetting direction of the object has been acquired in the vectorization processing in step S504.

In step S4502, the horizontal moving restriction unit 2407 calculates the amount of movement of the left or right end of the object which has moved out of the screen of the touch UI 1904, and the processing proceeds to step S4503. In step S4503, the horizontal moving restriction unit 2407 determines whether or not the amount of movement of the left end of the object which has moved out of the screen is more than a predetermined amount. Consequently, when the amount of movement is more than a predetermined amount, the processing proceeds to step S4504. Otherwise, the processing proceeds to step S4505.

In step S4504, the horizontal moving restriction unit 2407 performs correction such that the y-coordinate of the starting point of the page is advanced by the height of the object displayed within the screen, and then ends processing. When the bottom end of the object is moved into the screen upon correction of the y-coordinate of the starting point of the page by the height of the object displayed within the screen, the y-coordinate of the starting point of the page is corrected by the amount of movement of the bottom end of the object to the bottom end of the screen.

When the amount of movement of the left end of the object which has moved out of the screen is less than a predetermined amount in step S4503, the horizontal moving restriction unit 2407 determines in step S4505 whether or not the amount of movement of the right end of the object which has moved out of the screen is more than a predetermined amount. Consequently, when the amount of movement is more than a predetermined amount, the processing proceeds to step S4506. Otherwise, the processing ends.

In step S4506, the horizontal moving restriction unit 2407 performs correction such that the y-coordinate of the starting point of the page is returned by the height of the object displayed within the screen, and then ends processing. When the top end of the object is moved into the screen upon correction of the y-coordinate of the starting point of the page by the height of the object displayed within the screen, the y-coordinate of the starting point of the page is corrected by the amount of movement of the top end of the object to the top end of the screen.

In this manner, when the left end of the object is moved out of the screen more than a predetermined amount in the case of display magnification set such that the width of the object fits into the screen, the starting point of the page is controlled such that the left end of the object comes at the left end of the screen. In addition, the screen can be moved to the next screen by the amount of a portion displayed on the screen at the same time the left end of the object is returned to the left end of the screen. Thus, the user can read next characters only by a simpler swipe operation. When the right end of the object is moved out of the screen more than a predetermined amount in the case of display magnification set such that the width of the object fits into the screen, the starting point of the page is controlled such that the right end of the object comes at the right end of the screen. In addition, the screen can be sent back to the previous screen by the amount of a portion displayed on the screen at the same time the right end of the object is returned to the right end of the screen. Thus, the user can read previous characters only by a simpler swipe operation.

Figure 41:
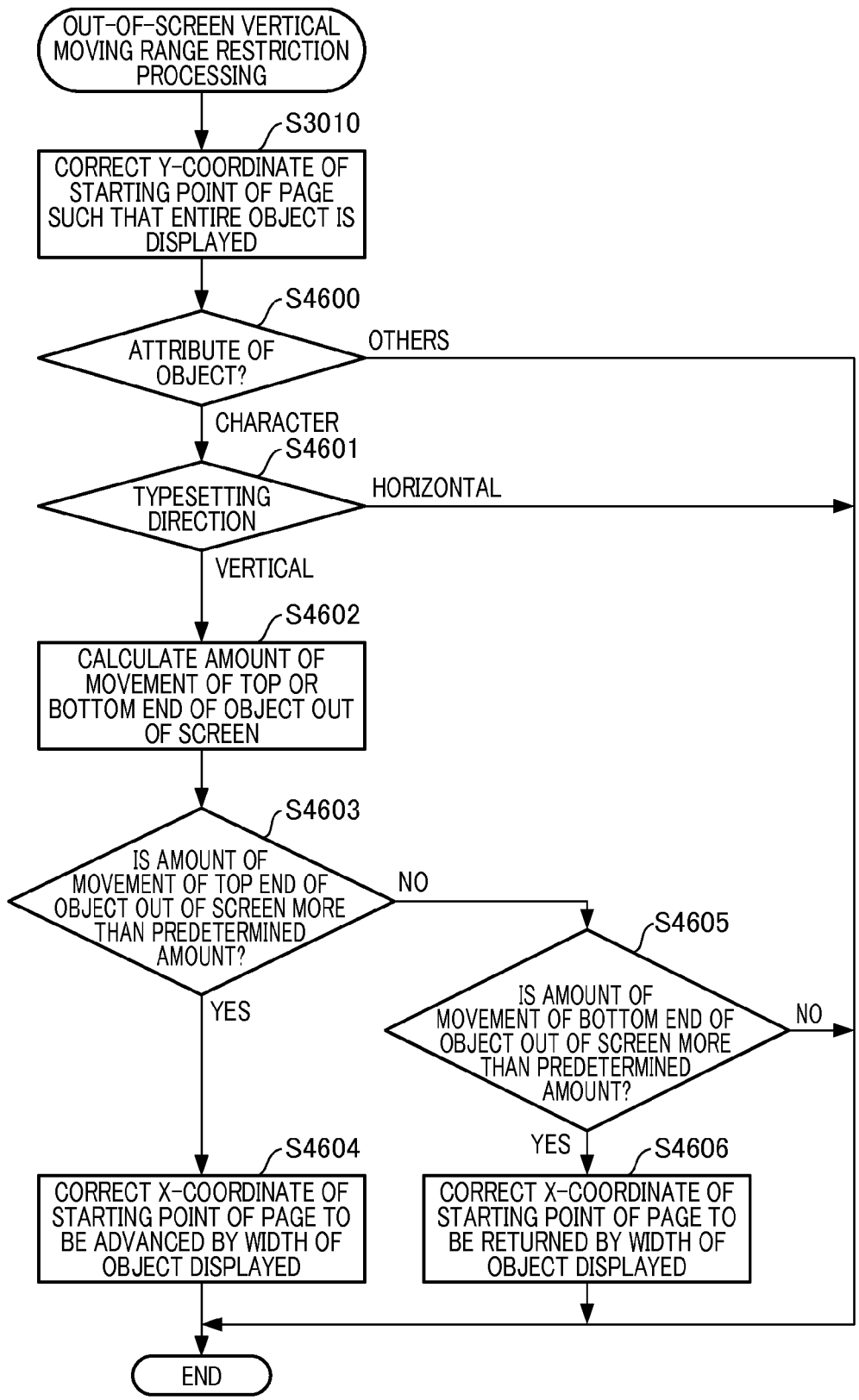
FIG. 41 is a flowchart illustrating out-of-screen vertical moving range restriction processing.

Next, a description will be given of out-of-screen vertical moving range restriction processing according to the present embodiment with reference to FIG. 41. FIG. 41 is a flowchart illustrating out-of-screen vertical moving range restriction processing according to the present embodiment. As in step S3010 in the first embodiment, in step S3010, the y-coordinate of the starting point of the page is corrected by moving the top or bottom end of the object to the end of the screen so that the entire relevant object is displayed.

In step S4600, the vertical moving restriction unit 2409 determines the attribute of the currently read object. When the attribute of the object is character, the processing proceeds to step S4601. When the attribute of the object is others, the processing ends. In step S4601, the vertical moving restriction unit 2409 acquires and determines the typesetting direction of characters in the object. When the typesetting direction is vertical, the processing proceeds to step S4602. When the typesetting direction is horizontal, the processing ends. Note that the typesetting direction of the object has been acquired in the vectorization processing in step S504.

In step S4602, the vertical moving restriction unit 2409 calculates the amount of movement of the top or bottom end of the object which has moved out of the screen of the touch UI 1904, and the processing proceeds to step S4603. In step S4603, the vertical moving restriction unit 2409 determines whether or not the amount of movement of the top end of the object which has moved out of the screen is more than a predetermined amount. Consequently, when the amount of movement is more than a predetermined amount, the processing proceeds to step S4604. Otherwise, the processing proceeds to step S4605.

In step S4604, the vertical moving restriction unit 2409 performs correction such that the x-coordinate of the starting point of the page is advanced by the width of the object displayed within the screen, and then ends the processing. When the left end of the object is moved into the screen upon correction of the x-coordinate of the starting point of the page by the width of the object displayed within the screen, the x-coordinate of the starting point of the page is corrected by the amount of movement of the left end of the object to the left end of the screen.

When the amount of movement of the top end of the object which has moved out of the screen is less than a predetermined amount in step S4603, the vertical moving restriction unit 2409 determines in step S4605 whether or not the amount of movement of the bottom end of the object which has moved out of the screen is more than a predetermined amount. Consequently, when the amount of movement is more than a predetermined amount, the processing proceeds to step S4606, Otherwise, the processing ends.

In step S4606, the vertical moving restriction unit 2409 performs correction such that the y-coordinate of the starting point of the page is returned by the width of the object displayed within the screen, and then ends processing. When the right end of the object is moved into the screen upon correction of the y-coordinate of the starting point of the page by the width of the object displayed within the screen, the y-coordinate of the starting point of the page is corrected by the amount of movement of the right end of the object to the right end of the screen.

In this manner, when the top end of the object is moved out of the screen more than a predetermined amount in the case of display magnification set such that the height of the object fits into the screen, the starting point of the page is controlled such that the top end of the object comes at the top end of the screen. In addition, the screen can be moved to the next screen by the amount of a portion displayed on the screen at the same time the object is returned to the top end of the screen. Thus, the user can read next characters only by a simpler swipe operation. When the bottom end of the object is moved out of the screen more than a predetermined amount in the case of display magnification set such that the height of the object fits into the screen, the starting point of the page is controlled such that the bottom end of the object comes at the bottom end of the screen. In addition, the screen can be sent back to the previous screen by the amount of a portion displayed on the screen at the same time the object is returned to the bottom end of the screen. Thus, the user can read previous characters only by a simpler swipe operation.

Note that the y-coordinate of the starting point of the page is corrected by the height of the object displayed within the screen in the out-of-screen horizontal moving range restriction processing in steps S4504 and S4506. However, the present invention is not limited thereto but the y-coordinate of the starting point of the page may also be corrected by the height of the line of characters displayed within the screen. Likewise, it goes without saying that the x-coordinate of the starting point of the page may also be corrected by the width of the line of characters displayed within the screen in the out-of-screen vertical moving range restriction processing in steps S4604 and S4606.

Next, a specific description will be given of out-of-screen vertical moving range restriction processing by taking an example of the screen of the touch UI 1904 according to the present embodiment with reference to FIGS. 42A to 44D. Since the out-of-screen horizontal moving range restriction processing is only different from the out-of-screen vertical moving range restriction processing in an orthogonal direction, a description thereof by taking an example of specific screen display will be omitted. FIGS. 42A to 44D illustrate examples of screen display of the touch UI 1904 of the mobile information terminal 107 according to the present embodiment.

Figure 42A:
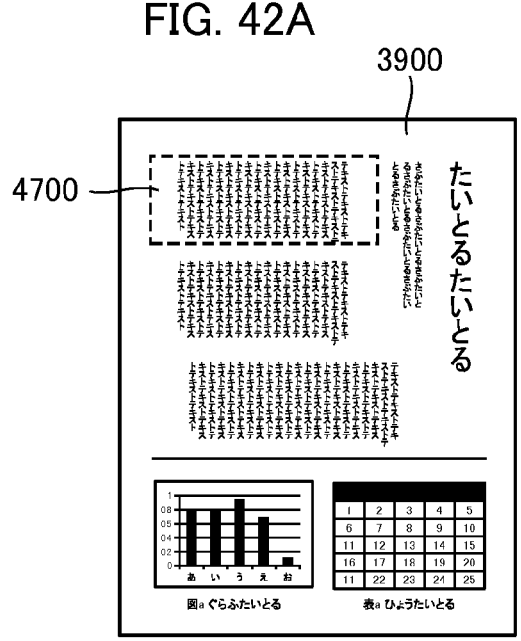
FIGS. 42A and 42B illustrate examples of screen display of the touch UI of a mobile information terminal.
Figure 42B:
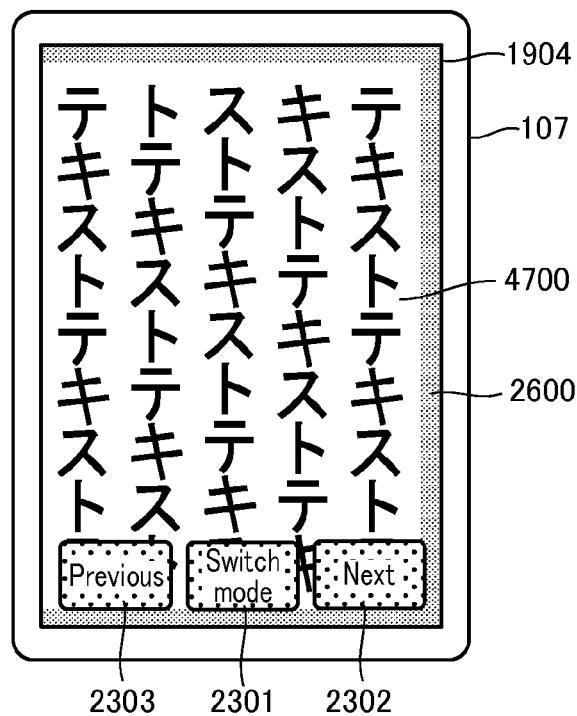

As shown in FIGS. 42A and 42B, an object 4700 is an object having the character attribute for vertical writing in the page 3900. The object 4700 has area information enclosed by the broken line shown in FIG. 42A. Since the object 4700 has the character attribute, the display magnification of the page is set immediately after the object 4700 is read in the partial area display mode. In other words, the display range control unit 2403 sets the display magnification of the page to a magnification with which the height of the object fits into the height of the screen of the touch UI 1904 in the partial area display range determination processing.

In the case of the object 4700, the width of the relevant object is larger than the width of the screen of the touch UI 1904 with the set display magnification of the page. The vertical moving restriction unit 2409 sets the starting point of the page 3900 such that the right end of the relevant object is aligned with the right end of the touch UI 1904. An example of screen display of the set object is shown in FIG. 42B.

Figure 43D:
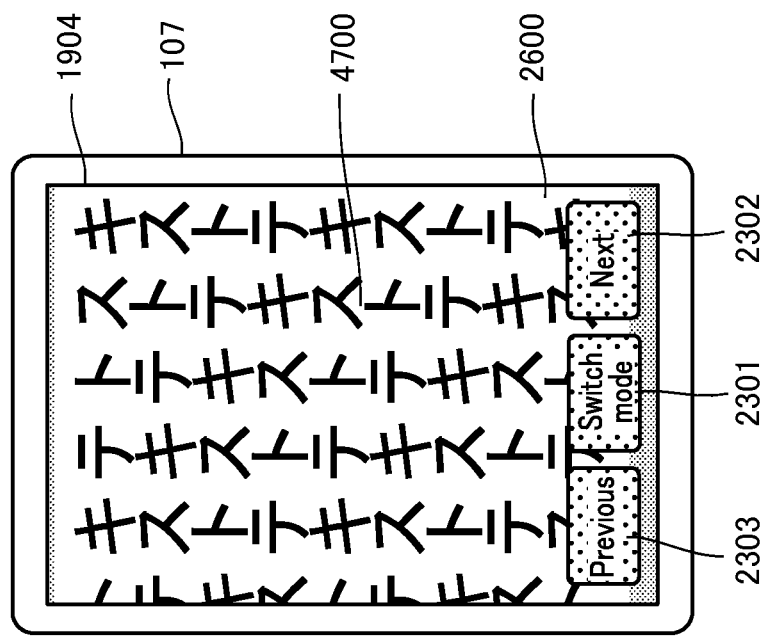

FIGS. 43A to 43D illustrate examples of screen display of the touch UI 1904 when the object 4700 is moved by the swipe operation. FIG. 43A illustrates an example of screen display when the swipe operation is performed in the upward direction from the finger 4800 to the finger 4801 of the user in FIG. 43B. The swipe event processing unit 2401 updates the screen display of the touch UI 1904 by moving the starting point of the page by the moving distance each time the swipe event processing unit 2401 receives the swipe event.

In FIG. 43A, the top end of the object 4700 is moved out of the screen of the touch UI 1904 by the user's swipe operation. FIG. 43B illustrates an example of screen display when the starting point of the page is corrected such that the object 4700 of which the top end has moved out of the screen by the swipe event processing unit 2401 is displayed within the screen by the out-of-screen vertical moving range restriction processing. The height of the object 4700 is smaller than the height of the screen of the touch UI 1904. Thus, the vertical moving restriction unit 2409 corrects the starting point of the page such that the object 4700 which has moved out of the screen is displayed within the screen. In the present embodiment, the vertical moving restriction unit 2409 corrects the starting point of the page with a slight margin such that a part of the semi-transparent mask 2600 is displayed at the end of the object so as to clarify the end of the object.

Figure 43C:
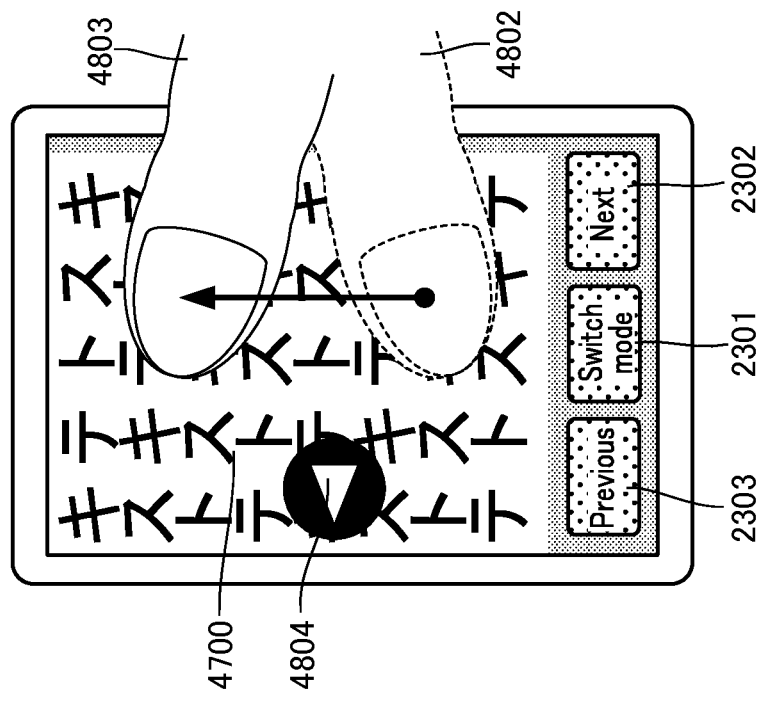

FIG. 43C illustrates an example of screen display when the object 4700 is moved more than a predetermined amount in the upward direction from the finger 4802 to the finger 4803 of the user in contrast to the state shown in FIG. 43B. The vertical moving restriction unit 2409 determines in step S4603 that the object 4700 has moved out of the screen more than a predetermined amount. When the currently read object has the character attribute and the user's swipe operation is performed for the typesetting direction of characters, the vertical moving restriction unit 2409 displays an icon 4804 depending on the amount of movement of the end of the object which has moved out of the screen. In the present embodiment, the icon 4804 indicates as to move the screen to the next screen by the amount of the object 4700 displayed on the screen when the user's swipe operation is completed, i.e., when the finger 4803 separates from the touch UI 1904. The vertical moving restriction unit 2409 displays the icon 4804 for communicating the fact that the screen is moved to the next screen by the amount of the object 4700 displayed on the screen upon completion of the swipe operation to the user.

FIG. 43D illustrates an example of screen display when the starting point of the page is corrected such that the object 4700 of which the top end has largely moved out of the screen by the swipe event processing unit 2401 is displayed within the screen by the out-of-screen vertical moving range restriction processing. The height of the object 4700 is smaller than the height of the screen of the touch UI 1904. When the top end of the object 4700 is moved out of the screen more than a predetermined amount, the vertical moving restriction unit 2409 corrects the starting point of the page such that the top end of the object 4700 is displayed at the top end of the touch UI 1904 by the out-of-screen vertical moving range restriction processing. The vertical moving restriction unit 2409 further performs correction such that the screen is moved to the next screen by the amount of the object 4700 displayed on the screen. In the present embodiment, the vertical moving restriction unit 2409 corrects the starting point of the page with a slight margin such that a part of the semi-transparent mask 2600 is displayed at the end of the object as shown in FIG. 43D.

FIGS. 44A to 44D illustrate examples of screen display of the touch UI 1904 when the object 4700 is moved by the swipe operation. FIG. 44A illustrates an example of screen display when the swipe operation is performed in the downward direction from the finger 4900 to the finger 4901 of the user in FIG. 43D. The swipe event processing unit 2401 updates the screen display of the touch UI 1904 by moving the starting point of the page by the moving distance each time the swipe event processing unit 2401 receives the swipe event. As shown in FIG. 44A, the bottom end of the object 4700 is moved out of the screen of the touch UI 1904 by the user's swipe operation.

FIG. 44B illustrates an example of screen display when the vertical moving restriction unit 2409 corrects the starting point of the page such that the bottom end of the object 4700 is displayed within the screen by the out-of-screen vertical moving range restriction processing. The height of the object 4700 is smaller than the height of the screen of the touch UI 1904. Thus, when the object 4700 is moved out of the screen, the vertical moving restriction unit 2409 corrects the starting point of the page such that the object 4700 is displayed within the screen by the out-of-screen vertical moving range restriction processing. In the present embodiment, the vertical moving restriction unit 2409 corrects the starting point of the page with a slight margin such that a part of the semi-transparent mask 2600 is displayed at the end of the object as shown in FIG. 44B.

FIG. 44C illustrates an example of screen display when the object 4700 is moved more than a predetermined amount in the downward direction from the finger 4902 to the finger 4903 of the user in contrast to the state shown in FIG. 44B. FIG. 44C illustrates an example of screen display when the bottom end of the object 4700 is largely moved out of the screen of the touch UI 1904 by the user's swipe operation. The vertical moving restriction unit 2409 determines in step S4605 of the out-of-screen vertical moving range restriction processing that the object 4700 has moved out of the screen more than a predetermined amount. When the currently read object has the character attribute and the user's swipe operation is performed for the typesetting direction of characters, an icon 4904 shown in FIG. 44C is displayed depending on the amount of movement of the end of the object which has moved out of the screen. The icon 4904 indicates as to move the screen back to the previous screen by the amount of the object 4700 displayed on the screen when the user's swipe operation is completed, i.e., when the finger 4903 separates from the touch UI 1904. The vertical moving restriction unit 2409 displays the icon 4904 for communicating the fact that the screen is moved back to the previous screen by the amount of the object 4700 displayed on the screen upon completion of the swipe operation to the user.

FIG. 44D illustrates an example of screen display when the vertical moving restriction unit 2409 corrects the starting point of the page such that the object 4700 of which the bottom end has largely moved out of the screen by the swipe event processing unit 2401 is displayed within the screen by the out-of-screen vertical moving range restriction processing. The height of the object 4700 is smaller than the height of the screen of the touch UI 1904. When the bottom end of the object 4700 is moved out of the screen more than a predetermined amount, the vertical moving restriction unit 2409 corrects the starting point of the page such that the bottom end of the object 4700 is displayed at the bottom end of the touch UI 1904 by the out-of-screen vertical moving range restriction processing. The vertical moving restriction unit 2409 further performs correction such that the screen is moved back to the previous screen by the amount of the object 4700 displayed on the screen. In the present embodiment, the vertical moving restriction unit 2409 corrects the starting point of the page with a slight margin such that a part of the semi-transparent mask 2600 is displayed at the end of the object as shown in FIG. 44D.

While, in FIGS. 43A to 43D and FIGS. 44A to 44D, a description has been given by taking an example in which the moved position of the object upon completion of the swipe operation is presented to the user via the icons 4804 and 4904, the present invention is not limited thereto. For example, it goes without saying that the user may also be informed of the movement direction of the object via not only light as described in the first embodiment but also characters and the like.

As described above, according to the present embodiment, the user can surely recognize the end of the object and move the character object to the head or the end of a line with less operation after the user has read all characters included in the line, so that the user can smoothly view the characters included in the object. Furthermore, a line can automatically be moved the next or previous line at the same time the character object is moved to the head or the end of a line, so that the user can view the characters included in the object with less operation.

(Third Embodiment)

In the third embodiment, correction that takes into account the preceding user operation is performed by in-screen horizontal moving range restriction processing and in-screen vertical moving range restriction processing. In other words, the moving range restriction unit also corrects the starting point of the page in a direction perpendicular to the typesetting direction of characters by the preceding user operation when the end of the object is moved into the screen more than a predetermined amount with respect to the typesetting direction of characters in the object. Note that the in-screen horizontal moving range restriction processing and the in-screen vertical moving range restriction processing are only partially different from those in the second embodiment. Thus, the same reference numerals denote the same portions as those in the second embodiment, and explanation thereof will be omitted. Only a different portion different from the second embodiment will be described below.

Figure 45:
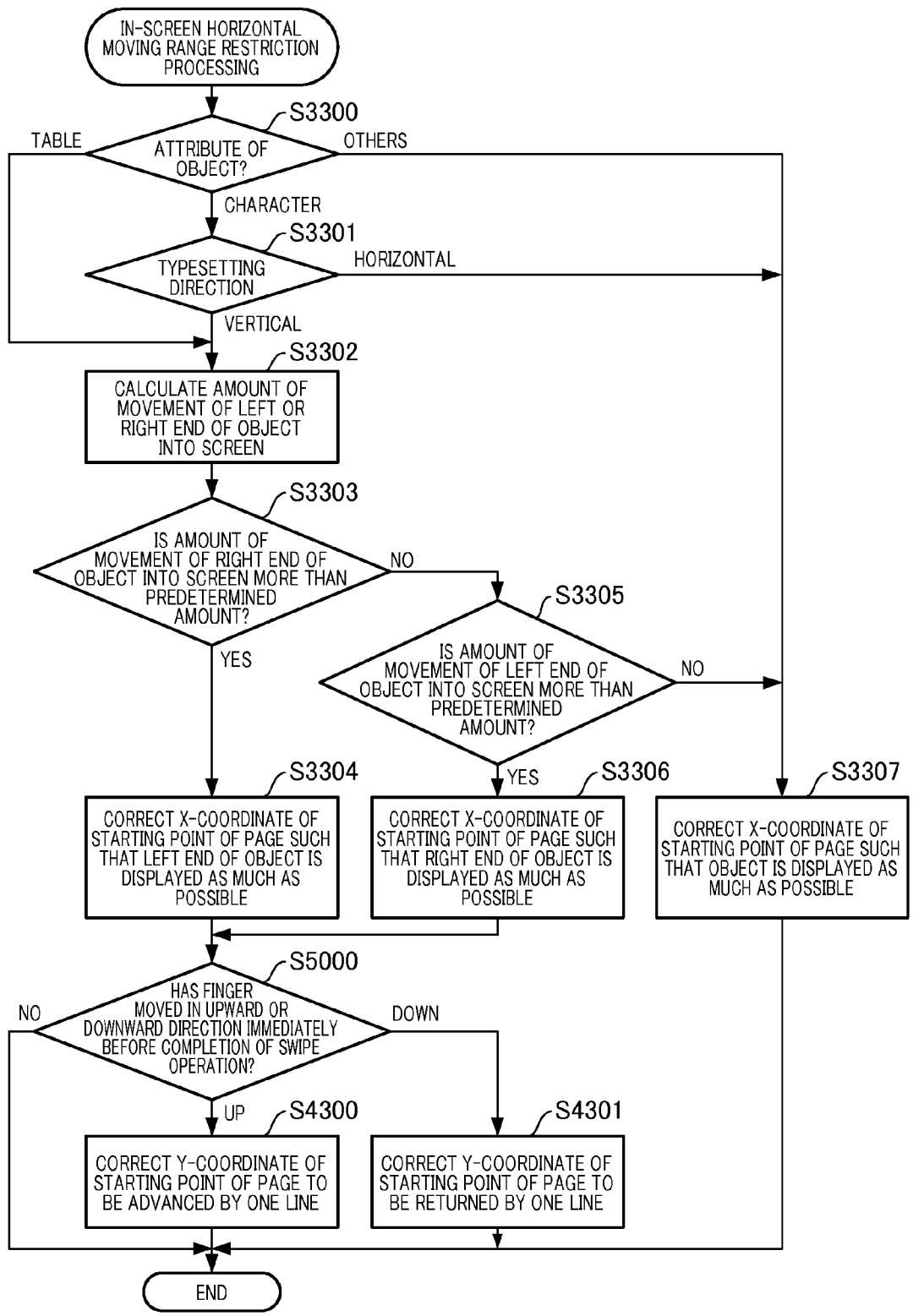
FIG. 45 is a flowchart illustrating horizontal moving range restriction processing according to a third embodiment.

FIG. 45 is a flowchart illustrating in-screen horizontal moving range control processing according to the third embodiment. The conditional branch in step S5000 is different from the second embodiment (FIG. 38). In the present embodiment, after correction of the starting point of the page in steps S3304 and S3306, the horizontal moving range restriction unit 2407 determines in step S5000 whether the user's finger has moved in the upward or downward direction immediately before completion of the swipe operation. Consequently, when the user's finger has moved in the upward direction immediately before completion of the swipe operation, the processing proceeds to step S4300. When the user's finger has moved in the downward direction immediately before completion of the swipe operation, the processing proceeds to step S4301. When the user's finger has moved neither in the upward nor downward direction, the processing ends without performing any processing.

In this manner, in the case of display magnification set such that the width of the object is larger than the width of the screen, the horizontal moving range restriction unit 2407 performs the following processing. The horizontal moving range restriction unit 2407 controls the starting point of the page such that the ends which are paired with the left and right ends of the object moved into the screen more than a predetermined amount by the user's swipe operation comes at the same end of the screen. Furthermore, when the left and right ends of the object are moved into the screen more than a predetermined amount and the swipe operation is completed after movement of the user's finger in the upward or downward direction, the screen can be moved to the previous or next screen by the line of characters depending on the orientation of movement perpendicular to the typesetting direction of characters.

Figure 46:
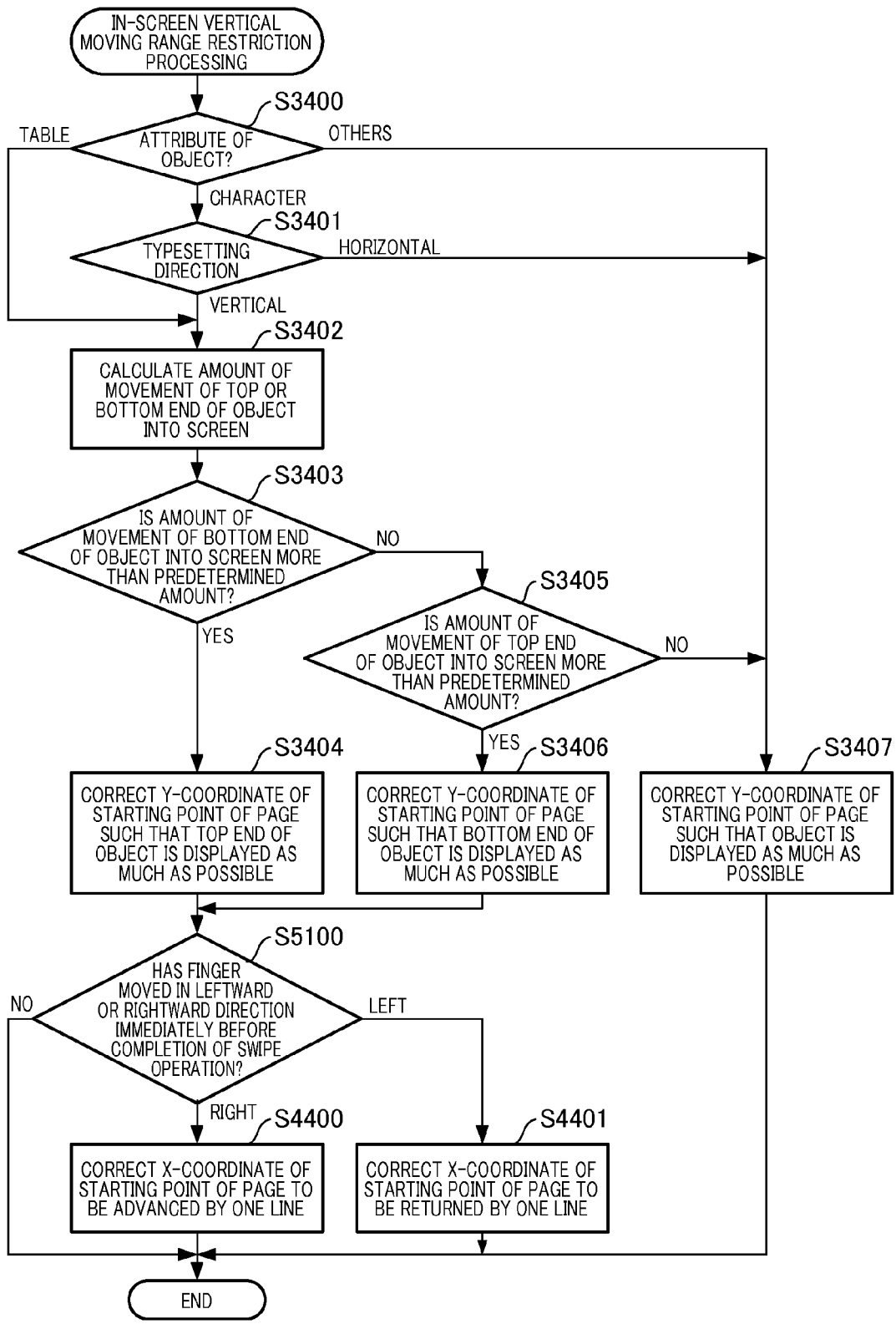
FIG. 46 is a flowchart illustrating vertical moving range restriction processing.

FIG. 46 is a flowchart illustrating in-screen vertical moving range control processing according to the third embodiment. The conditional branch in step S5100 is different from the second embodiment (FIG. 39). In the present embodiment, after correction of the starting point of the page in steps S3404 and S3406, the vertical moving range restriction unit 2409 determines in step S5100 whether the user's finger has moved in the leftward or rightward direction immediately before completion of the swipe operation. Consequently, when the user's finger has moved in the rightward direction immediately before completion of the swipe operation, the processing proceeds to step S4400. When the user's finger has moved in the leftward direction immediately before completion of the swipe operation, the processing proceeds to step S4401. When the user's finger has moved neither in the leftward nor rightward direction, the processing ends without performing any processing.

In this manner, in the case of display magnification set such that the height of the object is larger than the height of the screen, the vertical moving range restriction unit 2409 performs the following processing. The vertical moving range restriction unit 2409 controls the starting point of the page such that the ends which are paired with the top and bottom ends of the object are moved into the screen more than a predetermined amount by the user's swipe operation comes at the same end of the screen. Furthermore, when the top and bottom ends of the object are moved into the screen more than a predetermined amount and the swipe operation is completed after movement of the user's finger in the leftward or rightward direction, the screen can be moved to the previous or next screen by the line of characters depending on the orientation of movement perpendicular to the typesetting direction of characters.

Next, a specific description will be given of in-screen horizontal moving range restriction processing according to the present embodiment with reference to FIGS. 32A to 32E and 47A to 47D. Since the in-screen vertical moving range restriction processing is only different from the in-screen horizontal moving range restriction processing to be described below in an orthogonal direction, a description thereof by taking an example of specific screen display will be omitted.

FIGS. 47A to 47D illustrate examples of screen display of the touch UI 1904 of the mobile information terminal 107 according to the present embodiment. FIG. 47A illustrates an example of screen display when the object 3600 is further moved in the upward direction after the object 3600 is largely moved by the swipe operation in the leftward direction from the finger 3703 to the finger 3704 of the user from the state of enlargement and movement of the object 3600 as shown in FIG. 32C.

FIG. 47A illustrates an example of screen display when the right end of the object 3600 is largely moved into the screen of the touch UI 1904 by the user's swipe operation. The horizontal moving restriction unit 2407 determines in step S3303 of the in-screen horizontal moving range restriction processing that the object 3600 has moved into the screen more than a predetermined amount. Thus, the horizontal moving restriction unit 2407 displays the icon 3705 for communicating the fact that the left end of the object 3600 is displayed at the left end of the screen of the touch UI 1904 upon completion of the swipe operation to the user.

FIG. 47B illustrates an example of screen display when the horizontal moving restriction unit 2407 corrects the starting point of the page such that the left end of the object 3600 of which the right end has largely moved into the screen by the swipe event processing unit 2401 is displayed at the left end of the touch UI 1904. As shown in FIG. 47B, the horizontal moving restriction unit 2407 detects the movement of the user's finger in the upward direction in step S5000 and then moves the object in the upward direction by one line. The width of the object 3600 is larger than the screen width of the touch UI 1904. Thus, when the right end of the object 3600 is moved into the screen more than a predetermined amount, the horizontal moving restriction unit 2407 displays the left end of the object 3600 at the left end of the touch UI 1904 by the in-screen horizontal moving range restriction processing. Furthermore, the horizontal moving restriction unit 2407 corrects the starting point of the page such that the screen is moved to the next screen by the height of one line.

FIG. 47C illustrates an example of screen display when the object 3600 is further moved in the downward direction after the object 3600 is largely moved by the swipe operation in the leftward direction from the finger 3703 to the finger 3704 of the user from the state of enlargement and movement of the object 3600 as shown in FIG. 32C. FIG. 47C illustrates an example of screen display when the right end of the object 3600 is largely moved into the screen of the touch UI 1904 by the user's swipe operation. The horizontal moving restriction unit 2407 determines in step S3303 of the in-screen horizontal moving range restriction processing that the right end of the object 3600 has largely moved into the screen more than a predetermined amount.

FIG. 47D illustrates an example of screen display when the horizontal moving restriction unit 2407 corrects the starting point of the page such that the left end of the object 3600 of which the right end has largely moved into the screen by the swipe event processing unit 2401 is displayed at the left end of the touch UI 1904. As shown in FIG. 47D, the horizontal moving restriction unit 2407 further detects the movement of the user's finger in the downward direction in step S5000 and then moves the object back in the downward direction by one line. The width of the object 3600 is larger than the screen width of the touch UI 1904. When the right end of the object 3600 is moved into the screen more than a predetermined amount, the horizontal moving restriction unit 2407 corrects to display the left end of the object 3600 at the left end of the touch UI 1904 by the in-screen horizontal moving range restriction processing. Furthermore, the horizontal moving restriction unit 2407 corrects the starting point of the page such that the screen is moved to the previous screen by the height of one line.

In the present embodiment, a description has been given of a method for moving a screen in a direction perpendicular to the typesetting direction of characters by the movement direction of the user's finger immediately before completion of the user's swipe operation only in the in-screen horizontal moving range restriction processing and the in-screen vertical moving range restriction processing. However, it goes without saying that the user can provide a directional instruction for moving a screen via the same gesture operation in the out-of-screen horizontal moving range restriction processing and the out-of-screen vertical moving range restriction processing described in the second embodiment.

As described above, according to the present embodiment, the user can surely recognize the end of the object and move the character object to the head or the end of a line with less operation after the user has read all characters included in the line, so that the user can smoothly view the characters included in the object. Furthermore, when the character object is moved to the head or the end of a line, the line is simultaneously moved to the next or previous one by the user's continuous gesture operation, so that the user can view characters included in the object in any direction with less operation.

(Fourth Embodiment)

In the fourth embodiment, the starting point of the page is corrected by the in-screen horizontal moving range restriction processing and the in-screen vertical moving range restriction processing when the end of the object not only having the character attribute but also having other attributes has moved into the screen more than a predetermined amount. Note that the in-screen horizontal moving range restriction processing and the in-screen vertical moving range restriction processing are only partially different from those in the third embodiment. Thus, the same reference numerals denote the same portions as those in the third embodiment and only a different portion different from the third embodiment will be described below.

Subsequently, a description will be given of the flowchart of in-screen horizontal moving range restriction processing according to the fourth embodiment with reference to FIG. 45. Only steps S3300, S4300, and S4301 are different from the third embodiment. In step S3300, the horizontal moving restriction unit 2407 determines the attribute of the currently read object. When the attribute of the object is character, the processing proceeds to step S3301. When the attribute of the object is table, the processing proceeds to step S3302. When the attribute of the object is others, the processing proceeds to step S3307.

When the user's finger has moved in the upward direction immediately before completion of the user's swipe operation, the horizontal moving restriction unit 2407 performs the following processing in step S4300 instead of correction processing performed when the attribute of the object is character. In other words, the horizontal moving restriction unit 2407 performs correction such that the y-coordinate of the starting point of the page is advanced by the height of the character size if the attribute of the object is character or is advanced by one cell, i.e., by the height of the cell if the attribute of the object is table, and then ends processing. Note that the height of the cell in the table may be acquired from the distance between tabular ruled lines or the like. On the other hand, when the user's finger has moved in the downward direction immediately before completion of the user's swipe operation, the horizontal moving restriction unit 2407 performs correction in step S4301 such that the y-coordinate of the starting point of the page is moved back by the height of the cell if the attribute of the object is table, and then ends processing.

Next, a description will be given of the flowchart of in-screen vertical moving range restriction processing according to the fourth embodiment. Only steps S3400, S4400, and S4401 are different from the third embodiment (FIG. 46). In step S3400, the vertical moving restriction unit 2409 determines the attribute of the currently read object. When the attribute of the object is character, the processing proceeds to step S3401. When the attribute of the object is table, the processing proceeds to step S3402. When the attribute of the object is others, the processing proceeds to step S3407.

When the user's finger has moved in the rightward direction immediately before completion of the user's swipe operation, the vertical moving restriction unit 2409 performs the following processing in step S4400 instead of correction processing performed when the attribute of the object is character. In other words, the vertical moving restriction unit 2409 performs correction such that the x-coordinate of the starting point of the page is advanced by the width of the character size if the attribute of the object is character or is advanced by one cell, i.e., by the width of the cell if the attribute of the object is table, and then ends processing. Note that the width of the cell in the table may be acquired from the distance between tabular ruled lines or the like. In step S4401, the vertical moving restriction unit 2409 performs the following correction when the user's finger has moved in the leftward direction immediately before completion of the user's swipe operation. In other words, the vertical moving restriction unit 2409 performs correction such that the x-coordinate of the starting point of the page is moved back by the width of the character size if the attribute of the object is character or by the width of the cell if the attribute of the object is table, and then ends processing.

Next, a specific description will be given of in-screen horizontal moving range restriction processing according to the present embodiment with reference to FIGS. 48A, 48B, and 49A to 49D. Since the in-screen vertical moving range restriction processing is only different from the in-screen horizontal moving range restriction processing to be described below in an orthogonal direction, a description thereof by taking an example of specific screen display will be omitted. FIGS. 48A, 48B, and 49A to 49D illustrate examples of screen display of the touch UI 1904 of the mobile information terminal 107 according to the present embodiment.

Figure 48A:
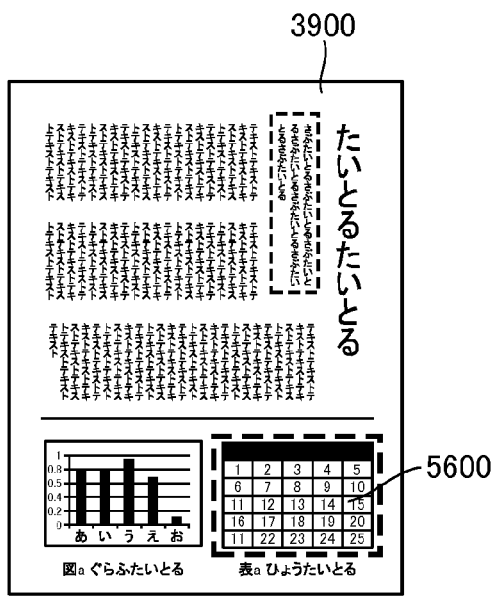
FIGS. 48A and 48B illustrate examples of screen display of the touch UI of a mobile information terminal.
Figure 48B:
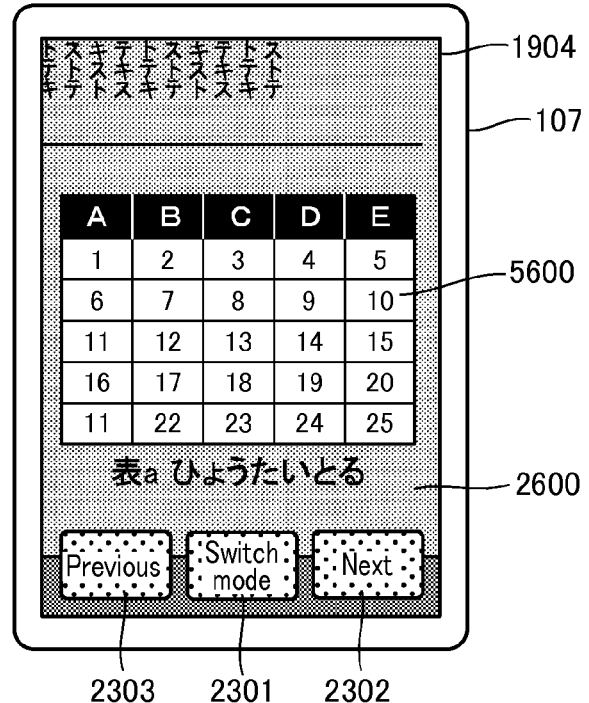

As shown in FIGS. 48A and 48B, an object 5600 is an object having the attribute of a table in the page 3900. The object 5600 has area information enclosed by the broken line shown in FIG. 48A. Since the object 5600 has the table attribute, the display magnification of the page is set immediately after the object 5600 is read in the partial area display mode. In other words, the display range control unit 2403 sets the display magnification of the page to a magnification with which the table header on top of the object fits into the width of the screen of the touch UI 1904 in the partial area display range determination processing. The display range control unit 2403 also sets the starting point of the page such that the center of the relevant object is aligned with the center of the touch UI 1904. An example of screen display of the set object is shown in FIG. 48B.

Figure 49B:
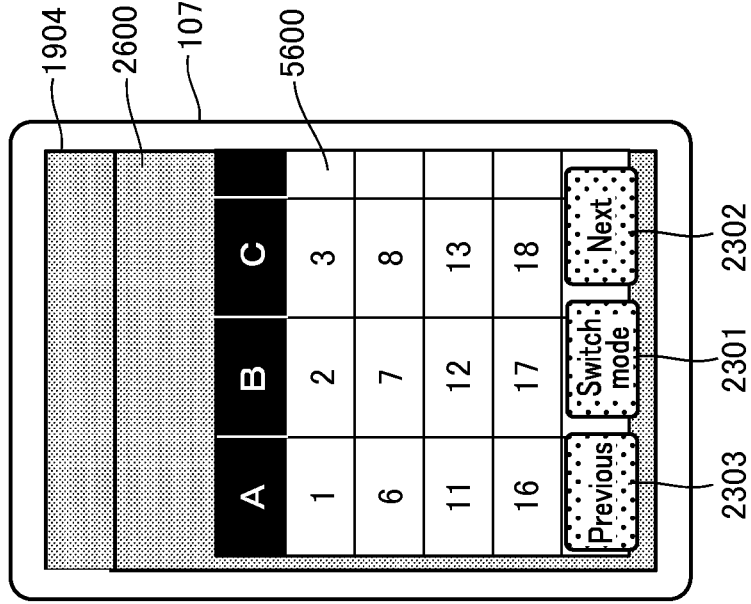
FIGS. 49A to 49D illustrate examples of screen display of the touch UI of a mobile information terminal.
Figure 49A:
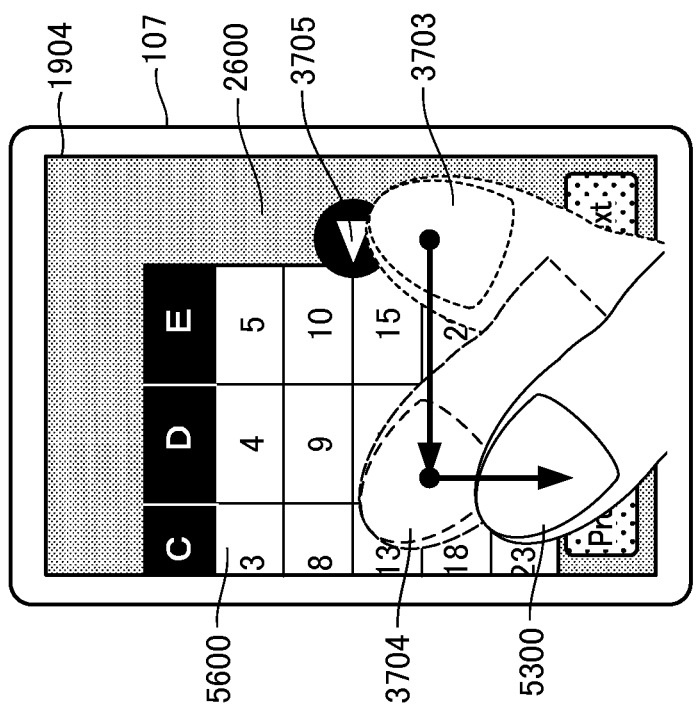

FIG. 49A illustrates an example of screen display when the object 5600 is moved in the upward direction after the object 5600 is enlarged and then further moved by the swipe operation in the leftward direction from the finger 3703 to the finger 3704 of the user. FIG. 49A illustrates an example of screen display when the right end of the object 5600 is largely moved into the screen of the touch UI 1904 by the user's swipe operation. The horizontal moving restriction unit 2407 determines in step S3303 of the in-screen horizontal moving range restriction processing that the right end of the object 5600 has largely moved into the screen more than a predetermined amount. Thus, the horizontal moving restriction unit 2407 displays the icon 3705 for communicating the fact that the left end of the object 5600 is displayed at the left end of the screen of the touch UI 1904 upon completion of the swipe operation to the user.

FIG. 49B illustrates an example of screen display when the horizontal moving restriction unit 2407 corrects the starting point of the page such that the left end of the object 5600 of which the right end has largely moved into the screen by the swipe event processing unit 2401 is displayed at the left end of the touch UI 1904. FIG. 49B illustrates an example of screen display when the horizontal moving restriction unit 2407 further detects the movement of the user's finger in the upward direction in step S5000 and then moves the object in the downward direction by one cell. The width of the object 5600 is larger than the screen width of the touch UI 1904. When the right end of the object 5600 is moved into the screen more than a predetermined amount, the horizontal moving restriction unit 2407 corrects the starting point of the page such that the left end of the object 5600 is displayed at the left end of the touch UI 1904 by the in-screen horizontal moving range restriction processing. Furthermore, the horizontal moving restriction unit 2407 corrects the starting point of the page such that the screen is moved to the next screen by the height of one cell.

Figure 49D:
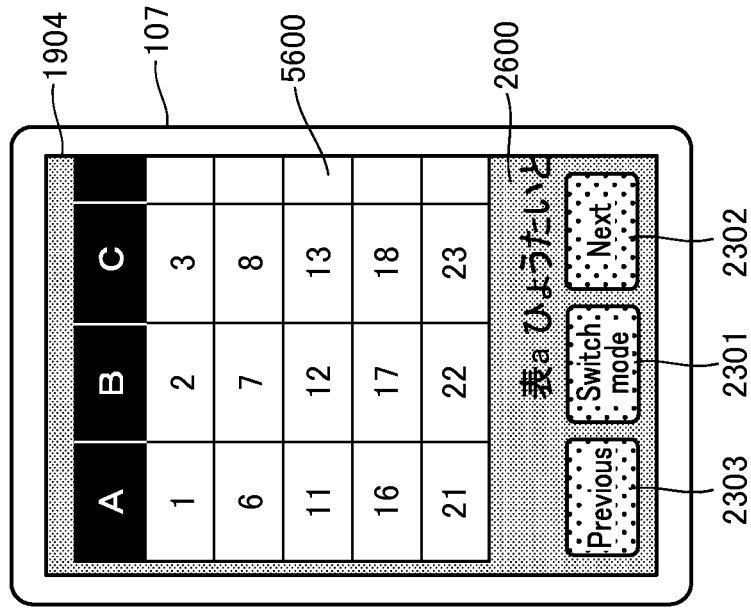
Figure 49C:
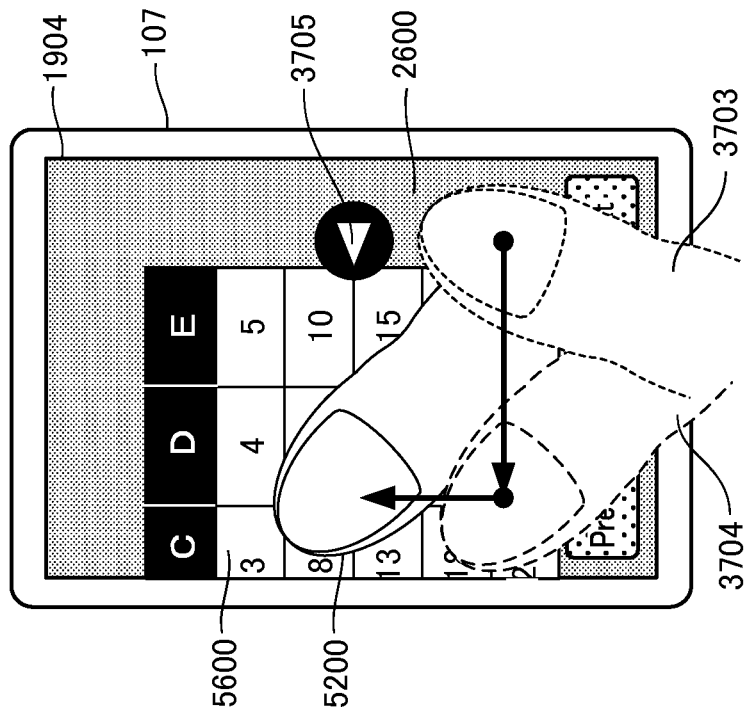

FIG. 49C illustrates an example of screen display when the object 5600 is moved in the downward direction after the object 5600 is enlarged and then further moved by the swipe operation in the leftward direction from the finger 3703 to the finger 3704 of the user. FIG. 49C illustrates an example of screen display when the right end of the object 5600 is largely moved into the screen of the touch UI 1904 by the user's swipe operation. The horizontal moving restriction unit 2407 determines in step S3303 of the in-screen horizontal moving range restriction processing that the right end of the object 5600 has largely moved into the screen more than a predetermined amount.

FIG. 49D illustrates an example of screen display when the horizontal moving restriction unit 2407 corrects the starting point of the page such that the left end of the object 5600 of which the right end has largely moved into the screen is displayed at the left end of the touch UI 1904. As shown in FIG. 49D, the horizontal moving restriction unit 2407 further detects the movement of the user's finger in the downward direction in step S5000 and then moves back the screen by one cell. The width of the object 5600 is larger than the screen width of the touch UI 1904. When the right end of the object 5600 is moved into the screen more than a predetermined amount, the horizontal moving restriction unit 2407 corrects the starting point of the page such that the left end of the object 5600 is displayed at the left end of the touch UI 1904 by the in-screen horizontal moving range restriction processing. Furthermore, the horizontal moving restriction unit 2407 corrects the starting point of the page such that the screen is moved to the previous screen by the height of one cell.

As described above, according to the present embodiment, the user can surely recognize the end of the object and simultaneously move the line or cell to the next or previous one by the user's continuous gesture operation even in the case of the object having other attributes such as table other than character. In this manner, the user can view characters included in the object in any direction with less operation.

(Other Embodiments)

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-177226, filed on Aug. 28, 2013, which is hereby incorporated by reference herein in its entirety.

What is claimed is:

1. An image display apparatus comprising:
   a displaying unit configured to display a page image including a plurality of objects on a screen;
   a determining unit configured to determine an amount of movement of the end of an object to be displayed, of the plurality of objects, from the end of the screen by detecting an operation on the screen; and
   a setting unit configured to set the end position of the object based on the determined amount of movement when the object to be displayed is larger than the screen,
   wherein (a) when the determined amount of movement of the end of the object from the end of the screen to the inside of the screen is more than a predetermined amount, the setting unit sets the display position of the object such that the opposite end of the object from the end of the object which has moved to the inside of the screen in a movement direction is displayed at a position of the end of the screen opposite the end of the screen in the movement direction, and (b) when the determined amount of movement is less than a predetermined amount, the setting unit sets the display position of the object such that the end of the object which has moved to the inside of the screen is displayed at the position of the end of the screen.

2. The image display apparatus according to claim 1, wherein (a), when an attribute of the object is character and a typesetting direction of the character string of the object is horizontal, the determining unit determines an amount of movement of a left end and a right end of the object to the inside of the screen, and (b) when the attribute of the object is character and the typesetting direction of the character string of the object is vertical, the determining unit determines an amount of movement of a top end and a bottom end of the object to be displayed to the inside of the screen.

3. The image display apparatus according to claim 2, wherein, when the typesetting direction of the character string of the object is horizontal and the determining unit determines that the amount of movement of the right end of the object from the end of the screen to the inside of the screen is more than a predetermined amount, the setting unit sets the display position of the object by moving the object in the upward direction by the height of the character size such that the left end of the object is displayed at the left end position of the screen, and wherein when the typesetting direction of the character string of the object is horizontal and the determining unit determines that the amount of movement of the left end of the object from the end of the screen to the inside of the screen is more than a predetermined amount, the setting unit sets the display position of the object by moving the object in the downward direction by the height of the character size such that the right end of the object is displayed at the right end position of the screen.

4. The image display apparatus according to claim 2, wherein when the typesetting direction of the character string of the object is vertical and the determining unit determines that the amount of movement of the bottom end of the object from the end of the screen to the inside of the screen is more than a predetermined amount, the setting unit sets the display position of the object by moving the object in the rightward direction by the width of the character size such that the top end of the object is displayed at the top end position of the screen, and wherein when the typesetting direction of the character string of the object is vertical and the determining unit determines that the amount of movement of the top end of the object from the end of the screen to the inside of the screen is more than a predetermined amount, the setting unit sets the display position of the object by moving the object in the leftward direction by the width of the character size such that the bottom end of the object is displayed at the bottom end position of the screen.

5. The image display apparatus according to claim 2, wherein, when the determining unit determines that the amount of movement of the left end of the object which has moved out of the screen is more than a predetermined amount, the setting unit sets the display position of the object by moving the object in the upward direction by the height of the object displayed on the screen such that the left end of the object is displayed at the left end position of the screen, and wherein when the determining unit determines that the amount of movement of the right end of the object which has moved out of the screen is more than a predetermined amount, the setting unit sets the display position of the object by moving the object in the downward direction by the height of the object displayed on the screen such that the right end of the object is displayed at the right end position of the screen.

6. The image display apparatus according to claim 2, wherein, when the determining unit determines that the amount of movement of the top end of the object which has moved out of the screen is more than a predetermined amount, the setting unit sets the display position of the object by moving the object in the rightward direction by the width of the object displayed on the screen such that the top end of the object is displayed at the top end position of the screen, and wherein when the determining unit determines that the amount of movement of the bottom end of the object which has moved out of the screen is more than a predetermined amount, the setting unit sets the display position of the object by moving the object in the leftward direction by the width of the object displayed on the screen such that the bottom end of the object is displayed at the bottom end position of the screen.

7. The image display apparatus according to claim 2, wherein, when the typesetting direction of the character string of the object is horizontal, the setting unit sets the display position of the object such that the left end of the object is displayed at the left end position of the screen if the determining unit determines that the amount of movement of the right end of the object from the end of the screen to the inside of the screen is more than a predetermined amount, wherein the setting unit sets the display position of the object such that the right end of the object is displayed at the right end position of the screen if the determining unit determines that the amount of movement of the left end of the object from the end of the screen to the inside of the screen is more than a predetermined amount, wherein the determining unit further detects an immediately preceding operation on the screen, wherein the setting unit sets the display position of the object by moving the object in the upward direction by the height of the character size if the determining unit determines that the object has moved in the upward direction, and wherein the setting unit sets the display position of the object by moving the object in the downward direction by the height of the character size if the determining unit determines that the object has moved in the downward direction.

8. The image display apparatus according to claim 2, wherein, when the typesetting direction of the character string of the object is vertical, the setting unit sets the display position of the object such that the top end of the object is displayed at the top end position of the screen if the determining unit determines that the amount of movement of the bottom end of the object from the end of the screen to the inside of the screen is more than a predetermined amount, wherein the setting unit sets the display position of the object such that the bottom end of the object is displayed at the bottom end position of the screen if the determining unit determines that the amount of movement of the top end of the object from the end of the screen to the inside of the screen is more than a predetermined amount, wherein the determining unit further detects an immediately preceding operation on the screen, wherein the setting unit sets the display position of the object by moving the object in the rightward direction by the width of the character size if the determining unit determines that the object has moved in the rightward direction, and wherein the setting unit sets the display position of the object by moving the object in the leftward direction by the width of the character size if the determining unit determines that the object has moved in the leftward direction.

9. The image display apparatus according to claim 1, wherein, when the determining unit determines that the amount of movement of the end of the object from the end of the screen to the inside of the screen is more than a predetermined amount, the displaying unit sets an icon indicating that the opposite end of the object from the end of the object which has moved to the inside of the screen in a movement direction is displayed at a position of an end of the screen against the end of the screen in the movement direction on the screen, and wherein when the determined amount of movement is less than a predetermined amount, the displaying unit displays an icon indicating that the end of the object which has moved to the inside of the screen is displayed at the position of the end of the screen.

10. The image display apparatus according to claim 9, wherein the displaying unit lights the end position of the screen corresponding to the end of the object displayed based on the amount of movement instead of the icon.

11. The image display apparatus according to claim 1, wherein, when the attribute of the object is table, the setting unit sets the display position of the object such that the left end of the object is displayed at the left end position of the screen if the determining unit determines that the amount of movement of the right end of the object from the end of the screen to the inside of the screen is more than a predetermined amount, wherein the setting unit sets the display position of the object such that the right end of the object is displayed at the right end position of the screen if the determining unit determines that the amount of movement of the left end of the object from the end of the screen to the inside of the screen is more than a predetermined amount, wherein the determining unit further detects an immediately preceding operation on the screen, wherein the setting unit sets the display position of the object by moving the object in the upward direction by one cell if the determining unit determines that the object has moved in the upward direction, and wherein the setting unit sets the display position of the object by moving the object in the downward direction by the one cell if the determining unit determines that the object has moved in the downward direction.

12. The image display apparatus according to claim 1, wherein, when the attribute of the object is table, the setting unit sets the display position of the object such that the bottom end of the object is displayed at the bottom end position of the screen if the determining unit determines that the amount of movement of the top end of the object from the end of the screen to the inside of the screen is more than a predetermined amount, wherein the setting unit sets the display position of the object such that the top end of the object is displayed at the top end position of the screen if the determining unit determines that the amount of movement of the bottom end of the object from the end of the screen to the inside of the screen is more than a predetermined amount, wherein the determining unit further detects an immediately preceding operation on the screen, wherein the setting unit sets the display position of the object by moving the object in the rightward direction by one cell if the determining unit determines that the object has moved in the rightward direction, and wherein the setting unit sets the display position of the object by moving the object in the leftward direction by the one cell if the determining unit determines that the object has moved in the leftward direction.

13. A method for controlling an image display apparatus, the method comprising:

displaying a page image including a plurality of objects on a screen;

determining an amount of movement of the end of an object to be displayed, of the plurality of objects, from the end of the screen by detecting an operation on the screen; and setting the end position of the object based on the determined amount of movement when the object to be displayed is larger than the screen, wherein, (a) when the determined amount of movement of the end of the object from the end of the screen to the inside thereof is more than a predetermined amount, the display position of the object is set such that the opposite end of the object from the end of the object which has moved to the inside of the screen in a movement direction is displayed at a position of the end of the screen opposite the end of the screen in the movement direction, and (b) when the determined amount of movement is less than a predetermined amount, the display position of the object is set such that the end of the object which has moved to the inside of the screen is displayed at the position of the end of the screen.

14. A non-transitory storage medium on which is stored a computer program for making a computer execute the control method according to claim 13.

* * * * *